Oct. 20, 1959     A. J. MALAVAZOS     2,909,320
BACK TRANSFER MECHANISM
Filed Aug. 2, 1954     22 Sheets-Sheet 21
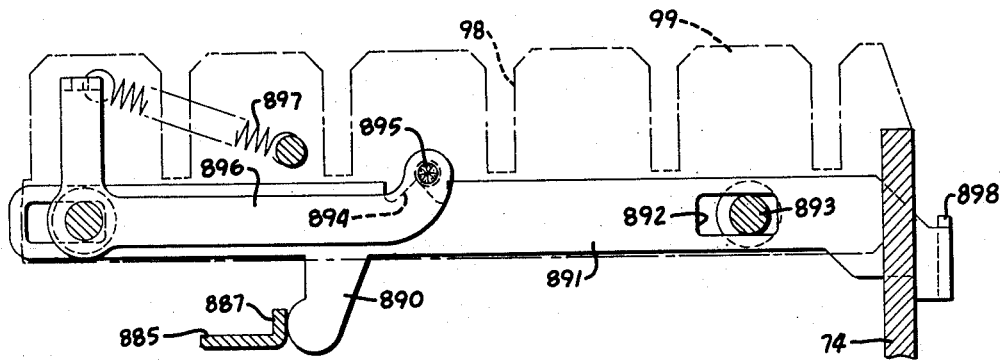
FIG_26
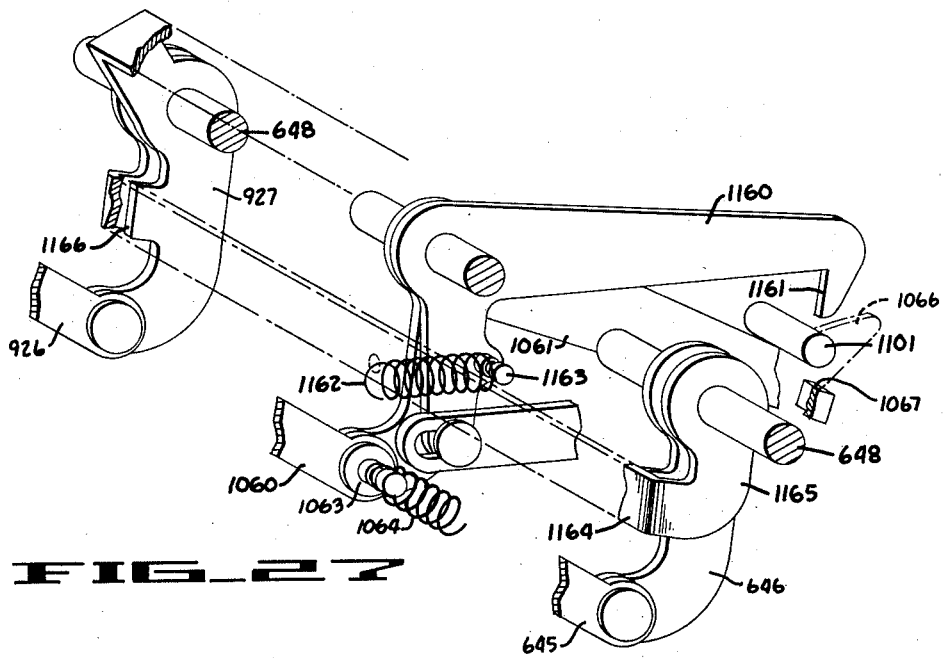
FIG_27

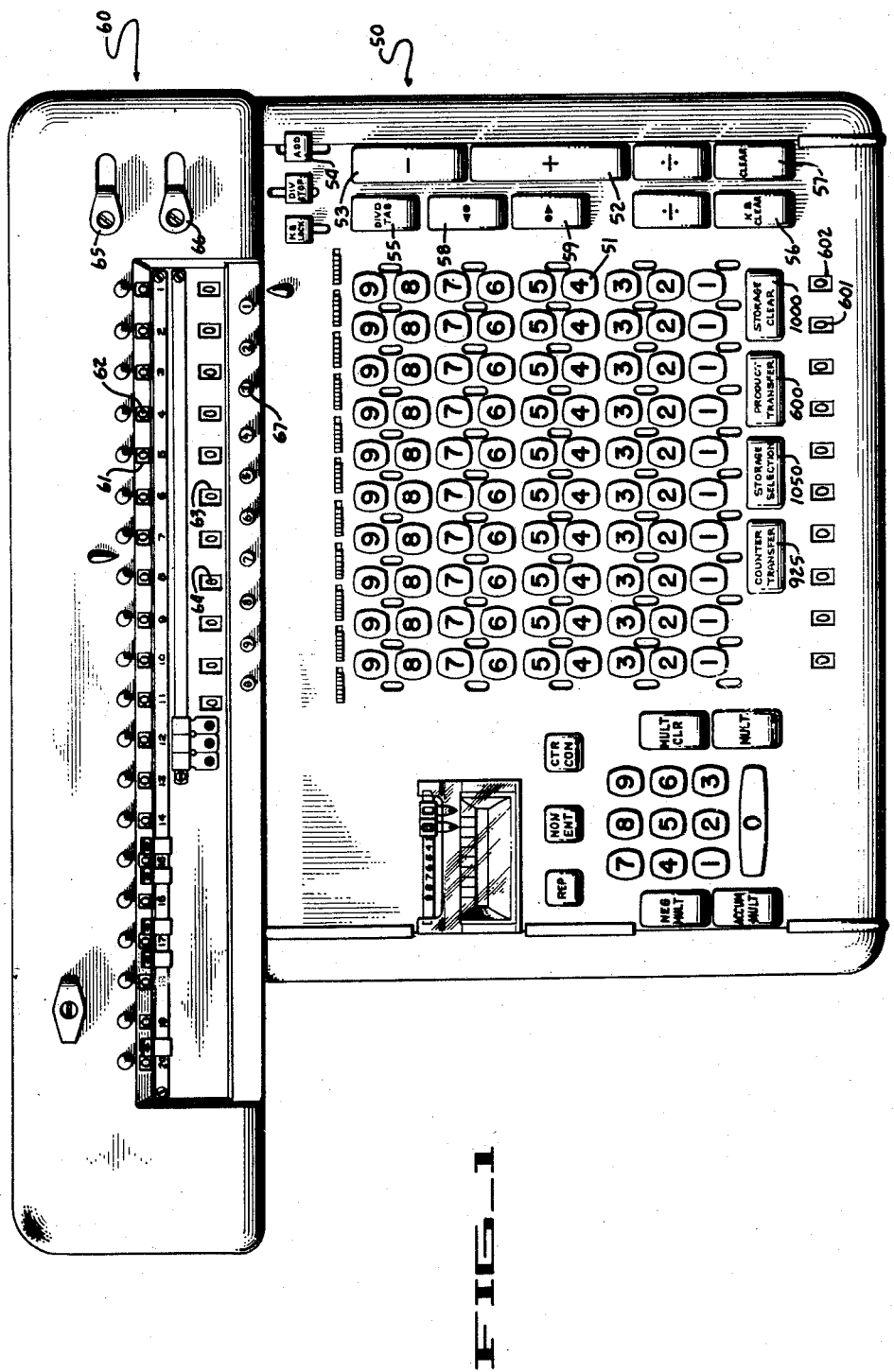

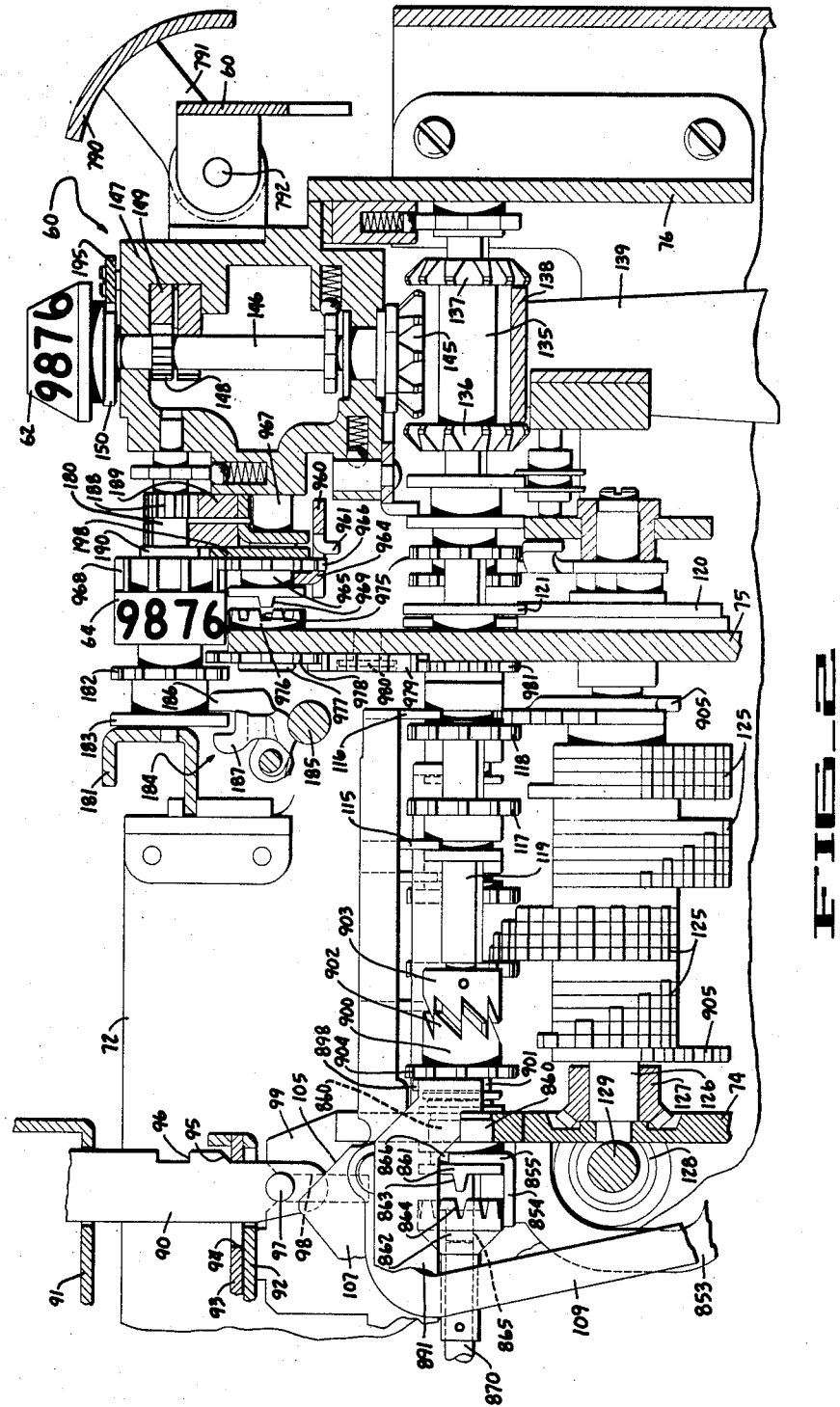

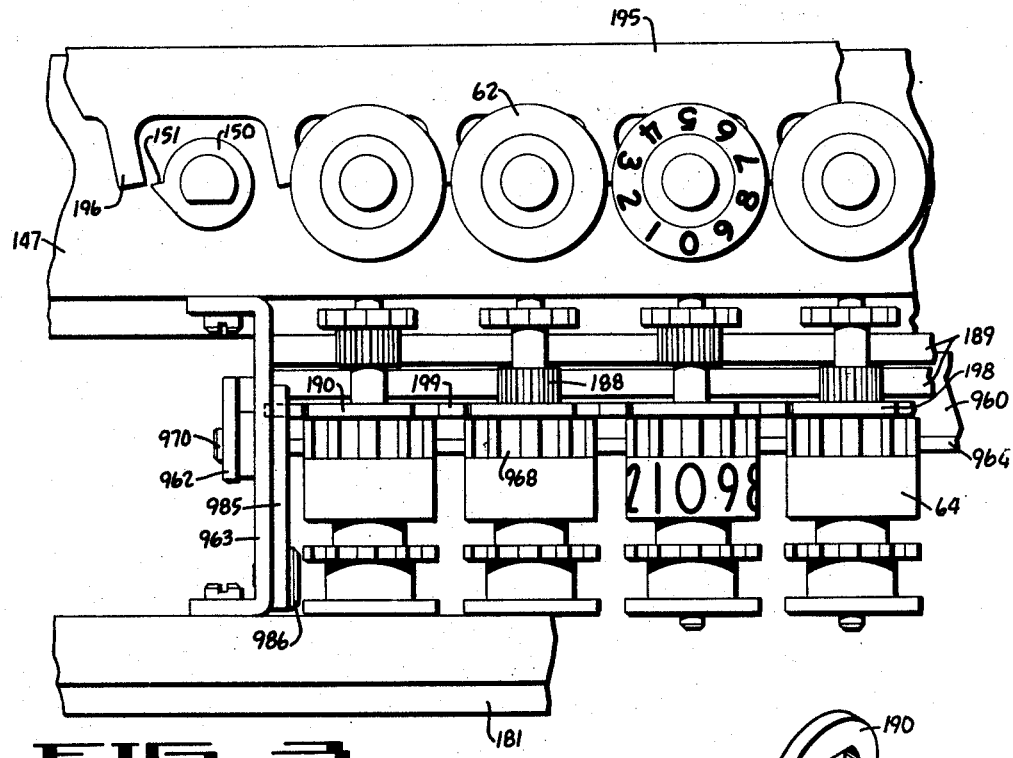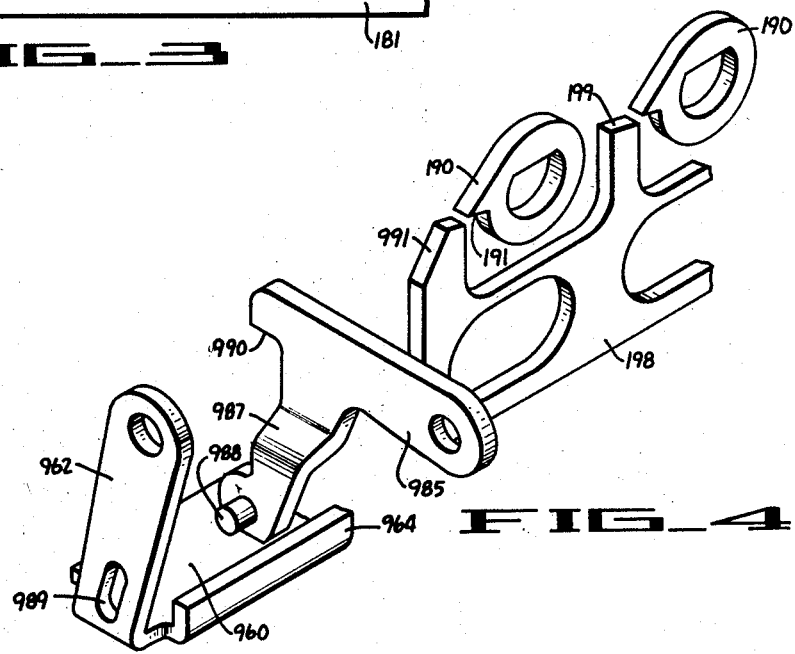

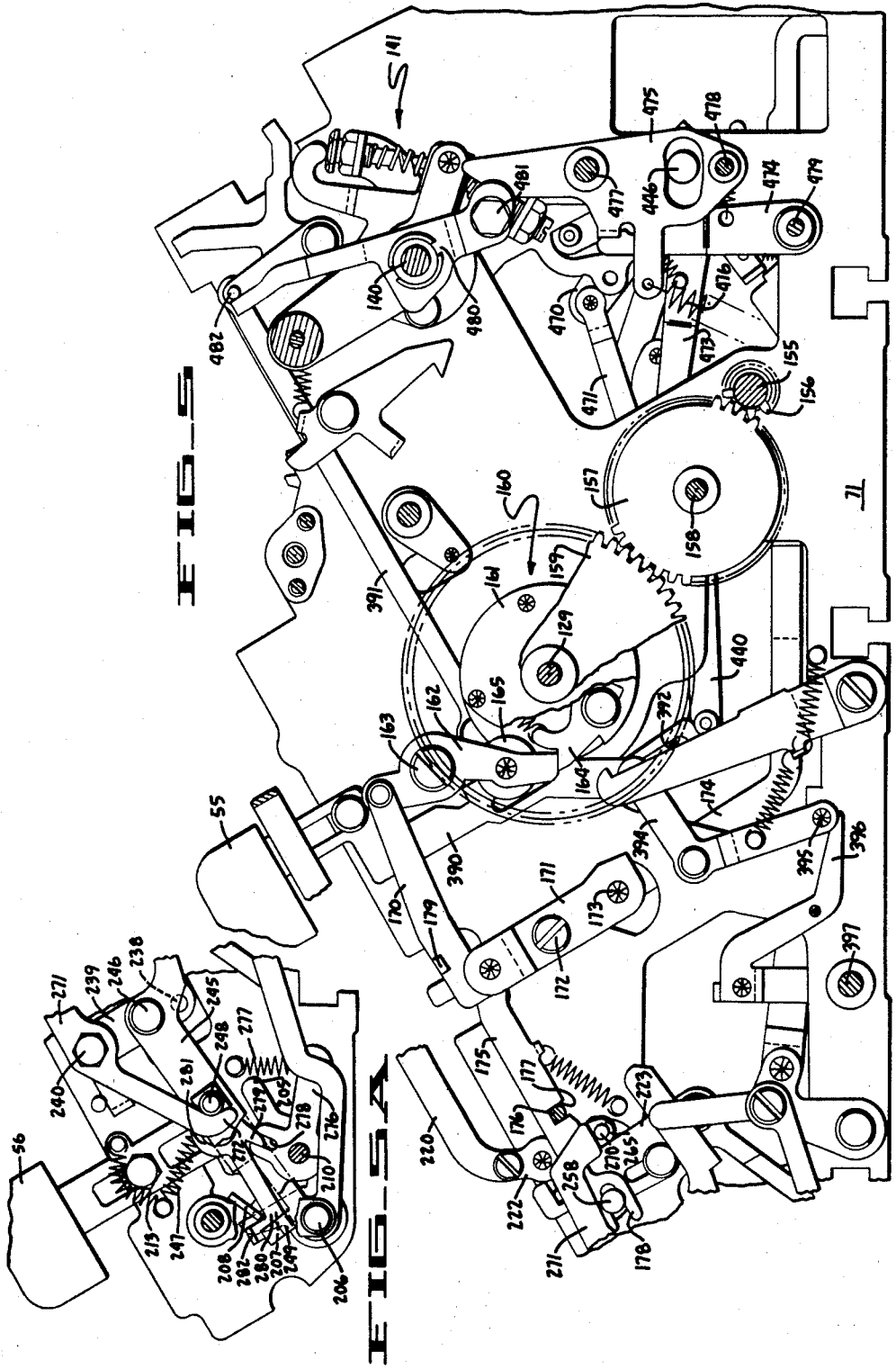

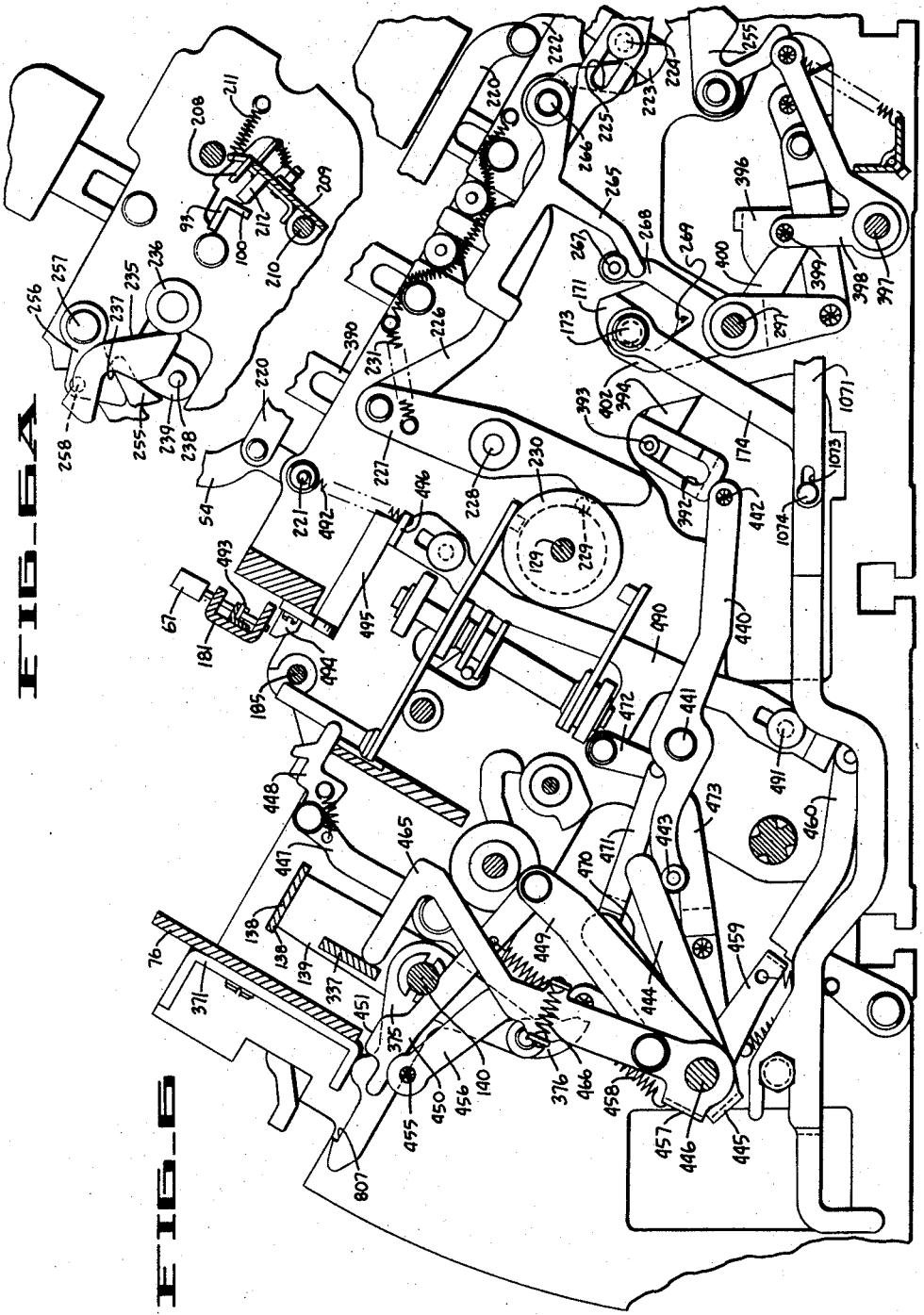

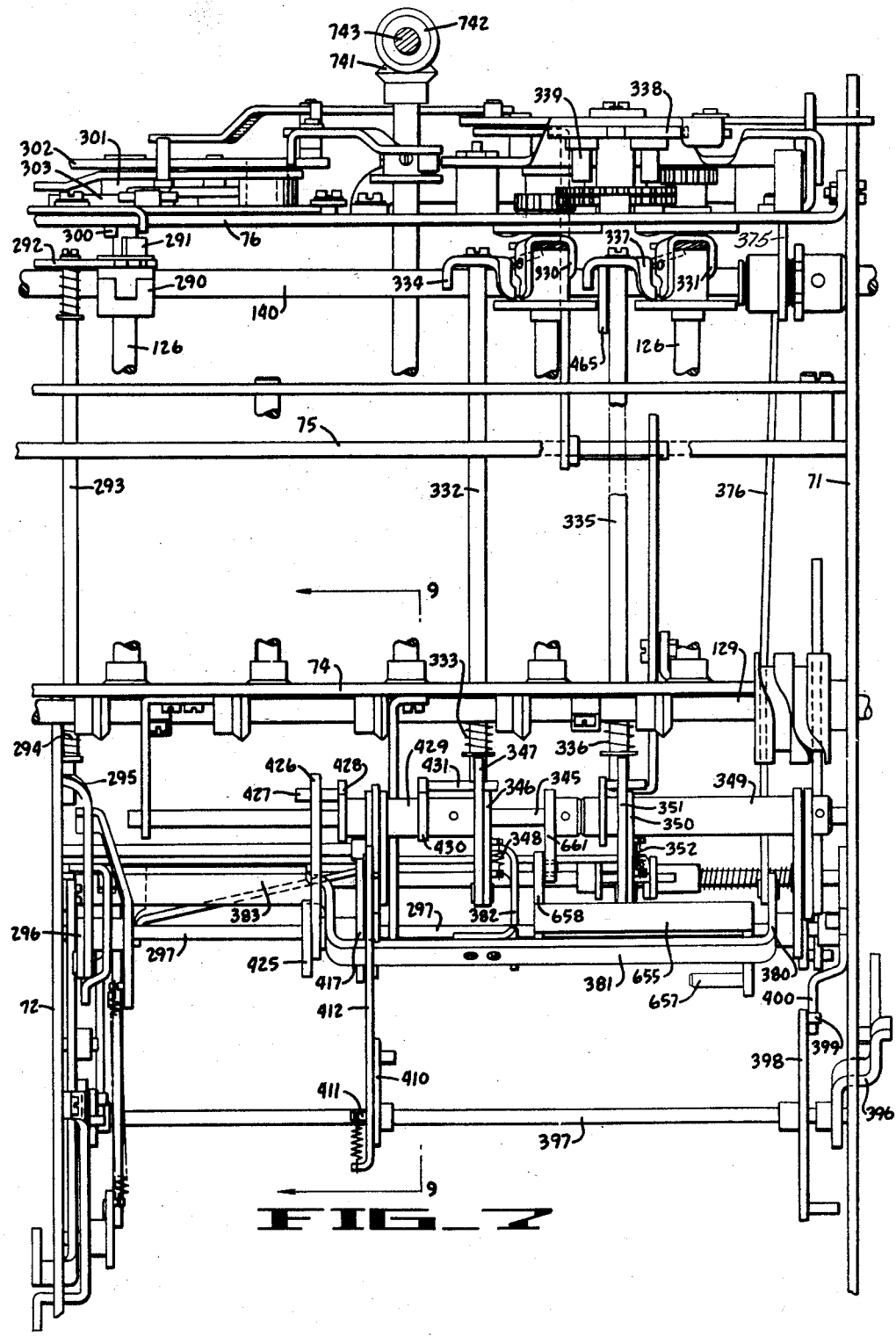
FIG_7

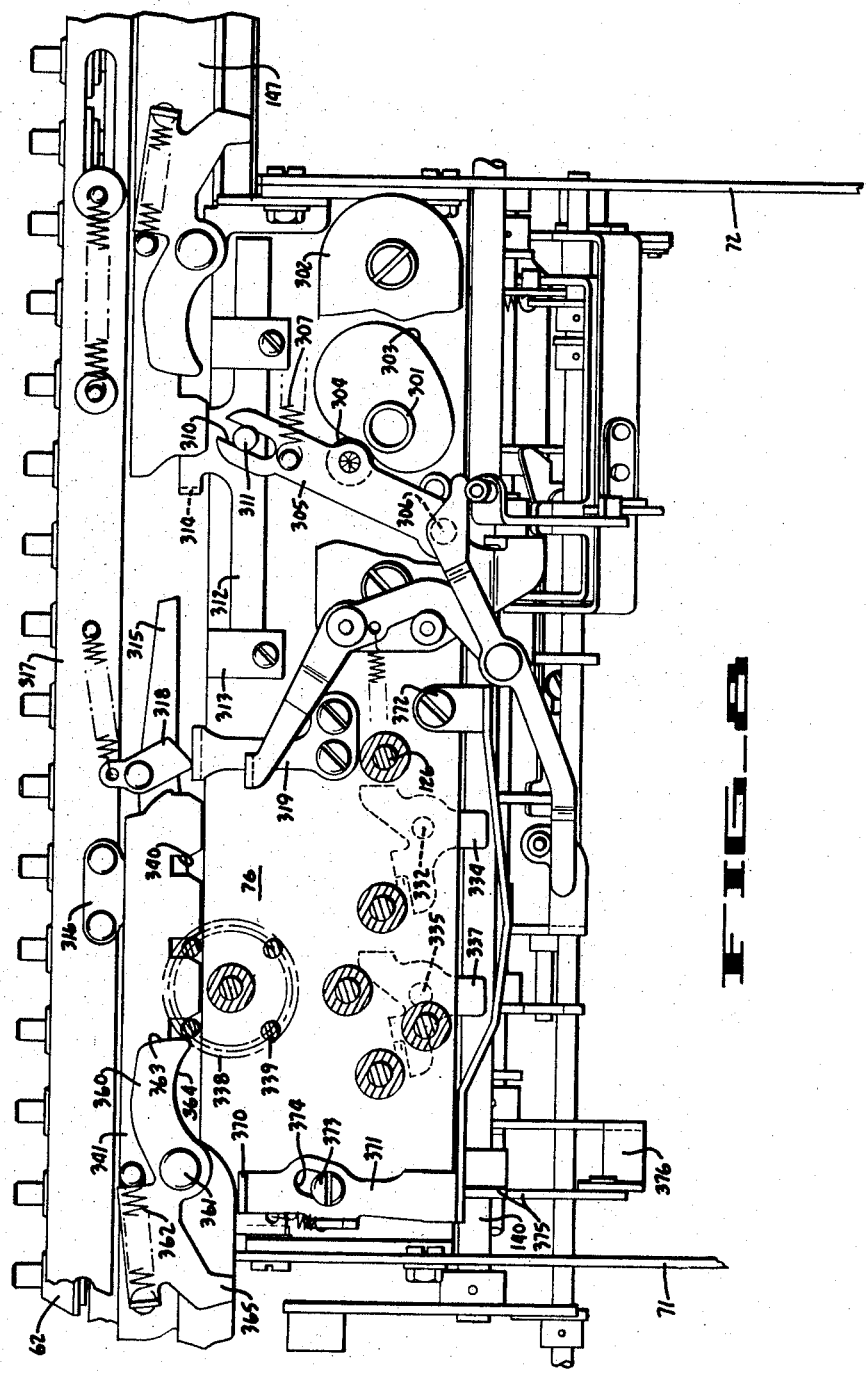

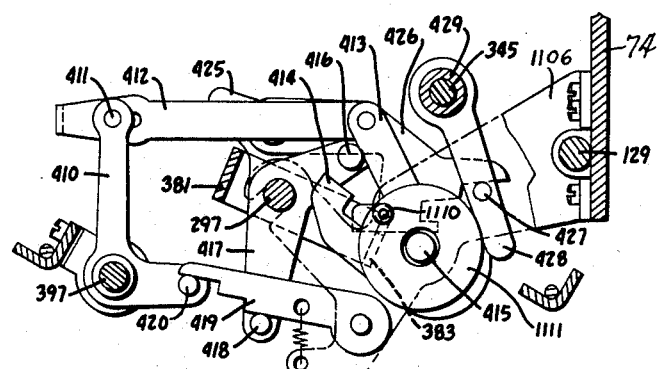
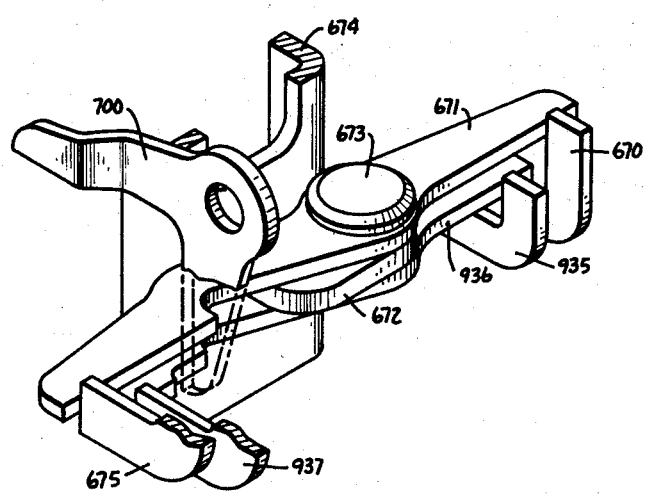

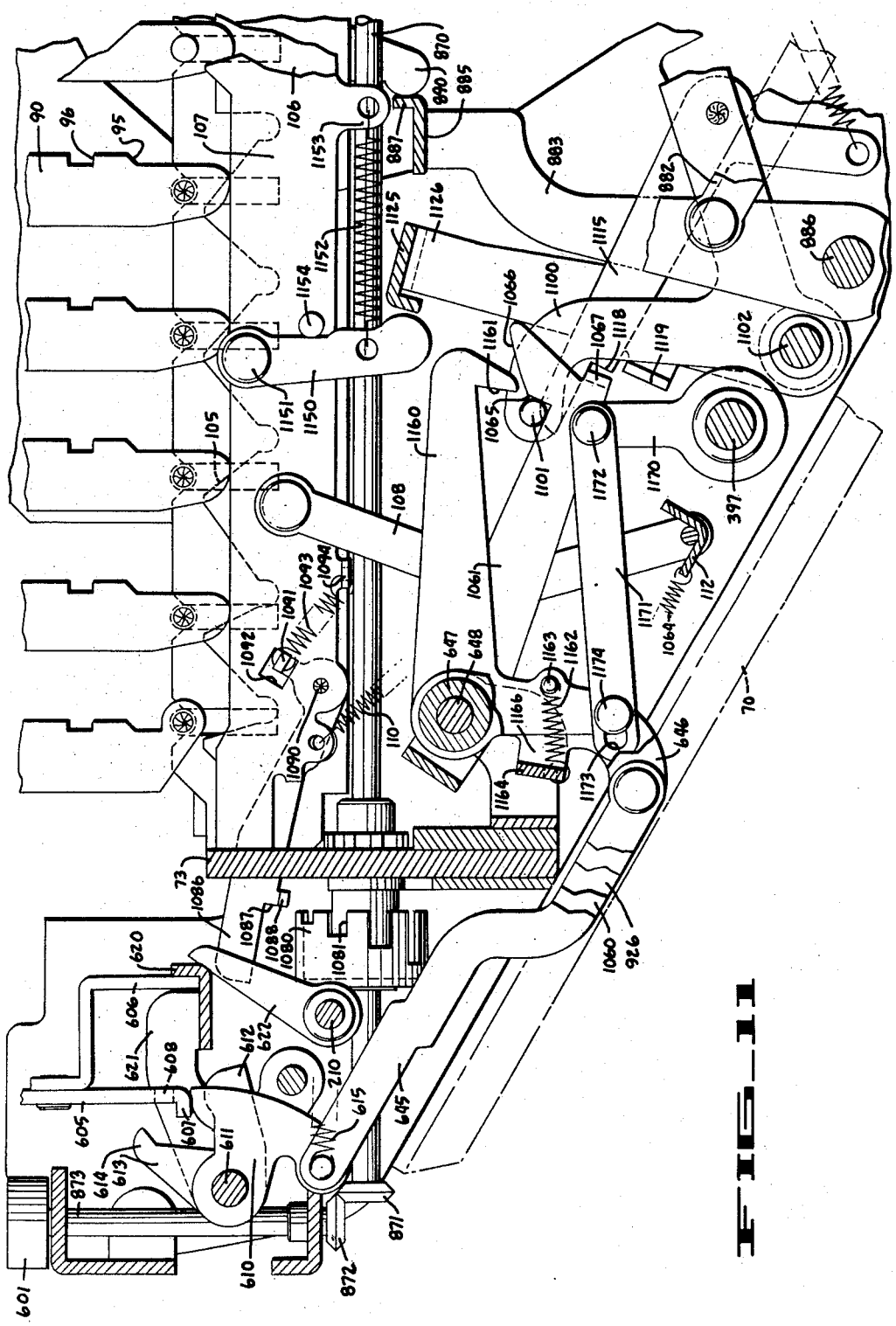

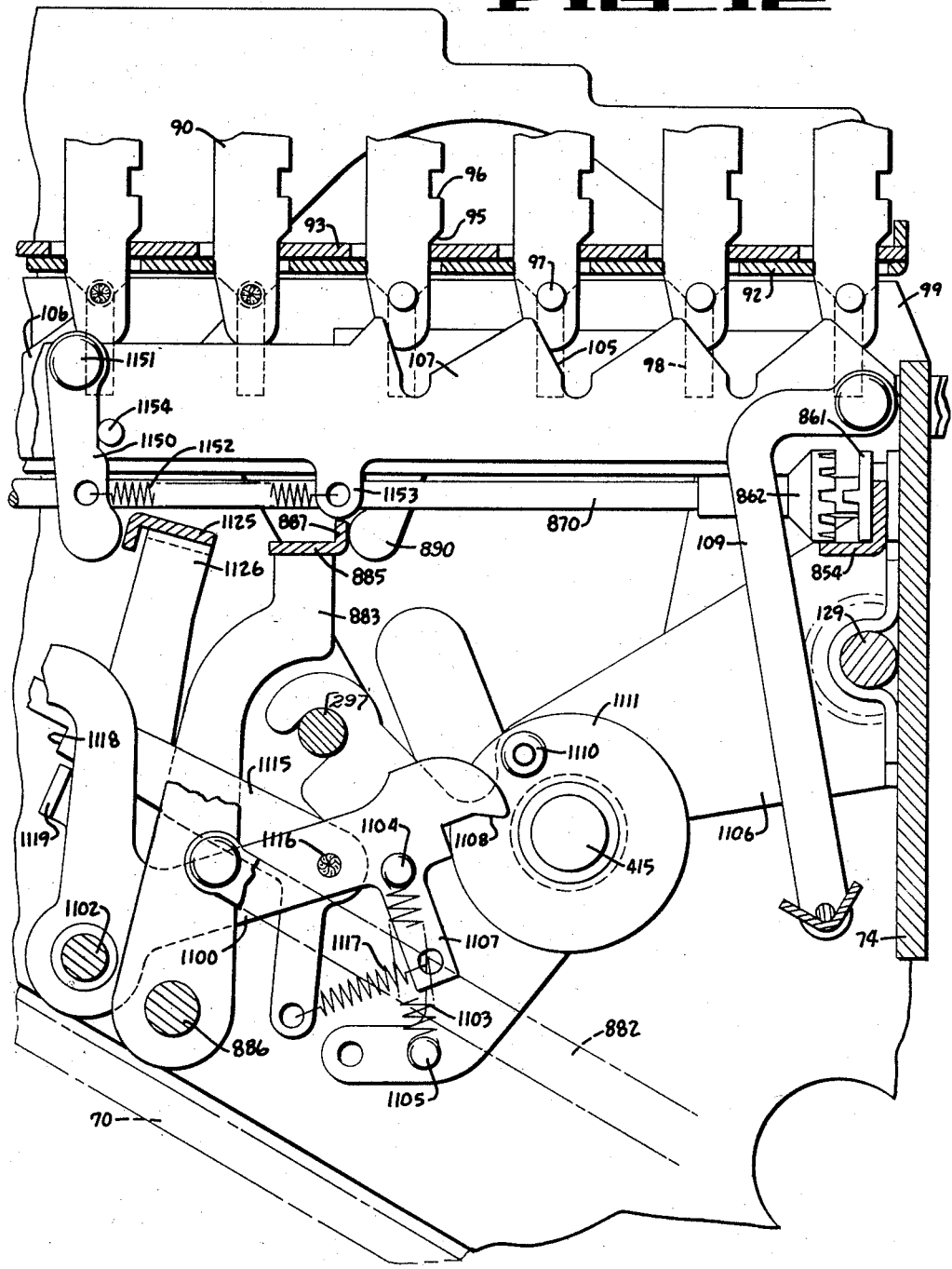

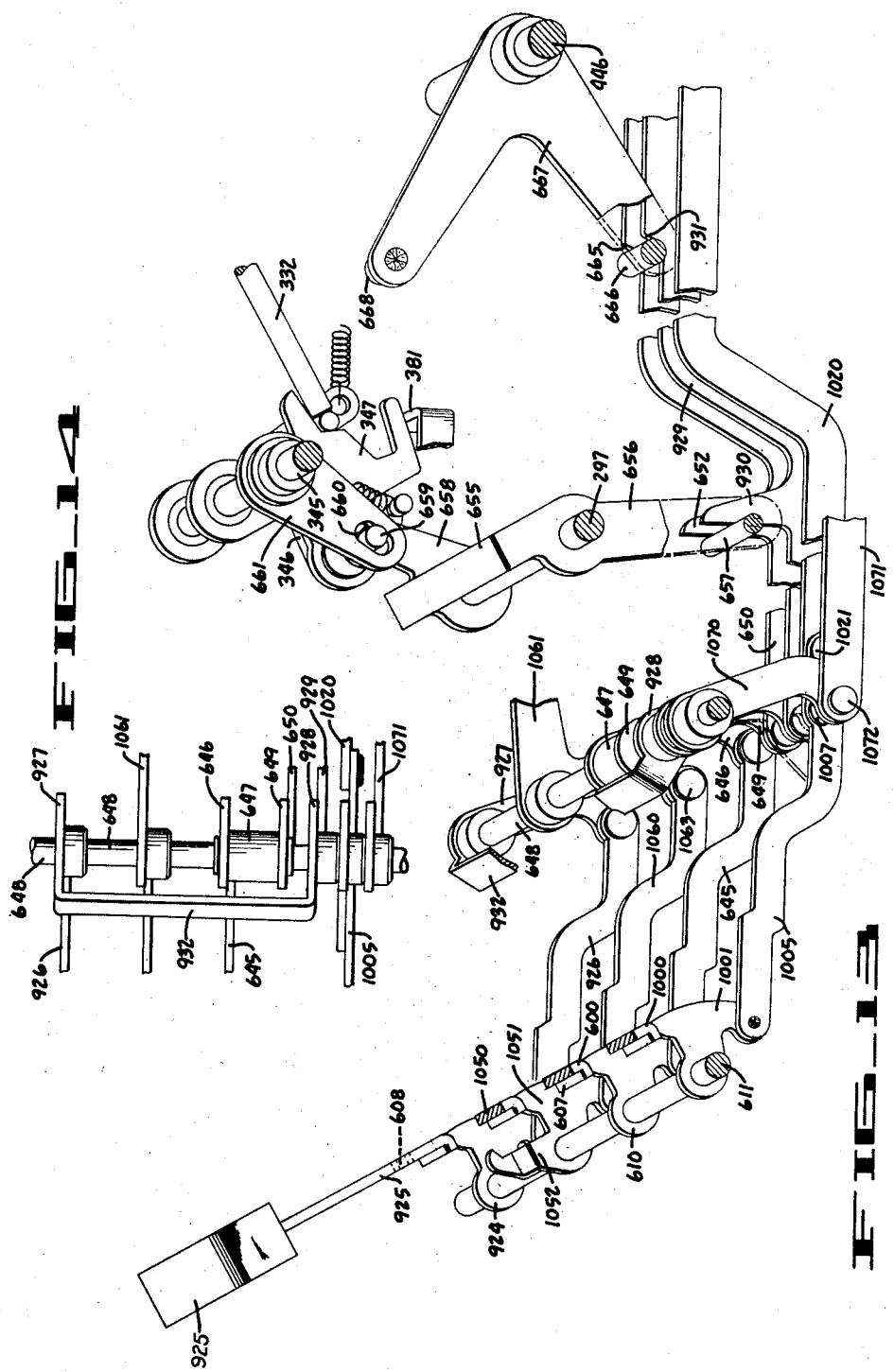

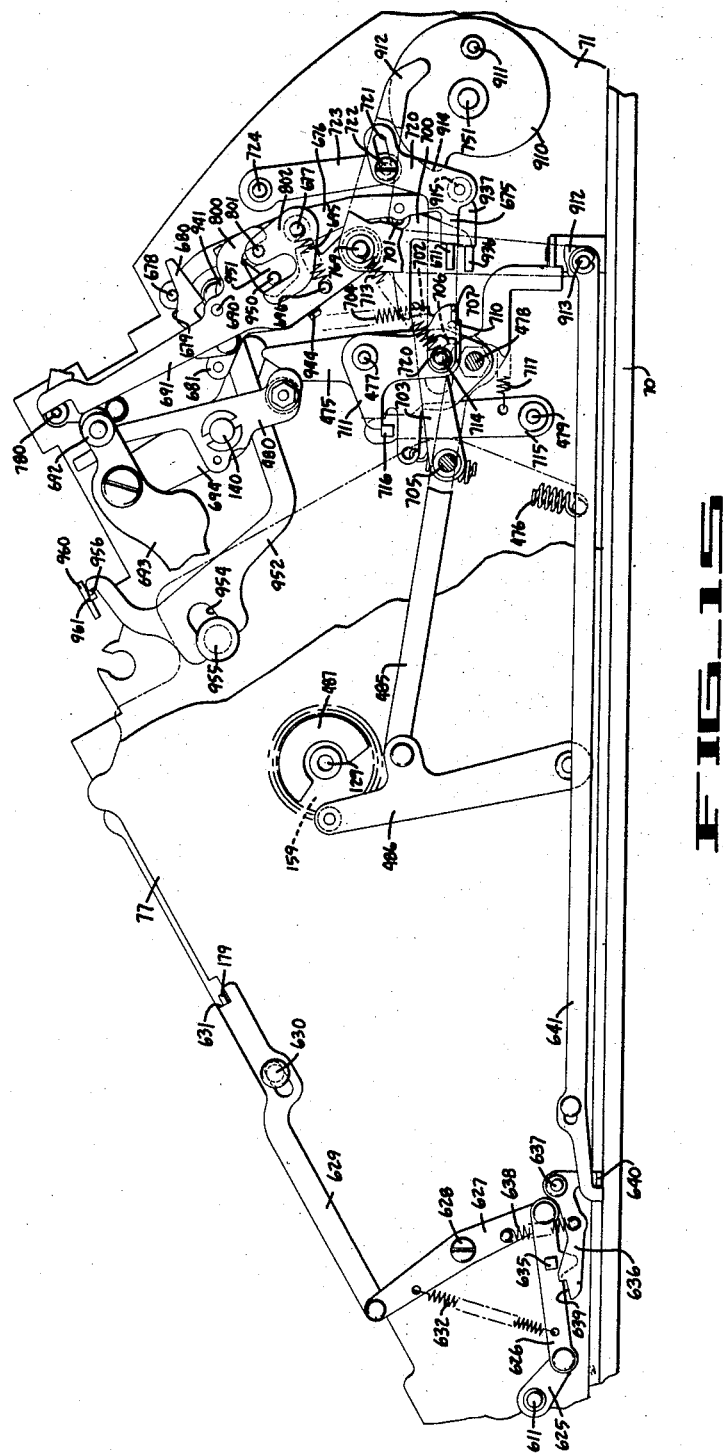

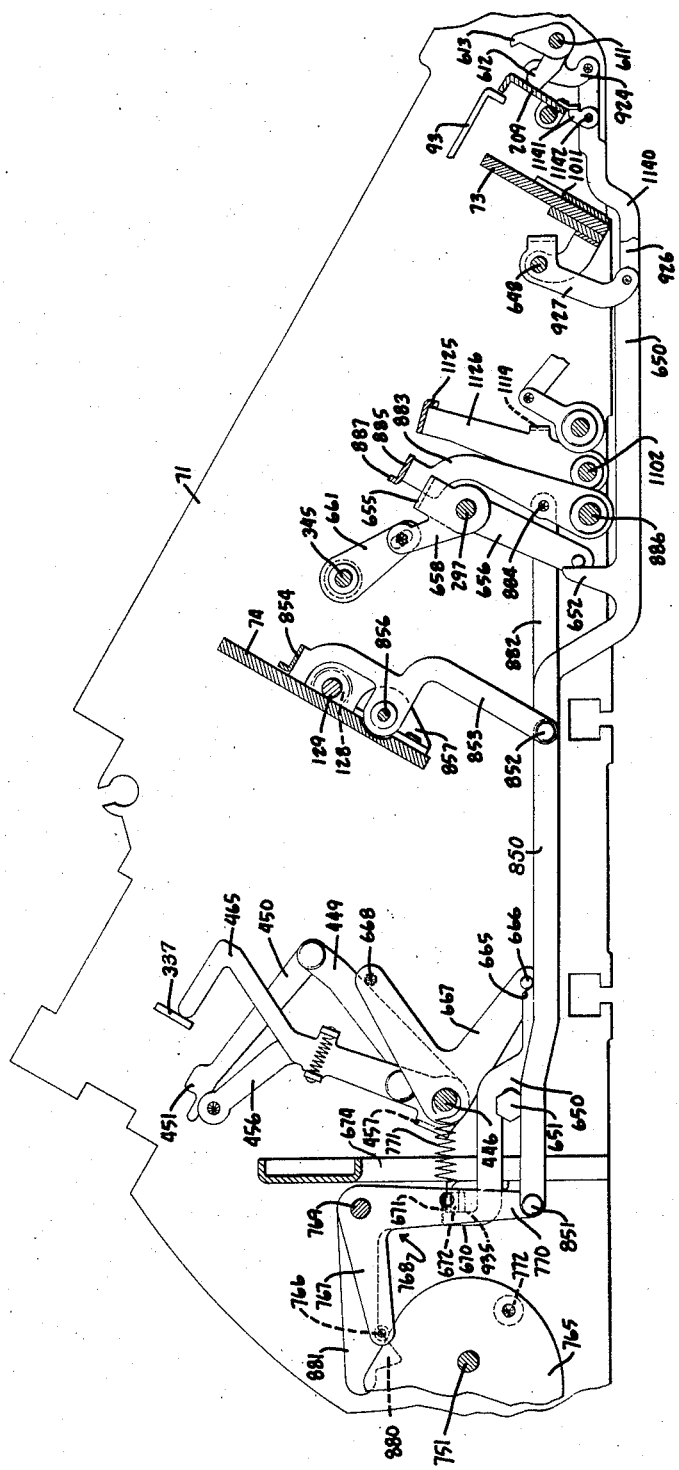

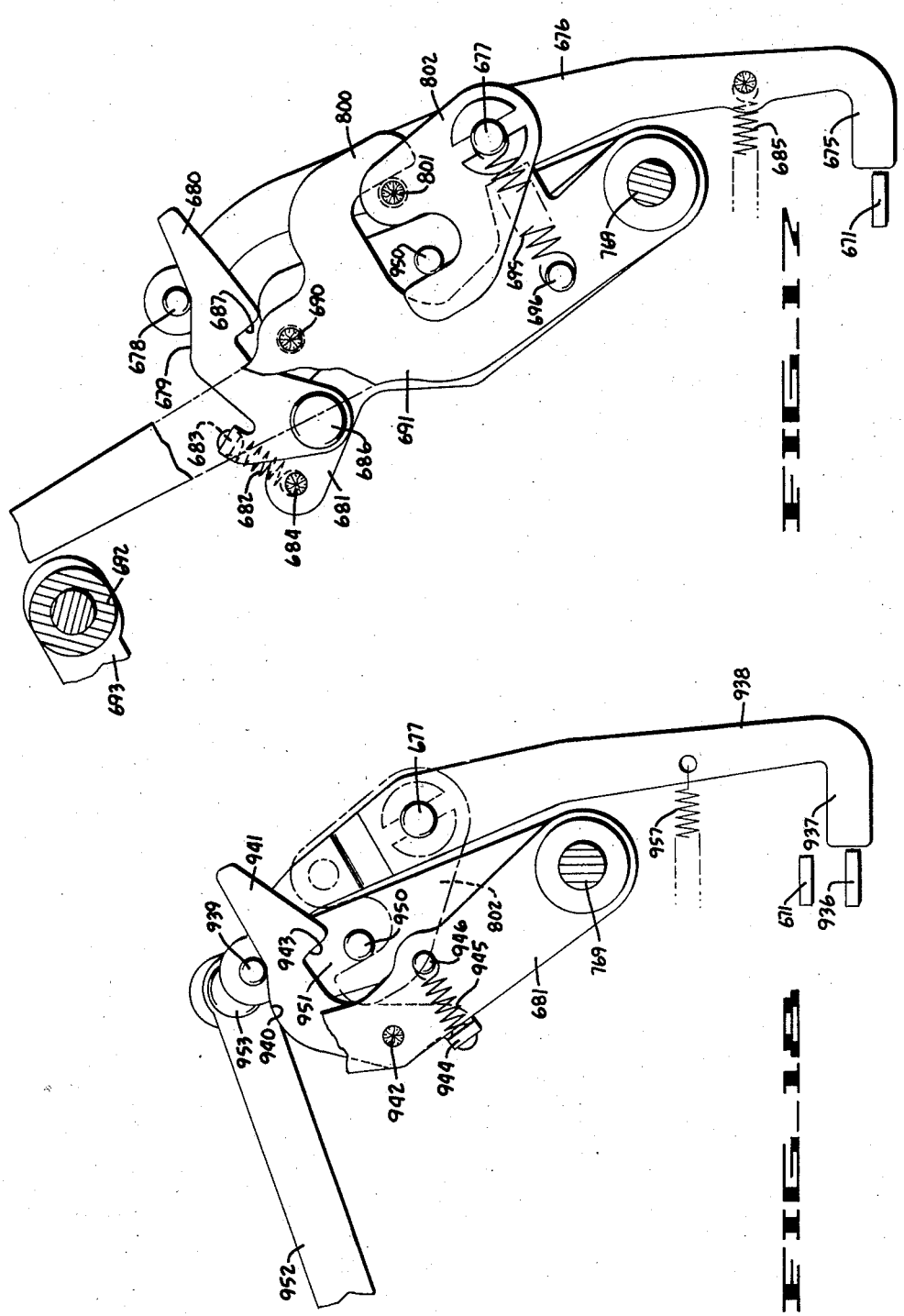

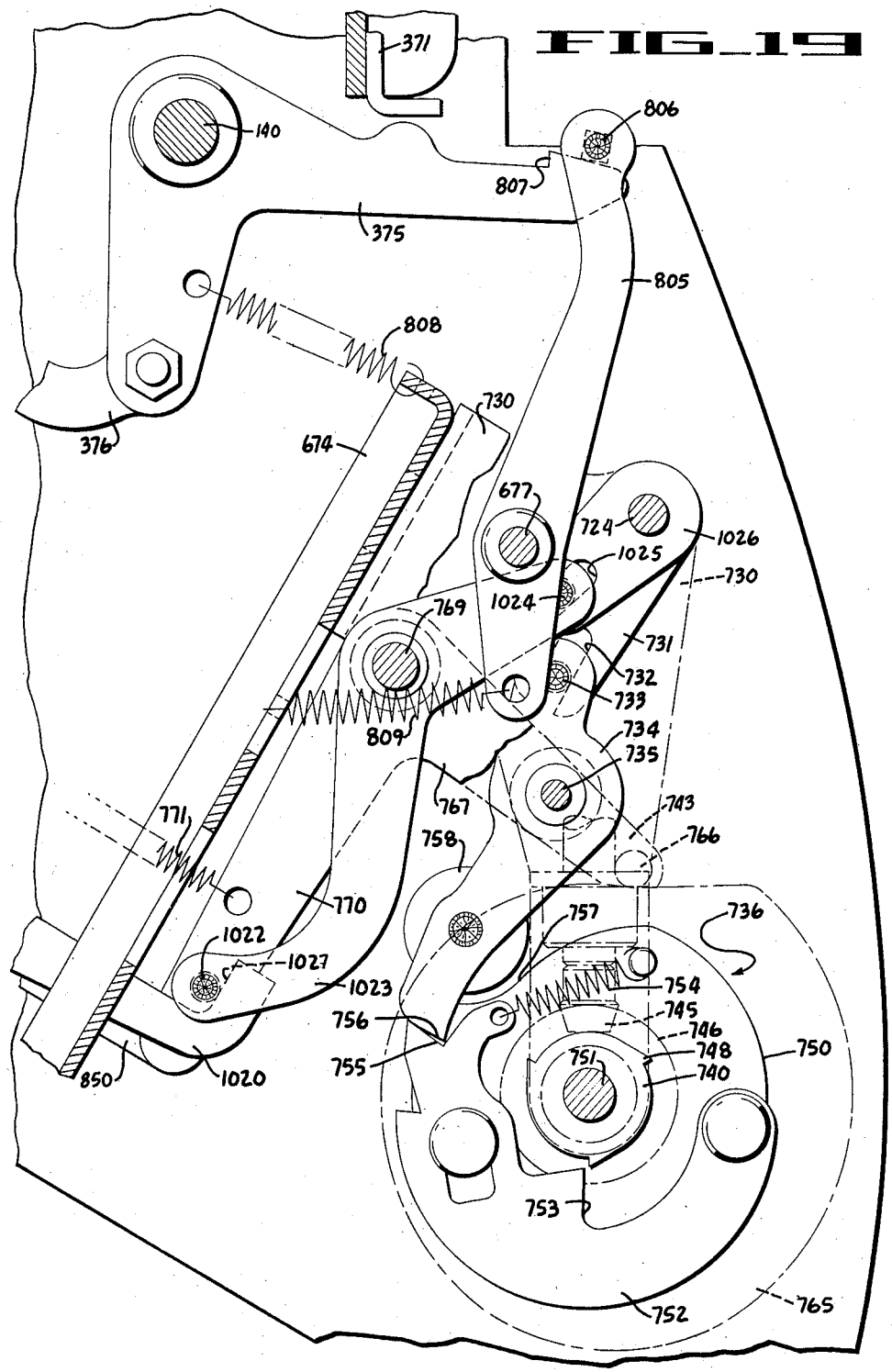

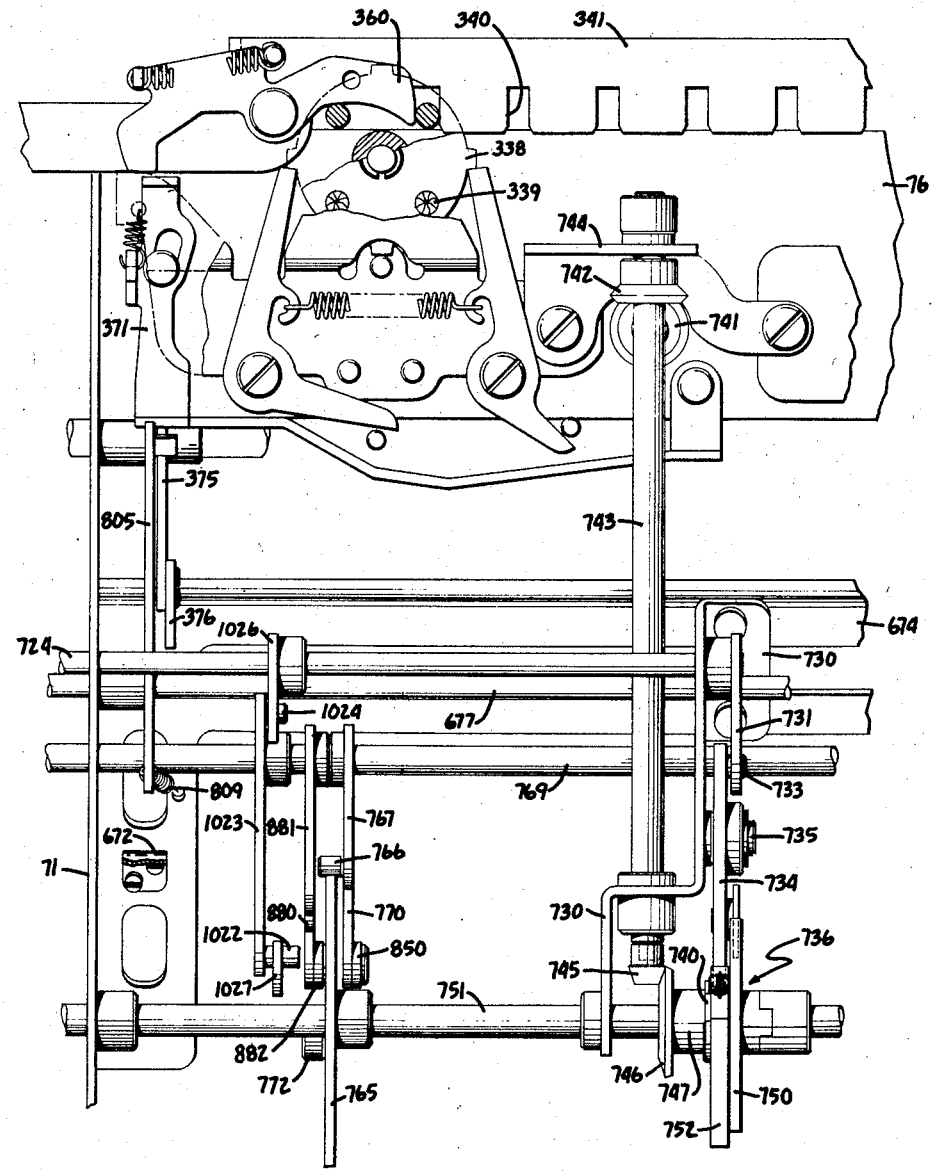
FIG_20

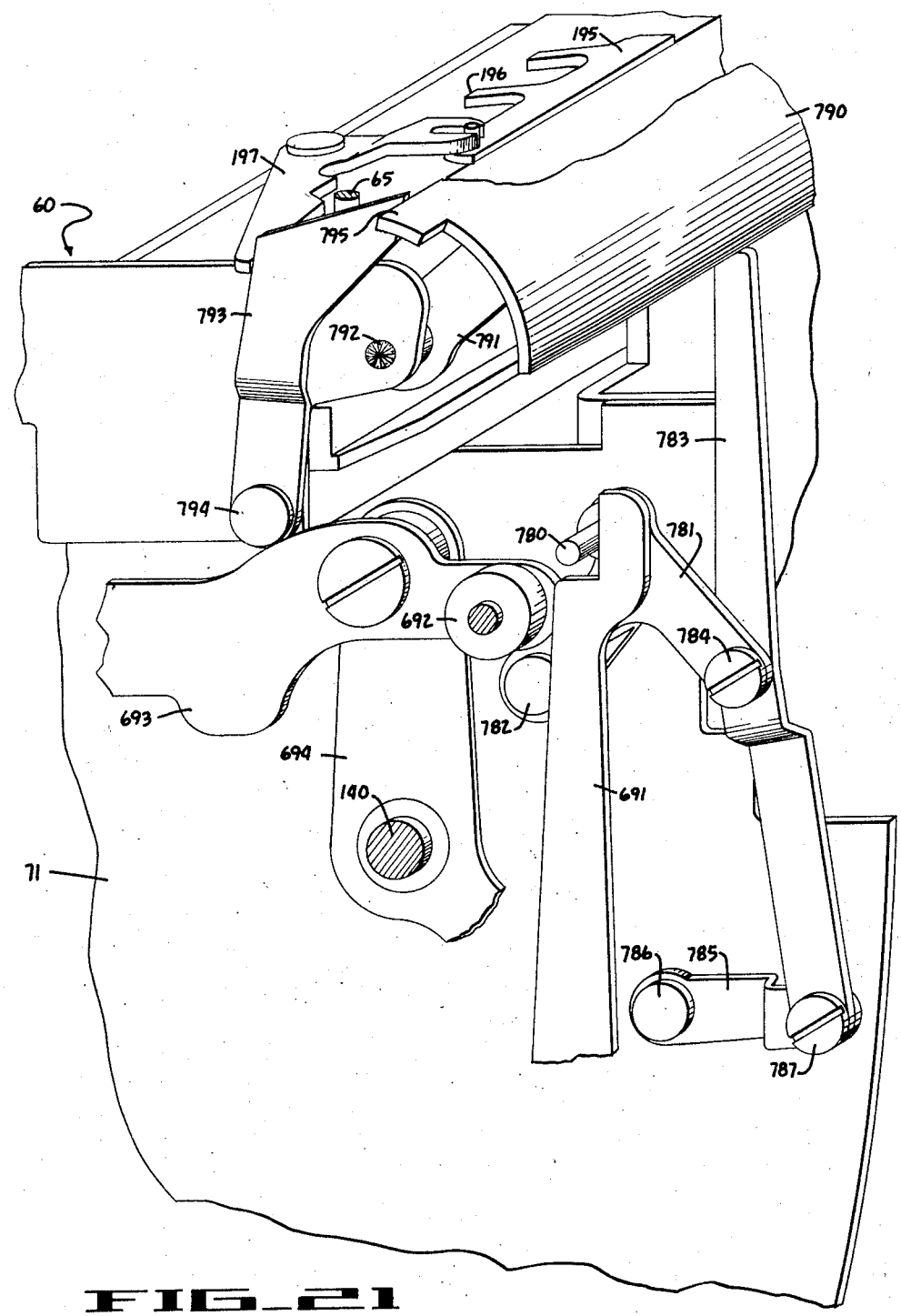
FIG_21

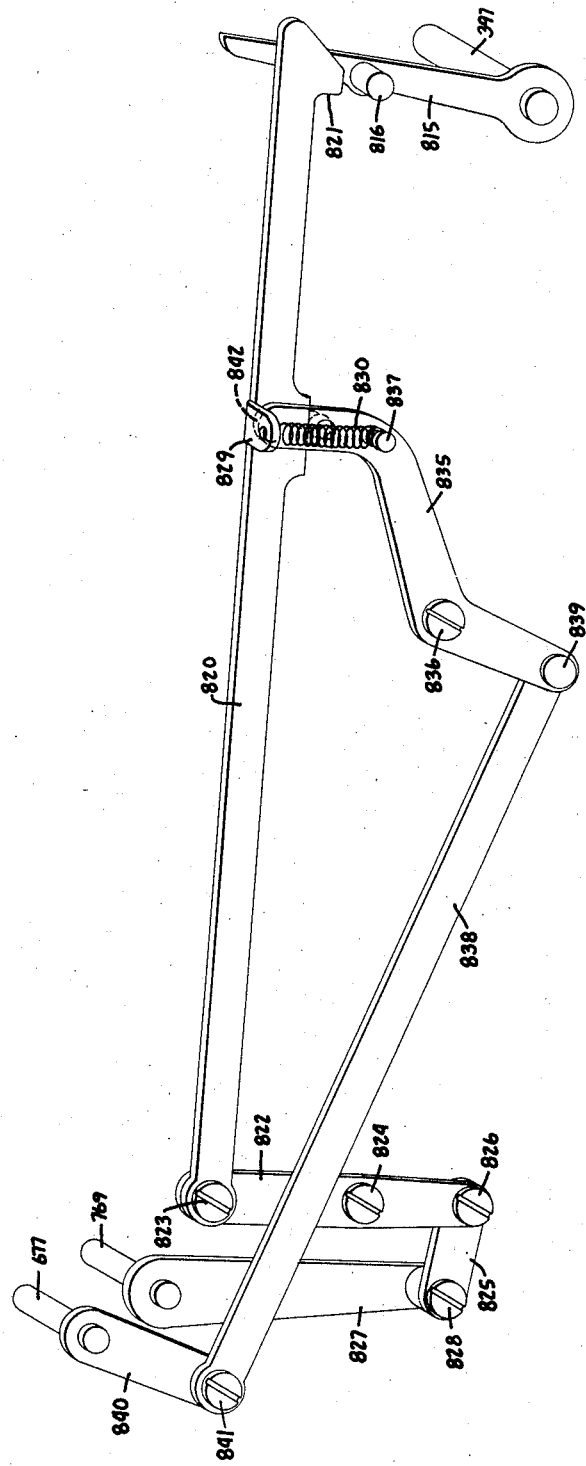

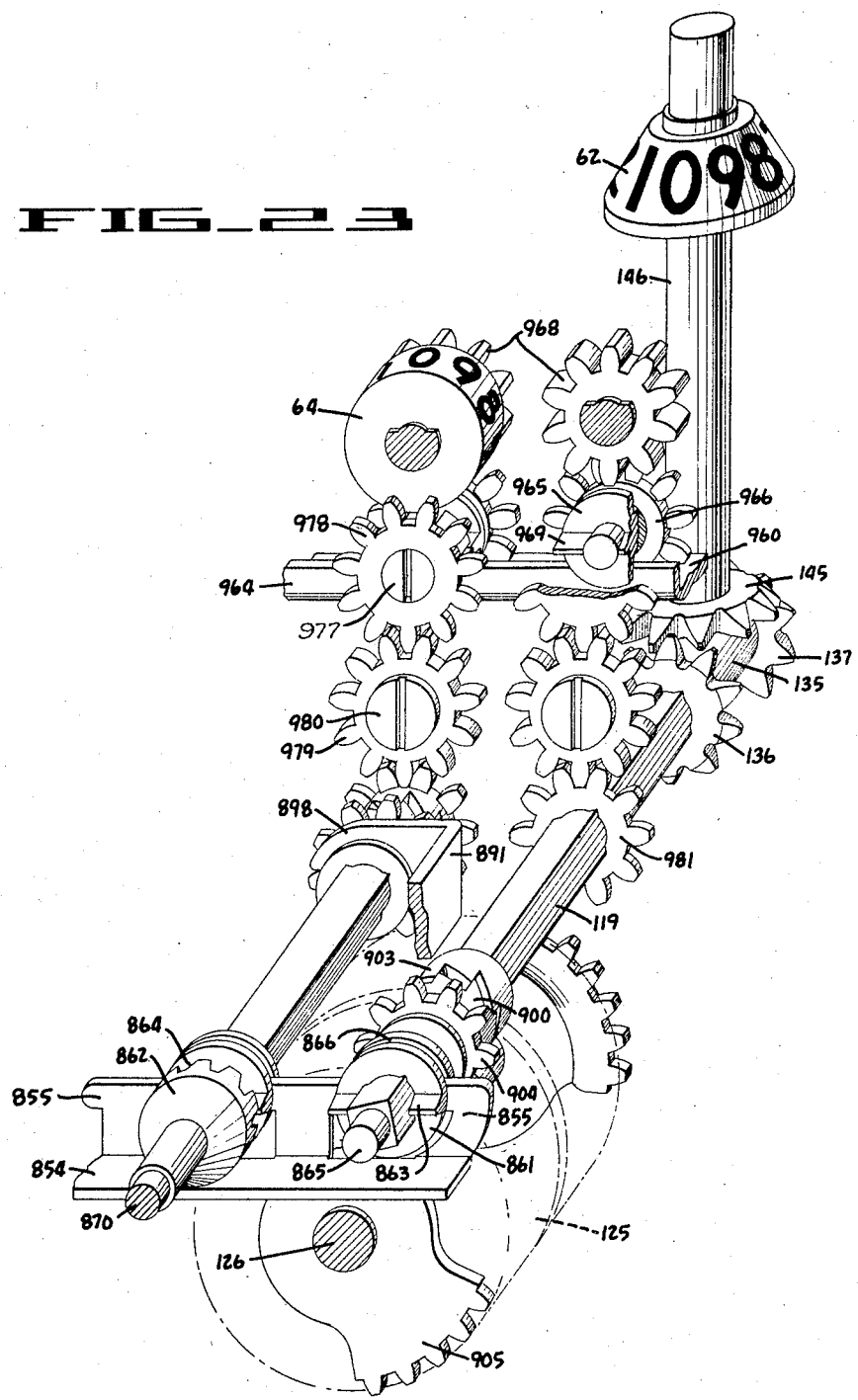

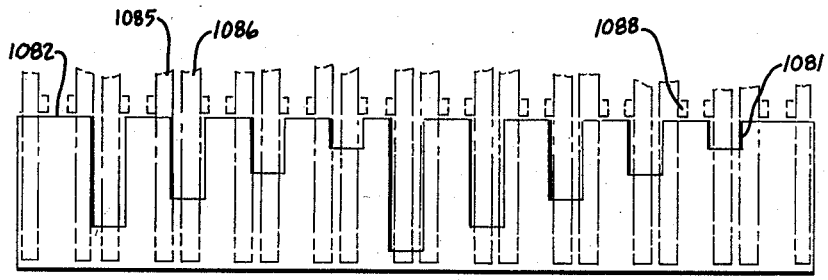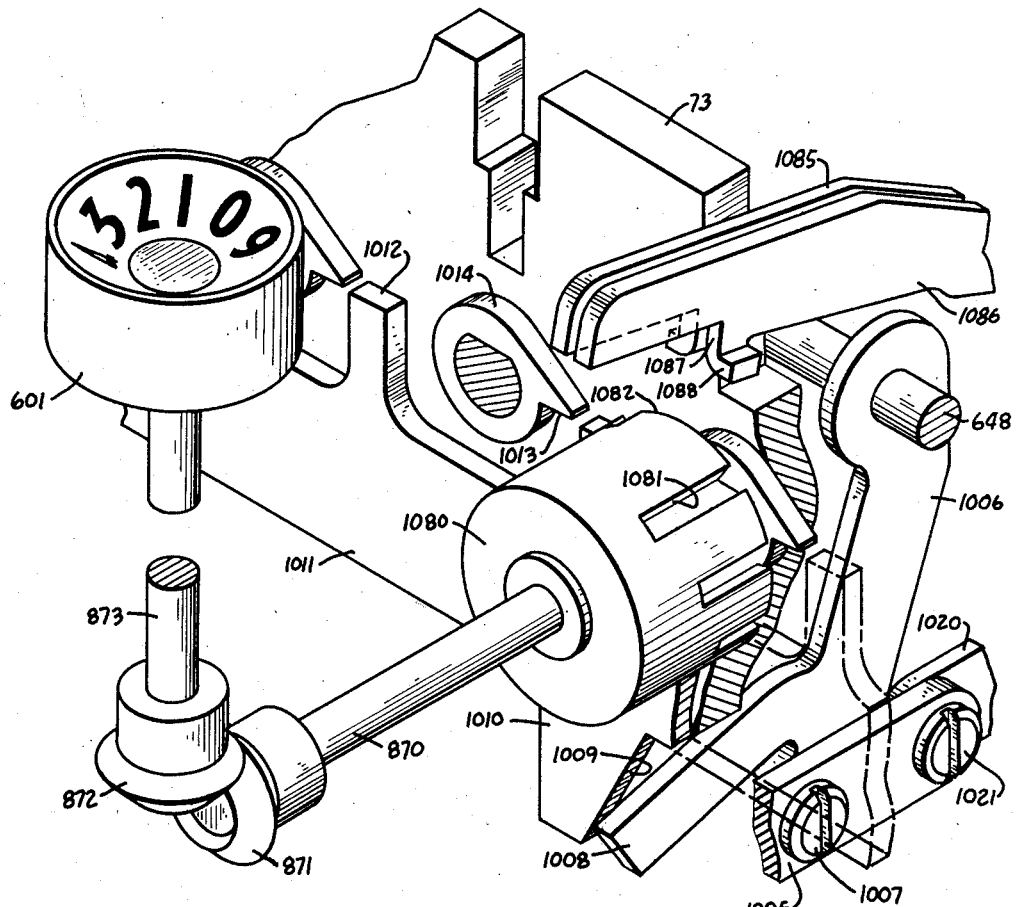

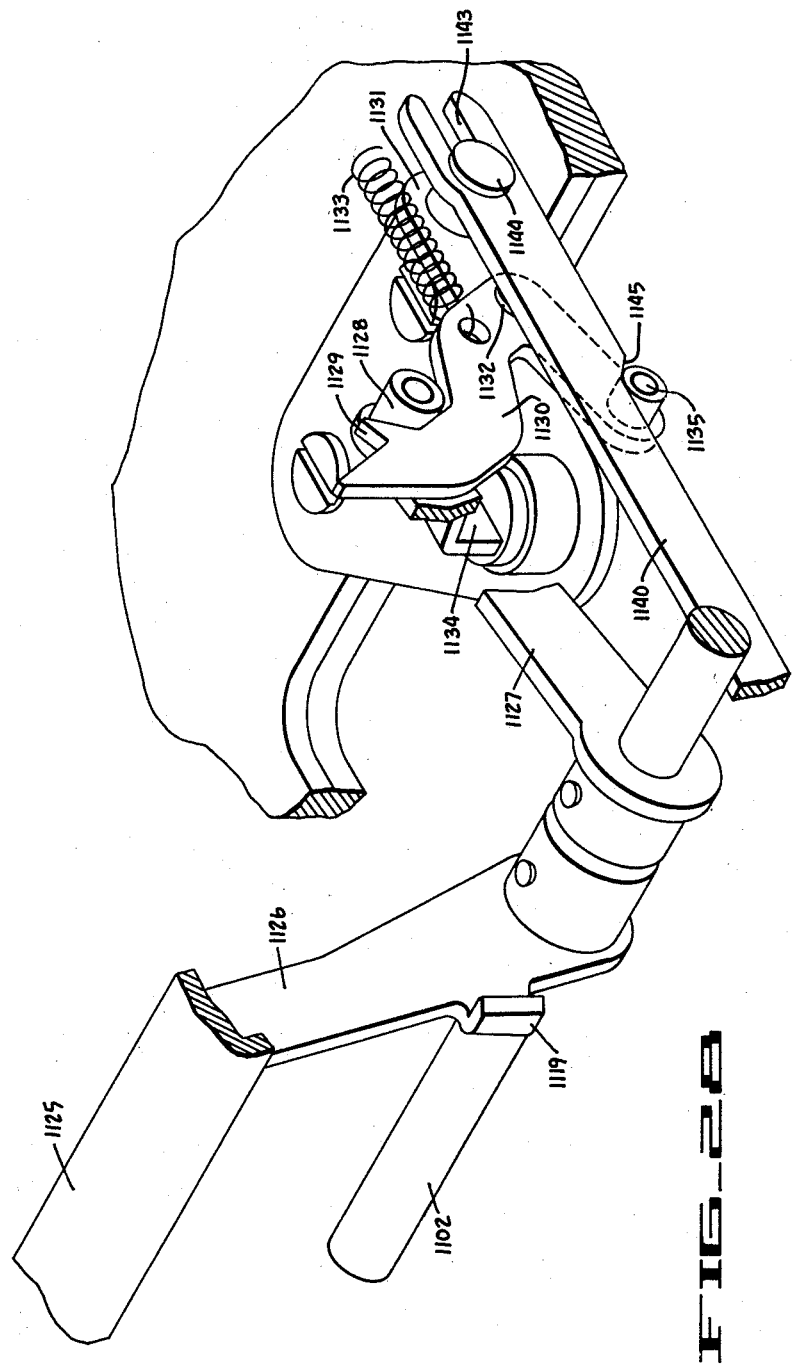

United States Patent Office 2,909,320
Patented Oct. 20, 1959

2,909,320

BACK TRANSFER MECHANISM

Arthur J. Malavazos, Oakland, Calif., assignor to Friden, Inc., a corporation of California Application August 2, 1954, Serial No. 447,143

18 Claims. (Cl. 235—63)

TABLE OF CONTENTS

| | Column |
|---|---|
| I. General Construction | 5 |
|    1. Selection Mechanism | 6 |
|    2. Actuating Mechanism | 8 |
|    3. Accumulator Register | 8 |
|    4. Drive Mechanism and Clutch | 8 |
|    5. Counter Register | 9 |
|    6. Register Clearing | 10 |
|    7. Power Clearing Mechanism | 11 |
|    8. Keyboard Clear | 12 |
|    9. "Add" Key Mechanism | 12 |
|    10. Carriage Shift | 14 |
|    11. Tabulating Mechanism | 16 |
| II. Transfer From Accumulator to Storage | 20 |
|    1. Key Mechanism | 22 |
|    2. Operate the Main Clutch and Motor Switch | 23 |
|    3. Operate Left Shift Clutch | 24 |
|    4. Condition the Tabulating Mechanism for Operation | 25 |
|    5. Disable the Dividend Entry Trigger 475 | 25 |
|    6. Transfer Drive Mechanism | 27 |
|    7. Setting Digitation Control Gate and Zero Block | 29 |
|    8. Conditions Automatic Clearing Mechanism | 29 |
|    9. Clutch Storage Mechanism to Square Shaft | 31 |
|    10. Auxiliary Drive | 32 |
|    11. Normalizing Transfer Mechanism | 35 |
|      (a) Releasing the "Transfer" Key 600 | 36 |
|      (b) Restoration of Transfer Gate 854 | 36 |
|      (c) Initiate Clearing Operation | 37 |
|      (d) Restore Auxiliary Trigger | 37 |
|    12. Operation of Product Transfer Mechanism | 37 |
| III. Counter Transfer | 40 |
|    1 and 2. Control Keys and Operating Main Clutch, etc. | 41 |
|    3 and 4. Operates Left Shift Clutch and Tabulating Mechanism | 41 |
|    5. Conditions Auxiliary Trigger 711 | 41 |
|    6. Conditioning Transfer Drive Mechanism | 42 |
|    7. Connecting Counter Dials 64 to Selection Shafts 119 and Setting Counter Zero Blocks | 42 |
|    8. Conditions Automatic Clearing Mechanism | 44 |
|    9 and 10. Set Transfer Gate and Slip Clutch | 44 |
|    11. Restoration of Elements | 44 |
|    12. Operation | 44 |
| IV. Storage Clearing | 45 |
|    1. Key Operation | 45 |
|    2. Storage Register Zero Block | 46 |
|    3. Operate Transfer Clutch | 46 |
|    4. Operation of Transfer Gate 854 and Slip Clutch Control Bail 885 | 47 |
|    5. Termination of Operation | 47 |
|    6. Operation of Storage Clearing Mechanism | 48 |
| V. Transfer From Storage to Selection | 48 |
|    1. Control Key | 49 |
|    2. Operating Main Clutch and Motor | 49 |
|    3. Value Cam | 50 |
|    4. Operation of Sensing Means | 51 |
|    5. Simultaneous Operation With Transfer Control Keys | 53 |
|    6. Operation | 54 |

This invention relates to a calulating machine, and particularly to a mechanism therefor which is operative to transfer values from one register to another and to store a factor in a manner in which it can be inserted either into a register or into the selection mechanism.

It is one primary object of the present invention to provide what is often called a "back-transfer" mechanism for a calculating machine, i.e., a mechanism which can be selectively operated to transfer a value accumulated in a register back into the selection mechanism where it can be used as a factor in a subsequent problem. One aspect of this objective is the transfer of values from the conventional accumulator, or product register, into the selection mechanism, while another aspect is the transfer of values from the counter, or quotient register, into the selection mechanism.

Another primary object of the present invention is to provide a factor storing mechanism in which a factor can be placed, either directly from the keyboard or from one of the registers of the machine, and there retained until desired by the operator—at which time it can be set into the selection mechanism and thence, in the preferred embodiment of my invention, inserted into one of the other registers of the machine, additively or subtractively, without erasing the factor from the storage mechanism unless the operator desires to erase it.

Another primary object of the present invention is to provide a mechanism by means of which a value accumulated in any of the registers can be transferred into any of the other registers of the machine. In its preferred form the apparatus of my invention provides three registers: the conventional accumulator, or product register; the counter, or quotient register; and a storage register; with transfer of values from any of the three registers into the other two, selectively.

In its preferred form the invention utilizes a calulating machine of the type disclosed in the patent to Friden, No. 2,229,889 as modified by certain other patents mentioned hereinafter. In its preferred form I add a third, or storage, register to the accumulator register and the counter register shown in that patent, and provide a mechanism whereby factors accumulated in any of these three registers may be transferred into the selection mechanism or into either of the other two registers at the discretion of the operator. Thus, I provide, in one machine, mechanism which greatly extends the usefulness of the conventional calculator, not only by adding an additional register thereto, but also providing a mechanism by which a factor accumulated in any register can be transferred into any other register or into the selection mechanism so that the factor can be used in exactly the same way as a value inserted by manual operation of the keyboard. Incidentally, the value so stored in the storage mechanism will be shown on the storage register, and can be stored there for an indefinite time, and without regard to any number of intervening operations. Another important object of the present invention, therefore, is to provide a factor storage mechanism, or constant factor device, in which a value can be stored indefinitely during an infinite number of intermediate problems, and then used to insert that factor into the selection mechanism of the machine, whenever, and as often as, the operator desires.

Another important object of the present invention is to provide a set of value indicating, or storage, dials which are operative to show the value set in the constant factor mechanism and which can be used, if desired, to store grand totals.

Another general object of the present invention is to provide a single and relatively simple mechanism which can be used for the various objects heretofore mentioned, including: (1) the transfer of a value standing in either the accumulator (product register), the counter (quotient register), or a storage register into either of the other two registers selectively, or into the selection mechanism where it can be used as a factor in a subsequent problem, and (2) to provide a constant factor mechanism by means of which any desired value may be stored for use in the selection mechanism of the machine and used whenever, and as often as, desired, at the will of the operator. This mechanism is relatively simple and readily installed in a conventional calculating machine, such as the one disclosed in the patent previously mentioned.

Another important object, or aspect, of the present invention is to provide a means for driving a back-transfer mechanism more efficiently and with less strain on conventional mechanisms. It can be mentioned that back-transfer mechanisms heretofore constructed are usually operated by clearing the particular register to "0" through the conventional clearing, or zeroizing, mechanism while the dials are connected through intermediate gearing to the back-transfer mechanism. It will be understood that, in most instances, the clearing mechanisms have been designed to clear the respective dials of a register but have not been designed to operate heavier mechanisms such as the gearing, shafts and auxiliary registers. Such back-transfer mechanisms are, relatively speaking, rather large and therefore the setting of such mechanisms through the conventional clearing devices, through inertia alone, throws a very heavy load on the conventional clearing mechanisms. In this respect, in the preferred form of my invention, I resiliently operate the back-transfer mechanism to "pull" a value out of the register dials, first blocking them against operation through the "0" position by suitable, and preferably conventional, zero stops, rather than driving the back-transfer mechanism from operation of the clearing devices.

Another and important aspect of my invention is to provide an improved slip clutch which is operative to connect the various dials to the respective transfer mechanisms, which clutches are readily operated (when the dial abuts against a conventional zero stop) to disengage the gearing which connects the register dial to the transfer mechanism, quietly and with little load on the parts.

Another important aspect of the present invention is to provide a mechanism which is operable, in an interregister or back-transfer operation, to automatically align the accumulator register with the selection mechanism, or storage dials, so that a transfer is prevented until the one register is first placed in a predetermined ordinal position with respect to the receiving mechanism, the transfer mechanism operating only after the proper ordinal position has been reached.

Another important aspect of the present invention is to prevent misalignment of the factors during a back transfer, or an interregister transfer, operation, and thus avoid erroneous transfers of values which would result if a transfer were made from the accumulator register, for example, into the storage register, or into the selection mechanism, with the accumulator register in an incorrect ordinal position.

A still further object of the present invention is to provide a modified Thomas-type actuator for a calculating machine, which actuator is provided with an auxiliary gear segment which will be operative to drive the selection mechanism of the calculating machine to return the register dial, to which the actuator is connected, to its "0" position, and to couple this auxiliary actuator with a drive clutch which readily disengages the mechanism when the ordinally related register dial reaches its "0" position.

Another important object of the present invention is to provide an improved cam for use in sensing values standing in a factor storage mechanism, which cam is particularly adapted for use with selection mechanisms using a pair of V-bars, or selection members, in each order, one bar for one portion of the keys (such as the "1" to "5" keys) and the other bar for the other values of that order (such as the "6" to "9" keys).

The present invention is concerned with these and other objects which will become apparent from a perusal of the description of the preferred embodiment of the invention which is shown in the accompanying drawings, in which:

Fig. 1 is a plan view of the machine of the present invention.

Fig. 2 is a longitudinal cross-sectional view through the actuators, accumulator and counting register mechanisms of the machine of the present invention, showing a part of the transfer mechanisms of the invention.

Fig. 3 is an enlarged plan view of the carriage, with the cover removed, showing particularly the accumulator and counter register dials and their respective zero stop mechanisms.

Fig. 4 is a perspective view of the zero stop mechanism associated with the counter register, and one means for operating it in conjunction with the operation of the mechanism of the present invention.

Figs. 5 and 5A together constitute a right side view of the frame plate of the present machine, with mechanisms mounted thereon which relate to the operation of the present invention.

Figs. 6 and 6A together comprise a left-hand view of the mechanisms mounted on the left side of the right side frame plate, showing particularly other parts of the mechanisms shown in Figs. 5 and 5A.

Fig. 7 is a plan view of certain mechanisms of the present invention, with the keyboard and cover removed so as to show certain operating mechanisms that lie below the keyboard.

Fig. 8 is a rear view of the machine of the present invention showing conventional mechanisms.

Fig. 9 is a right side view of a conventional shift-initiating mechanism associated with the present invention.

Fig. 10 is an enlarged perspective view (taken from the rear) of certain control levers associated with the present invention.

Fig. 11 is a longitudinal cross-sectional view through the forward part of the machine, showing particularly the value storage mechanisms and means for setting the selection mechanism in accordance with the value standing in the storage mechanism.

Fig. 12 is a longitudinal cross-sectional view, along the same plane as that from which Fig. 11 is taken, showing the rear portion of the mechanisms shown in Fig. 11.

Fig. 13 is a perspective view of the mechanisms associated with the keys which control the operations of a transfer of a value from the accumulator dials into the storage dials, the counter dials into the storage dials, or the clearing of the storage dials.

Fig. 14 is a plan view of a portion of the mechanisms shown in Fig. 13.

Fig. 15 is a right side view of the mechanism of the present invention, showing particularly the mechanisms of the present invention which lie on the right side of the right frame and control plates of the machine, to the right of those shown in Figs. 5 and 5A, and which, in effect, are superimposed upon the mechanisms shown in Figs. 5 and 5A.

Fig. 16 is a left side view of the frame plate, to the left of those shown in Figs. 6 and 6A, showing mechanisms related to the present invention, and which, in effect, are superimposed upon the mechanisms shown in Figs. 6 and 6A.

Fig. 17 is an enlarged detail of a portion of the control mechanism shown in the right-hand portion of Fig. 15, and shows particularly the means for controlling the transfer of a value from the accumulator register to the storage mechanism.

Fig. 18 is an enlarged detail of a portion of the control mechanism shown in the right-hand portion of Fig. 15, and shows particularly the means for controlling the transfer of a value from the counter register into the storage mechanism.

Fig. 19 is a longitudinal cross-sectional view of the power-driven mechanism which controls the transfer operations above noted, showing particularly the transfer control clutch and means for operating the same.

Fig. 20 is a rear view of the mechanism of the present invention, in effect being a view superimposed over that of Fig. 8, and showing particularly rear views of the mechanisms shown in Figs. 16 and 19.

Fig. 21 is a perspective view of a portion of the mechanism associated with the transfer of a value from the accumulator register into the storage mechanism, and particularly the means for setting the digitation control gate for subtractive operation and the zero blocking mechanism of that register.

Fig. 22 is a left side view of certain mechanisms on the left side of the machine, showing means for initiating a shifting operation of the carriage which precedes transfer operations and clearing of the registers subsequent to the transfer.

Fig. 23 is an enlarged perspective view of the accumulator and counter registers and the gearing by which they can selectively be connected to the storage mechanism.

Fig. 24 is an enlarged perspective view of the storage dial and storage, or value, cams associated with the present invention.

Fig. 25 is a development of the storage cam shown particularly in Fig. 24.

Fig. 26 is a detail view of means for setting the slip clutches which drive the actuating mechanism in transfer operations.

Fig. 27 is a detail of latches associated with the setting of a value standing in the storage mechanism into the selection mechanism.

Fig. 28 is a perspective view of operating means associated with the mechanism for transferring values standing in the storage mechanism into the selection mechanism.

I. GENERAL CONSTRUCTION

The present invention is applied, for purposes of exemplification, to a calculating machine of the general type shown and described in the patent to Carl M. F. Friden, No. 2,229,889, issued January 28, 1941. This basic construction has been modified and improved by the patent to C. M. Friden et al., No. 2,403,273, issued July 2, 1946, relating to the automatic tabulation of the carriage with respect to the selection mechanism and incidentally showing the basic form of "add" key mechanism used in the present "Friden" calculating machine; the patent to Carl M. F. Friden, No. 2,310,281, issued February 9, 1943, relating to the automatic clearing of the registers, sometimes referred to generally as the "return-clear" mechanism; and other patents not here pertinent. However, the invention is not limited to incorporation in that particular machine as it can be incorporated in, or applied to, other commercial calculating machines on the market. It, therefore, should be understood that the machine shown in the accompanying drawings and described herein, is for purposes of exemplification only, and that the invention is not limited thereto.

It is conventional for calculating machines to comprise a frame, or body portion, 50 (Fig. 1) upon which is mounted a register carriage 60, the latter being ordinally shiftable in either direction with respect to the body portion 50. The body portion 50 generally supports the keyboard including the value keys 51 and various control keys, such as plus bar 52; subtract key 53; "add," or single cycle, key 54; automatic tabulation control key 55; the keyboard clear key 56; the carriage, or register, clearing key 57; left shift key 58; and right shift key 59. The carriage contains a plurality of ordinally arranged windows 61, through which are viewable the accumulator, or product register, dials 62; and another series of ordinally arranged windows 63, through which are viewable the counter dials 64. In the machine with which my invention is preferably associated, the carriage also carries a pair of manually operated clear knobs 65 and 66 for clearing, or zeroizing the accumulator register and the counter, or quotient register, respectively. Preferably, also, the carriage will mount a plurality of ordinally arranged tabulator buttons 67 which control the ordinal position to which the carriage will be automatically shifted in certain operations, as will hereinafter be described.

The operating mechanism of the machine is, for the most part, supported within the main frame, or body portion, 50 which frame includes a base 70 (shown in phantom in Figs. 11 and 12), right and left side frames 71 and 72 (Figs. 2, 7 and 8) which are secured to the base 70. The side frames 71 and 72 are interconnected and braced by a front crossbar 73 (see Figs. 11 and 24) and crossbars, or members, 74, 75 and 76 adjacent the back of the machine (see Figs. 2 and 7). Most of the operating parts are mounted upon this frame portion, and particularly upon the side frames 71 and 72. To the right of the right side frame 71 is an auxiliary, or control, plate 77 (see Fig. 15), upon which are mounted most of the control keys and their related mechanisms which are found on the right side of the machine.

It can be mentioned that, for the sake of brevity, many mechanisms which are conventional in machines of this kind (such as the multiplying mechanism, the division mechanism, and the like) which are not pertinent to the mechanism of the present invention, are not described herein. Those parts which are conventional and which are indirectly related to the operation of this machine, will be described as briefly as possible, while those mechanisms which are directly related to the operation of my invention, will be described more in detail. It will be understood, therefore, that I assume that my invention will be associated with fully automatic calculating machines which have conventional features such as those mentioned, but that, for the sake of brevity, I will limit my description of conventional elements to those which directly or indirectly relate to the operation of my mechanism.

*1. Selection mechanism (see Figs. 2, 11 and 12)*

The value keys 51 are mounted on the tops of key stems 90 which are slidably supported in slots in a pair of keyboard plates 91 and 92 and are biased to a raised position by suitable spring means, not shown. It will be understood that the keys, and their key stems, are arranged in longitudinally extending ordinal rows and in transversely extending value banks, as shown in Fig. 1. A manually operated, or depressed, key stem 90 is latched in its operative position by a conventional latching means which can comprise a latching slide 93 associated with each order of the keyboard. In the conventional machine with which my invention is associated, the latching slides 93 are provided with a plurality of apertures 94 through which the key stems extend, the latching slide being biased to a forward position by a suitable spring, not shown. The key stem 90 is provided with a rearwardly extending cam face 95 above which is located a latching notch 96. Thus, the depression of a key stem 90 will cause the cam 95 to force the latching slide rearwardly against the bias of its spring until the key stem has been depressed sufficiently to cause the notch 96 to register with the latching slide, whereupon the latch springs to its forward position, thereby holding the key stem depressed. Whenever a latching slide is moved rearwardly by the depression of another key in that order, or by operation of any of the keyboard clearing means, the slide 93 releases the notch 96, whereupon the key stem is snapped to its raised position by the force of its biasing spring.

The lower end of each key stem carries a stud, or pin, 97 which engages a guide slot 98 in an ordinally associated guide plate 99 (as fully explained in the patent of Arthur J. Malavazos, No. 2,828,918) and is also adapted to engage a differentially angled cam face 105 of a selection, or V-notch, bar. It is conventional in the machine with which my invention is embodied, to provide a pair of selection bars 106 and 107, the former serving the "1" to "5" keys of that order, and the latter the "6" to "9" keys. The pair of bars is preferred to a single one in order to avoid excessive angles on the cam faces 105 which are necessary when the cam faces represent nine different values. These selection bars 106 and 107 are supported on supporting arms 108 and 109, and are biased to a rearward, inoperative position by a suitable spring, such as spring 110 shown in Fig. 11. It is obvious that the depression of a value key 51 causes the pin 97 on its key stem 90 to engage the corresponding cam face 105 and, due to the differential angularity of the respective cam faces 105, to translate the selection bar 106 or 107 forwardly a differential amount.

The selection bars 106 and 107 extend rearwardly (to the right in Fig. 2) and are provided at their rearward extremities with perpendicularly formed yokes 115 and 116, respectively. The yokes engage annular slots formed in the collars of selection gears 117 and 118, respectively, the gears being slidably but nonrotatably mounted on a longitudinally extending selection, or square, shaft 119 journalled in the crossbars 74, 75 and 76. Thus the depression of a value key, by translating one or the other of the slides 106 and 107, moves the corresponding selection gear 117 or 118 longitudinally on square shaft 119 a differential amount corresponding to the value of the key operated.

The rear end of the square shaft 119 carries a digitation control spool 135 slidably but nonrotatably mounted thereon. The forward end of the spool 135 carries an addition gear 136 and the rear end carries a subtraction gear 137, the spool and the two gears forming an integral assembly. The two gears 136 and 137 are adapted to register with the ordinally related accumulator gear 145 when the spool 135 is displaced from its central position shown. The spools 135 can be moved to either operative position by means of a gate 138 extending transversely across the machine and lying between the two integral gears 136 and 137. The gate 138 is preferably mounted on a pair of arms 139 which are rigidly secured to a digitation control shaft 140 (see Figs. 6, 8 and 21). Normally, the assembly comprising the shaft 140, arms 139 and gate 138 is held in the intermediate, or neutral, position by means of a centralizer 141, shown in Fig. 5. However, various controls, some of which will be mentioned hereafter, are effective to rock the shaft 140 and consequently displace the digitation control spool 135 forwardly or rearwardly as the operation demands, thereby operatively connecting the accumulator gears 145 to either the plus gears or the minus gears 136 or 137, and thus driving the accumulator gears 145 incremental amounts by means of the differential rotation of the selection gears 117, 118.

2. Actuating mechanism (Fig. 2)

The actuating mechanism of the machine shown is the well-known Thomas-type, which comprises stepped drums 125 mounted on shafts 126 parallel to the square shafts 119. Forward translation of either of the selection gears 117 or 118 causes them to lie in the path of travel of a number of teeth on the associated actuator drum 125 corresponding to the value key 51 depressed, upon rotation of the drums 125. The actuator shafts 126 are driven through miter gears 127 thereon, each of which meshes with a corresponding miter gear 128 on the power shaft 129. The main power shaft 129 is given a complete cycle of rotation with each machine cycle, thereby rotating the actuators 125 a complete revolution and consequently giving the selection gears 117, 118 and square shaft 119 increments of motion depending upon the longitudinal position of the selection gears.

It is conventional to mount two actuator drums 125 on a single shaft 126, the shaft 126 lying between and below each pair of square shafts 119. In such a construction, one pair of selection bars 106, 107 will have their yokes and the corresponding selection gears toward the rear, thereby being driven by the rearward actuator 125, while the adjacent pair will have their yokes and selection gears lying forwardly and thus driven by the forward actuator drum. Thus, in plan view, the pairs of selection gears will have a staggered arrangement across the width of the selection mechanism.

It is conventional, in machines of this kind, to provide a Geneva stop for the square shaft 119 so angularly disposed on the square shaft as to positively stop rotation thereof at the termination of digitation. It is customary in these machines to start the ordinal digitation operation of the values differentially, in the reverse order, and to stop digitation of all values in an order simultaneously. Thus, a single Geneva wheel and Geneva block will afford positive stopping action of the square shaft, and consequently the register dials 62 at the end of digitation. For this purpose it is conventional in machines of this kind, to provide the actuator shaft 126 with a Geneva wheel 120 and to provide a Geneva block 121 on the square shaft 119.

3. Accumulator register (Fig. 2)

An accumulator register, containing a series of ordinally arranged register dials 62, is mounted in the shiftable carriage 60. In the machine shown in Fig. 1, the accumulator register contains twenty such dials 62 for a selection mechanism of ten orders. The various ordinal assemblies in the register comprise the dial 62 and the accumulator gear 145 mounted upon a dial shaft 146. Preferably, the dial shaft is journalled in a hollow frame bar 147 which forms the main frame of the carriage 60. The differential rotation of the square shaft 119 (caused by the longitudinal translation of the selection gears 117 or 118 and the rotation of the actuators 125) is thus effective to rotate the dials 62, through the gearing 136 or 137, and the accumulator gear 145.

It can be mentioned that there is a tens-transfer mechanism between the various orders of the register, but as this mechanism has no relation to the present invention it will not be described—reference being made to the above-mentioned patent to Friden, No. 2,229,889, for a detailed description of this mechanism.

4. Drive mechanism and clutch (Fig. 5)

The various mechanisms of the machine, including the actuator shafts 126, are given cycles of operation as required, being driven by an electric motor, not shown. The armature shaft of the motor is conventionally connected to a short shaft 155 by a conventional flexible coupling. The shaft 155, as shown in Fig. 5, extends through the frame plate 71 and at its outer end carries a gear 156 secured thereto. The gear 156 meshes with a larger idler 157, the latter gear being rotatably mounted on a transverse shaft 158. The idler, in turn, meshes with a larger gear 159 which is rotatably mounted on the power shaft 129. The gear 159 forms the driving side of a conventional clutch 160, the driven plate 161 of which is rigidly secured to the drive shaft 129. The operation of the clutch is controlled by a clutch pawl 162 which is pivotally mounted on the frame plate by any suitable means, such as flathead screw 163. Whenever the clutch pawl 162 is rocked (clockwise in Fig. 5) it releases a clutch dog 164 which is then spring-biased into engagement with a ratchet, not shown, to cause engagement of the clutch. Preferably, the clutch is provided with a full-cycle control which may include a roller 165 mounted on the clutch pawl 162 and riding on the periphery of the disk 161, which roller, in the full-cycle position, lies in a depression in the periphery of the disk.

In the conventional machine with which my invention is preferably associated, the clutch pawl 162 is operated by a link 170, the rear end of which is pivotally connected to the upper end of the clutch pawl. The forward end of the link is pivotally mounted on the upper end of a two-armed lever 171, which is pivotally mounted on the frame plate 71 by any suitable means, such as flathead screw 172. A pin 173 riveted, or otherwise rigidly secured, to the lower end of the lever 171, extends through an aperture in the frame plate in order to support the forward end of a long switch control link 174. Thus, the clutch pawl 162 and the switch control lever 174 are operated in unison to simultaneously engage the clutch and close the power switch to the motor so as to operate the latter. Both lever 171 and pawl 162 can be operated by various means, such as pin 176 affixed to a slide, not shown, operated by the plus bar 52 and minus key 53, as is well known in the art. Such a pin normally is embraced in a slot 177 formed in the lower edge of link 175, so that the link can be readily disengaged from the pin 176 by a slight rocking of the link, as will be described hereafter under the heading "Add Key Mechanism."

5. Counter register (Fig. 2)

The carriage 60 also contains a counter, or quotient, register, comprising the dials 64. As shown in Fig. 1, it is conventional to provide a series of ordinally arranged counter dials 64 containing a number of dials approximately half that of the accumulator register—in the machine shown in Fig. 1, eleven counter dials 64 as compared to twenty accumulator dials 62, the counter dials numbering one more than the orders of the selection and actuating mechanisms, and one more than the ordinal positions of the carriage 60. The counter dials 64 are individually mounted on longitudinally extending shafts 180, the rear ends of which are journalled in bearings in the carriage frame plate 147, and the forward ends of which are journalled in bearings formed in the front carriage rail 181. The dials 64 are rigidly mounted on the shafts 180, as is also a feed gear 182 and an integral tens-transfer control plate 183. A single counter actuator 184 is mounted on a shaft 185, and, as described in the patent to Friden, No. 2,229,889, is given an oscillatory, or rocking, motion in a plane perpendicular to the axis of the shaft 185 and also a longitudinal translation parallel to the axis of the shaft 185, with each cycle of operation. In this cycle of operation, a counting finger 186 of the actuator 184 will mesh with the ordinally aligned gear 182 and then be translated, to give the gear a single increment of motion and thus enter a count of "1" into the ordinally aligned dial 64 with each cycle of machine operation. Tens-transfers are effected in the counter by means of an auxiliary finger 187 which resiliently rocks with the counting finger 186. If the auxiliary finger 187 enters a single slot in the tens-transfer control plate 183 (as it does when a tens-transfer is to be effected) it is permitted to rock clockwise, whereupon an auxiliary counter finger, not shown, affixed to the auxiliary finger but lying in the next higher order, will engage its aligned counter gear 182. However, if the auxiliary finger 187 engages the plate rather than the notch, then further rocking is blocked and counting cannot take place in the next higher order, as the auxiliary counting finger, not shown, is prevented from engaging the gear 182. A more detailed description of this mechanism can be found in the patent to Friden just mentioned.

It can be mentioned that, normally, the counter actuator operates in a direction so that the single count is entered into the counter additively or subtractively, as determined by additive or substractive operation in the accumulator. However, it is conventional in machines of the kind shown herein, to provide means for setting the counter for unlike registration. However, as the counter-control mechanism is not important to the operation of my invention, it is not described herein. However, reference is made to the patent to Carl M. F. Friden, No. 2,294,111, issued August 25, 1942, for a full and complete description of this portion of the machine.

6. Register clearing (Figs. 2 and 3)

The accumulator register dials 62 may be returned to their "0" position by a conventional clearing means which comprises a mutilated clearing gear 148 mounted on the dial shaft 146. Associated with the mutilated gear 148 is a rack 149 which extends longitudinally in the carriage. Because of the length of the rack required for each mutilated gear 148, and the spacing of the dials 62, it is conventional to stagger the mutilated gears 148 as shown in Fig. 2, and to provide a double rack 149 to operate them. The rack 149 can be operated by means of the clearing knob 65 (see Fig. 1), or by power through the clutch 160 as the result of depression of the carriage clear key 57, or in certain programmed operations, one of which will hereinafter be described.

The accumulator dial shafts 146 are also provided with a zero stop cam 150, preferably mounted on the dial shaft immediately above the upper surface of the frame bar 147. These cams are provided with a single shoulder 151, as shown in Fig. 3. A zero stop slide 195 is slidably mounted on the upper edge of the frame 147 by any suitable means, such as pin-and-slot connections, not shown. The zero stop slide 195 is provided with a number of forwardly projecting shoulders 196 which, when the slide is moved to the right to its operative position, lie in the path of travel of the single cam abutment 151 on the zero stop cams 150, on each of the dial shafts 146. The zero stop slide 195 is resiliently biased to its inoperative (conventionally left-hand) position by a suitable spring, not shown, and is moved to its operative position by means of a bellcrank 197 (see Fig. 21) which is rocked by movement of the clearing knob 65 in the conventional manner. It can be mentioned at this point that the zero stopping mechanism comprising the ordinal stop cams 150 and the stop slide 195 are important to the operation of my mechanism for I transfer a value from the accumulator register into the storage mechanism through the operation of an auxiliary actuator which drives the square shaft 119, while the minus gear 137 is engaged with the accumulator gear 145, so as to rotate the dial shafts 146 subtractively. In such a transfer operation, the stop slides 195 are moved to their operative position so as to block rotation of the individual dials when they severally reach their "0" positions, the force resulting from such blocking causing the auxiliary drive to be disconnected. The mechanism for such transferring operations will be described hereinafter, but it should be noted in connection with a description of the zero stop cams and zero stop slides, that their operation is essential in the preferred form of my transferring operation.

Similarly, the various counter shafts 180 are provided with mutilated clearing gears 188 which cooperate with racks 189 to return the counter dials to their "0" positions. Associated with the clearing mechanism is a stop slide 198 provided with projecting shoulders 199 which, when the slide is moved to the right, or operative, position, lie in the path of travel of shoulders 191 formed on stop cams 190 mounted on the shafts 180. Thus in a clearing operation, whether from operation of the clear racks 189 or through a transfer from the counter, as will hereinafter be described, the slides 198 are effective to block rotation of the counter dials 64 beyond their "0" position. The zero stop slide 198 is operated from movement of counter clear knob 66 by means of a bellcrank, not shown, but similar to bellcrank 197 shown in Fig. 21.

7. *Power clearing mechanism* (*Figs. 7 and 8*)

It is conventional, also, in the machine of the kind illustrated, to provide a power-operated clearing mechanism which will be operated through the motor, not shown, and the clutch, and will be effective to operate the clearing racks 149 and 189. In the preferred form, the leftmost actuator shaft 126 is extended rearwardly to the rear cross plate 76 (as shown in Fig. 7) and carries adjacent its rear end a jaw clutch member 290, the jaws 291 of which are slidably mounted with respect to the shaft. The position of the jaws 291 of the clutch is controlled by a yoke 292 mounted on the rear end of a clutch control bar 293. The control bar, or pusher rod, 293 is resiliently biased toward the front of the machine by a suitable compression spring 294 compressed between the crossbar 74 and a collar on the control bar, as shown. The control bar 293 can be moved rearwardly to place the clutch in operative position by a pusher link 295, the rear end of which is provided with a shoulder, not shown, that engages the front end of the control bar 293, and the front end of which is pivotally mounted on an arm 296. The arm 296 is rigidly mounted on a transverse shaft 297, whereby the rocking of the shaft (clockwise if viewed from the right) is effective to translate the control bar 293 rearwardly and move the clutch jaws 291 into clutch-engaging position.

A clearing sleeve 301 is axially aligned with the actuator shaft 126, the sleeve being provided with complementary jaws 300 which are adapted to mesh with the jaws 291 of the jaw clutch member 290, whenever the latter is moved rearwardly by the control bar 293. The sleeve is journalled in the rear cross plate 76 and a bracket member 302 mounted thereon, and is provided with a clearing cam 303, the profile of which is seen in Fig. 8. A cam follower roller 304 mounted on a follower arm 305 engages the periphery of the cam 303. The arm is pivoted on a suitable stud 306 and is resiliently biased into engagement with the periphery of the cam by a suitable spring 307 tensioned between studs on the arm and on the rear cross plate. The upper end of the follower arm 305 is slotted, as at 310, which slot embraces a stud 311 riveted to, or otherwise rigidly secured on, a slide 312. The slide 312 is slidably mounted in brackets 313 affixed to the rear cross plate 76. The slide 312 carries a forwardly extending ear 314 which is adapted to engage the end of a clearing interponent 315. The interponent is pivotally mounted on a bracket 316 secured to a clearing bar 317 slidably mounted on the rear of the carriage frame bar 147. Thus, in the preferred form, the clearing bar 317 will be operated only when the carriage is in the extreme left-hand position, at which time the ear 314 will engage the end of the interponent 315. As a safety measure, it is conventional to provide a live pawl 318 which engages a bracket 319 so that in the next to the last ordinal position of the carriage, the interponent will be lifted above the plane of the ear to prevent operation in that ordinal position. The right end of the power bar 317 is provided with a forwardly extending projection, not shown, which is adapted to engage the knobs 65 and 66, shown in Fig. 1, and thereby operate the respective clearing racks. It will be obvious that as the clutch jaw 291 is moved to the rear to its operative position, by operation of the bar 293, the cam 303 will rotate a full cycle for each machine cycle of operation. However, the oscillation of the follower arm 305 and slide 312 will not be operative to clear the carriage until the carriage has been positioned in the extreme left-hand position. In that position, however, the rocking of the arm 305 and reciprocation of slide 312 will operate the power bar 317 and thereby clear the registers.

8. *Keyboard clear* (*Figs. 5A and 6A*)

It has heretofore been noted that the various keys 51 are locked in a depressed position by means of the latching slide 93 engaging a notch 96 in the key stem 90. A depressed key can be released by operating another key in the same order, as the depression of the second key, through its cam edge 95, moves the slide 93 to its releasing position. All of the keys of the keyboard can also be released by operation of a keyboard clear key 56. The key 56 is mounted for substantially vertical movement in the machine and is normally biased to a raised position, as by spring 213. The lower end of the key stem 56, as shown in Fig. 5A, lies above the rearwardly extending arm of a clearing bellcrank 205 which is pivotally mounted on the frame plate 71 by any suitable means, such as stud 206. The substantially vertical arm of the bellcrank 205 is provided with a nose 207 which, when the bellcrank is rocked (clockwise in Fig. 5A) is adapted to engage an extension 208 of a clearing bail 209 (see Fig. 6A). The clearing bail 209 extends across the front of the keyboard, being rotatably mounted on a transverse shaft 210 which is journalled in bearing apertures in the right frame plate 71 and left frame plate 72. The clearing bail 209 is resiliently biased toward the front of the machine by a spring 211 tensioned between the bail and a stud on the adjacent frame plate 71. The bail is provided with an integral rearwardly extending flange 212 which is adapted to engage the right angle projections 100 formed on the forward ends of the latch slides 93. Thus, the rocking of the bail 209 is effective to translate all of the latching slides 93 rearwardly, thereby releasing all keys of the keyboard. This operation can be initiated by manual depression of the keyboard clear key 56, or by certain automatic operations, as by operation of the "add" key mechanism, which will now be described.

9. *"Add" key mechanism* (*Figs. 5, 5A, 6 and 6A*)

The machine with which my invention is preferably associated, conventionally is provided with a well-known "add" key mechanism, which is a mechanism operative to limit the machine to a single cycle of operation and to clear the keyboard at the end of each such cycle. Certain controls are necessary, however, to render this mechanism inoperative whenever the "add" key is set to its operative position and a plural cycle operation is initiated, as in conventional multiplication or division operations, or in the back-transfer program of the present invention. The "add" key mechanism per se is not directly connected to the present invention or the mechanism required therefor. However, as the preferred form of the machine utilizes a machine including this feature and it is necessary to disable such a mechanism, it is believed preferable to briefly mention it.

The "add" key mechanism is, conventionally, under the control of a button, or key, 54 which is mounted toward the rear of the frame adjacent the right side of the machine. The key is pivotally mounted on the frame plate, as on stud 221, and is detented in either its inoperative or operative position by a conventional detent means, not shown. This key is connected to the rear end of a forwardly extending link 220, the forward end of which is pivotally connected to a bellcrank 222 pivotally mounted on the frame plate 71. The other arm of the bellcrank 222 engages a slide 223 mounted for vertical movement on the frame plate, so that forward movement of the "add" key 54 and link 220 depresses the slide 223. A pin 224 (shown in Fig. 6) carried by the slide is embraced by a slot 225 in a long floating link 226. The rear end of the link 226 is pivotally secured to a two-armed lever 227 pivotally mounted on the frame plate 71 by any suitable means, such as stud 228. The two-armed lever 227 is adapted to be rocked, toward the end of each cycle of operation, by a pin 229 mounted on the counter-actuating cam 230 on the power-driven shaft 129. The lever and link are urged to their forward positions by a spring 231 as shown.

The forward end of the link 226 is provided with a cam face 235 which engages a roller 236. Depression of the link 226 by the depression of the slide 223 permits the link to move forwardly, while raising it forces it rearwardly so that the lower end of the two-armed lever no longer is engaged by the pin 229. The forward end of the link 226 is also provided with a notch 237 which is adapted to engage a pin 238 on a lever 239. Conventionally, the lever 239 is mounted on the right side of the frame plate, as on stud 240, the pin 238 extending through an aperture in the frame plate to be engaged by the notch 237. A forwardly extending arm, or floating lever, 245 (see Fig. 5A) is pivotally secured to the lever 239 by any suitable means, such as stud 246. This lever is resiliently urged to a raised position by a suitable spring, such as 247, tensioned between a stud on the frame plate and a stud 248 on the lever. The forward end of the floating arm, or link, 245 is provided with an upstanding ear 249 which is adapted to engage the ear 208 on the clearing bail 209, when the floating link is in its normal raised position.

The rocking of the lever 239, by the means just described, is also utilized to limit the machine to single cycles of operation. This is accomplished by means of an interponent arm 255 which is engaged by the pin 238 when the lever 239 is rocked. The interponent arm 255, in turn, rocks a lever 256, pivotally mounted on stud 257. The lever 256 carries a long pin 258 extending through an aperture in the frame plate 71, which pin is embraced by a slot 178 formed in the forward end of the clutch control link 175. Thus, the rocking of the lever 239 causes the lever 256 to rock, raising the pin 258. The raising of the pin 258 lifts the forward end of link 175, so that its slot 177 is lifted from engagement with the pin 176 on the plus-minus slide, not shown, but previously mentioned.

Thus, when the "add" key is in its forward position, the clutch and switch control are disengaged from the digitation control slide mechanism controlled by keys 52 or 53, and unless other means are used to retain the clutch engaged and the switch closed, the machine is limited to a single cycle of operation. It can be noted here, that the clutch control link 170 is provided with a rather long ear 179 which is held by various means in different multicyclic operations to retain the switch and clutch operative.

It is conventional in the machine with which the present invention is associated, to provide means for disabling the automatic clearing portion of the "add" key mechanism in certain multicyclic operations such as division or multiplication, tabulation of the carriage and the like. Two such means are shown in the drawings and will be briefly mentioned. Referring first to Fig. 6, it will be seen that a two-armed lever 265 is mounted on the left side of the frame plate 71, as on stud 266. The lower arm of this lever is engaged by a roller 267 carried on the upper end of an arm 268 of a three-armed lever 269 which is pivotally mounted on a shaft 297. Thus, the rocking of the three-armed lever 269 (which occurs in certain operations such as automatic tabulation) rocks the lever 265, counter-clockwise in Fig. 6. The forward end of the lever 265 carries a pin 270 which extends through an aperture in the frame plate and underlies the rear end of a two-armed lever 271 (see Fig. 5). The lever 271 is also mounted on the stud 240 and has a forwardly and downwardly extending arm terminating in a camming nose 272 which engages the stud 248 on the floating link 245. Thus, the rocking of the arm 265 (counter-clockwise in Fig. 5) lifts the pin 270, which, in turn, rocks the arm 271 (counter-clockwise in Figs. 5 and 5A), thereby depressing the pin 248 and floating link 245, so that the ear 249 can no longer engage the ear 208 on the clearing bail. By this means, the rocking of the three-armed lever (clockwise in Fig. 6) is effective to disable the automatic keyboard clearing mechanism.

The second means for disabling the clearing mechanism is shown in Fig. 5A, and is particularly important in connection with the present invention. It will be noted that the transverse clearing bail shaft 210 extends through the right side of the frame plate 71. A bellcrank 276 is mounted on the shaft immediately to the right of the frame plate 71. A tension spring 277, tensioned between the rearwardly extending arm of the bellcrank and a stud on the frame plate, resiliently biases the bellcrank and shaft 210 to which it is affixed (counter-clockwise in Fig. 5), to their inoperative positions. The upper arm of the bellcrank 276 is slotted, as at 278, which slot embraces a tongue 279 extending downwardly from the bottom edge of a lever 280. The lever 280 is mounted on a suitable pivot, such as stud 281, which also serves as a supporting stud for the keyboard clear key 56. The forward end of the lever 280 is provided with an ear 282 which lies above the ear 249 on the forward end of the floating link 245. Normally, the force of spring 277 is effective to lift the arm 280, so that the ear 282 lies above the ear 249 of the floating lever, leaving the latter free to rock in its normal plane in which it engages the projection 208 of the clear bail 209. However, when the shaft 210 is rocked (clockwise in Fig. 5A) the connection between the bellcrank 276 and the lever 280 (comprising the slot 278 and tongue 279) rocks the forward end of the lever downwardly whereupon the ear 282 thereon engages the ear 249 of link 245, depressing the latter sufficiently to cause it to move idly below the projection 208 of the clear bail 209. In this manner, the rocking of the shaft is also effective to disable the automatic clearing mechanism.

It can be mentioned that this shaft and mechanism is conventional in the Friden machine with which my invention is preferably associated, and is rocked in certain programmed operations, such as multiplication. This mechanism is important to the present invention, as it will also be used to disable the keyboard clearing mechanism in certain operations performed by the mechanism of my invention.

10. Carriage shift (Figs. 7 and 8)

It has previously been mentioned that the carriage 60 is shiftable in either direction with respect to the frame, or body, 50 of the machine. The carriage is shiftable by power under the control of manually operated keys 58 and 59, and also in certain automatic operations, some of which will hereinafter be described. The mechanism for shifting the carriage is shown particularly in Figs. 7 and 8 and is essentially that shown and described in the patent to Carl M. Friden et al., No. 2,380,642, issued on July 31, 1945.

The movement of the carriage is controlled by a left shift clutch 330 and a right shift clutch 331 (see Fig. 7) of conventional construction, which preferably are mounted on the two rightmost actuator shafts 126. In the machine shown in this embodiment, it is conventional for these actuator shafts to be driven with each cycle of operation so that they rotate in every cycle of every machine operation, but normally are disengaged from the shifting mechanism. The operation of the left shift clutch 330 from its normally inoperative to its operative position is controlled by movement of a shift rod 332 resiliently urged toward the front of the machine by a suitable spring 333. The rear end of the clutch control rod 332 is provided with a clutch control member 334 which positions the clutch 330 in its operative or inoperative position, depending upon the position of the control rod 332. Similarly, the right shift clutch 331 is under the control of a right shift rod 335 carrying a clutch control member 337 and similarly biased toward the front of the machine by a compression spring 336. Rearward movement of the clutch rods 332 and 335 operate the shift clutches 330 and 331, respectively, to connect the actuator shafts 126 to the shifting mechanism which includes a conventional gear train so arranged as to drive a shift drive plate 338 in either direction. The drive plate 338 is provided with four equally spaced drive pins 339 which are adapted to engage the notches 340 of the shift rack 341 mounted on the rear side of the carriage frame bar. Thus, the rearward movement of the left shift rod 332 causes the carriage to be shifted to the left, while movement of the right shift rod 335 causes the carriage to be shifted to the right.

The operation of the left shift clutch control rod 332 is controlled by various means, one of which is the rocking of shaft 345. The shaft can be rocked by means, not shown, from the depression of the left shift key 58. The shaft 345 carries an arm 346 rigidly secured thereto. A pusher link 347 is pivotally mounted on the arm 346 and has a shoulder, not shown, which engages the front end of the push rod 332. The pusher link 347 is resiliently biased into engagement with the front end of the control rod 332 by a suitable spring 348. Similarly, the right shift rod can be operated by the rocking of a sleeve 349 which is rotatably mounted on the shaft 345 and which carries an arm 350 rigidly secured thereto. A pusher link 351 is pivotally secured at its front end to the arm 350 and at its rearward end engages the right shift control rod 335. This link, as was true of link 247, is resiliently urged into engagement with the push rod 335 by a suitable spring 352.

The terminal notch 340 on the right end of the shift rack 341 (at the left side of Fig. 8) is formed in part by an override pawl 360 pivoted on the rack 341, as by stud 361. The pawl is resiliently biased into a shift position by a suitable spring 362, in which position its nose 363 forms a part of the end notch 340. The lower face of the pawl 360 is provided with a cam face 364 adapted to be engaged by a rotating pin 339 when the drive plate 338 attempts to move the carriage to the left beyond the extreme terminal position, thereby rocking the override pawl on its pivot (counter-clockwise when viewed from the rear, as in Fig. 8). The outer, or right-hand, end of the pawl 360 is formed as a nose 365 which, in the extreme left-hand position of the carriage (to the right in Fig. 8) overlies an ear 370 of a long, right angular lever 371 pivoted near the center of the machine, as by screw 372. The upright portion of the lever 371 is held from twisting, or rearward displacement, by means of a flat-headed screw 373 which extends through a slot 374 in the upright portion of the lever. The right end of the lever 371 overlies a horizontal arm of a bellcrank 375 which is pivotally mounted on the digitation control shaft 140. The vertical arm of the bellcrank 375 is connected to a forwardly extending link 376 (see also Fig. 7). The forward end of this link is pivotally connected to an upstanding arm 380 of a transverse bail 381. The bail 381 is pivotally mounted on the transverse shaft 297, previously mentioned, and carries a curved arm 382 which bends around the shaft 297 and extends rearwardly and upwardly to a point immediately underneath the left shift control pusher link 347. The rocking of the override pawl 360, by means of the bellcrank 375, translates the link 376 forwardly, rocking the bail 381 (counter-clockwise when viewed from the right side of the machine) and thereby causing the arm 382 to lift the left shift control link 347 from engagement with the push rod 332 to disable the left shift clutch. The bail 381 is formed, as shown in Fig. 7, with a leftwardly extending arm 383 which underlies the clear clutch control arm, or pusher link, 295. It will be recalled that this pusher link controls the operation of the clutch 290 that drives the power-operated clearing mechanism. The clear clutch is likewise disabled when the bail 381 is rocked. Thus, the rocking of the bail 381 lifts both interponents 347 and 295 to disable, or disengage, the left shift clutch and the register clearing clutch.

11. *Tabulating mechanism (Figs. 5, 6, 7 and 9)*

I prefer to utilize the conventional dividend entry mechanism of the present commercial Friden calculating machine to secure the automatic tabulation of the carriage to the proper ordinal position. This mechanism is essentially that shown in the patent to C. M. Friden et al., No. 2,403,273, issued July 2, 1946. The mechanism, which is conventionally operated by depression of a dividend entry key 55 (Figs. 1 and 5), operates the clearing mechanism and effects entry of a dividend set in the keyboard into the accumulator in any selected ordinal position while suppressing the usual count made in the revolutions counter during the entry of a factor into the accumulator. Normally, when using this mechanism, the operator sets the dividend into the keyboard and depresses the dividend entry key 55. It will be understood that the entry of a dividend factor into a preselected order of the accumulator register 62 is of no interest to the present invention. However, the mechanism by which this is accomplished is utilized in the mechanism of my invention in order to tabulate the carriage to a desired ordinal position preliminary to a transfer of the values therefrom into the storage mechanism. The conventional mechanism will, therefore, be described at this point, while the various modifications required for the back-transfer mechanism of my invention, will be discussed later under the appropriate headings.

The depression of the dividend entry key 55 operates mechanisms which perform the programmed steps in the desired sequence: to first shift the carriage to the extreme left-hand position; to clear both the accumulator and counter registers while in such a position; to then enable the power shift of the carriage to the right to a selected ordinal position; and finally, when the carriage reaches that position, to automatically enter the dividend once into the accumulator. This mechanism will not be modified in the present invention, but a portion only will be operated in order to prevent the clearing of the registers while in the extreme left-hand position when, and only when, the operation is initiated by one of the mechanisms of the present invention. The fourth, and last, step (the entry of the keyboard value into the register) may also be disabled but this is not essential, for, in the preferred form of my invention, I provide an interlock which prevents operation of my mechanism when a value stands in the keyboard, so that there never would be a value to transfer into the register at this operation. However, I prefer to provide an auxiliary actuator, operated when the carriage reaches the selected ordinal position, to initiate the actual transfer operation, so it is more convenient to disable the conventional final step.

The dividend entry key 55 (see Fig. 5) is mounted on a long stem 390 slidably mounted on the right frame plate and which is resiliently urged to its raised position by a conventional spring, not shown. The stem can be latched in its depressed position by a conventional latching slide 391. The lower end of the key stem 390 is provided with a slot 392 which embraces a pin 393 carried by the rearwardly extending arm of a bellcrank 394. The bellcrank is pivotally mounted on the right frame plate and its lower arm is provided with a suitable stud 395 adapted to engage the rearwardly extending cam face of cam lever 396 upon depression of the key 55. The cam lever 396 is rigidly secured to a transverse shaft 397 which extends across the machine to the left side plate. Thus, the depression of the dividend entry key 55 is operative, through the linkage shown, to rock the shaft 397 (clockwise in Fig. 5 and counter-clockwise in Fig. 6).

Among other things, the rocking of the shaft 397 is operative to engage the main drive clutch and close the motor switch to drive the machine. This is secured by means of an arm 398 mounted on the shaft 397 (see Fig. 6) immediately to the left of the frame plate 71. A stud 399 on the outer end of this arm engages one arm 400 of the three-armed lever 269, which is pivotally mounted on the transverse shaft 297. It will be recalled that one arm 268 of the lever 269 carries the roller 267 which is effective to rock the lever 265, which, in turn, disables the "add" key mechanism, as previously described.

The third arm of the three-armed lever 269 extends upwardly and rearwardly to form a hook 402 which engages the pin 173 connecting the clutch control lever 171 and the switch control link 174. Thus, the rocking of the shaft 397, through arm 398 and three-armed lever 269, pulls the switch control link 174 forwardly to the switch-closing position (the switch not being shown herein) and also rocks the lever 171 which, by means of link 170 and clutch pawl 162, controls operation of the conventional clutch 160. The depression of the dividend entry key 55 is, therefore, among other things, operative: (a) to close the motor switch and thereby drive the machine motor, not shown; (b) to cause engagement of the main clutch 160, whereby the machine is driven until the key stem 390 is released from its depressed position by operation of the latch slide 391; and (c) simultaneously disables the automatic clearing of the keyboard which normally would result if the "add" key 54 were in its forward position, by rocking lever 265 described in "'Add' Key Mechanism" above.

The depression of the key 55 and key stem 390 is also utilized to set the power-operated mechanism for operating the left shift clutch 330, and normally the clearing clutch 290 also, to shift the carriage to the extreme left-hand position preparatory to clearing the register and tabulating the carriage to the proper position. The mechanism for securing these operations is shown particularly in Figs. 7 and 9. It is seen, in Fig. 7, that an arm 410 is rigidly mounted on shaft 397 in the proximity of the middle of the keyboard. A pin 411 in the upper end of the vertical arm of bellcrank 410 (see Fig. 9), is embraced by a slot in rearwardly extending link 412. The rearward end of the link 412 is pivotally connected to one arm 413 of an eccentrically mounted bellcrank, the other arm of which is formed as a hook 414. This bellcrank member is mounted on an eccentric carried by shaft 415, which shaft rotates in synchronism with drive shaft 107 at all times. When the eccentric bellcrank is in the position shown in Fig. 9, it rocks idly, but when it is rocked (clockwise in this figure) by operation of shaft 397, crank 410 and link 412, the hook 414 engages a pin 416 on a lever 417 rigidly mounted on the shaft 297. It will be recalled that the shaft 297 carries the arm 296 which operates pusher link 295 to cause operation of the clear clutch control bar 293. Thus, the rocking of shaft 397 has, among other things, caused engagement of the clear clutch.

The rocking of the lever 417 causes a pin 418 on the lower end thereof to engage the latching shoulder of a latch lever 419, so that the shaft 297 is held in its rocked, or operative, position. The arm 419 is released by means of a pin 420 on the bellcrank 410, when the shaft 397 and bellcrank 410 are permitted to return to the inoperative position shown in Fig. 9.

Shaft 297 also carries an arm 425 (Figs. 7 and 9) rigidly mounted thereon. The arm 425 supports the forward end of a pusher link 426, the rear end of which is provided with a shoulder adapted to engage a pin 427. The pin 427 is supported on an arm 428 formed on the left end of a sleeve 429 rotatably mounted on shaft 345. The right end of the sleeve, as shown in Fig. 7, is provided with a second arm 430, on the free end of which is a long pin 431 that engages the front end of left shift control rod 332. Thus, a second effect of the rocking of shaft 297 is to engage the left shift clutch 330 and thereby initiate a leftward shifting of the carriage. The shaft 297 is latched in this position, as previously mentioned, so that the left shift operation continues until the override pawl 360 is operated as previously described. The operation of the override pawl rocks bail 381, the left end 383 of which disables both the pusher links 295 and 426 to disable, or disengage, the clear clutch 290 and left shift clutch 330.

The depression of the dividend key 55 is also operative to block out the operation of the counter actuator 184 (shown in Fig. 2) so as to prevent entry of values into the counter register 64 during the normal dividend entering cycle. The same mechanism is effective, also, to effect a right shift of the carriage at the termination of the left shift just described, and terminate such right shift of the carriage when the carriage reaches the desired ordinal position. These operations are secured, in the machine with which my invention is associated, by means of a two-armed lever 440 (see particularly Fig. 6) which is pivotally supported on the side plate 71 by any suitable means, such as screw 441. The forward end of the lever is provided with a suitable stud 442 which engages the lower end of the key stem 390, whereby the lever is rocked (clockwise in Fig. 6) upon depression of the dividend entry key 55. The rear end of the lever 440 is provided with a suitable roller 443 which engages one arm of a bellcrank arm 444 which forms one end of a bail 445 rotatably mounted on a transverse shaft 446. The other arm of the bellcrank 444, not clearly shown in the drawings, by means of a pin-and-slot connection, rocks a counterblockout arm 447 (clockwise in Fig. 6). A counterblockout slide 448 is pivotally secured to the upper end of the lever 447 and operates in known fashion to block out the operation of the counter actuator 184 throughout the dividend entry operation, i.e., until the operation is complete and the key stem 390 is released from the depressed position in which it is held by latch 391. The other end of the bail 445 is provided with an arm 449, to the free end of which is pivotally secured a link 450. The rear end of this link is supported on a suitable stud 455 carried by the arm 456 of bail 457, also rotatably mounted on shaft 446. The rear end of the link 450 is provided with a suitable nose 451 designed so as to underlie the lower end of the angular lever 371 when the dividend entry mechanism is latched in its operative position just described. In such a position, the rocking of the override pawl 360 and the consequent depression of lever 371, not only operates the bellcrank 375 which, as heretofore described, is effective to terminate the left shifting operation, but it also rocks the rear end of the link 450 and through it, the arm 456.

The bail 457 is normally urged to its inoperative position shown in Fig. 6, by a suitable spring 458, the depression of the angular lever 371 being operative to rock the bail (counter-clockwise in Fig. 6) to its operative position. However, once the bail 457 is rocked to its operative, or adjusted, position, it is latched there by means of an arm 459 engaging a latch 460, the latch being urged rearwardly (counter-clockwise in Fig. 6) by suitable spring means. It can be mentioned at this point, that the latch 460 is not released until the tabulation control slide 490 is operated when the carriage reaches its selected position. A live arm 465 is pivotally mounted on the arm 456 just described, and is provided with a rearwardly extending nose which bears against the right shift control member 337. The two arms 456 and 465 are resiliently urged to their retracted position by a suitable spring 466. Thus, the arm 465 tends to follow the rocking of arm 456 upon operation of the override pawl, the spring permitting the arm 465 to yield until the end of the then current, attempted left shift cycle. At that time an interlock, not shown herein but conventional in the commercial Friden calculating machines, permits the engagement of the right shift clutch, whereupon the spring 466 pulls the arm 465 (counter-clockwise in Fig. 6) to push the clutch control member 337 rearwardly and thereby engage the right shift clutch 331.

The latching of the bail 457 in its operative position, as just described, is effective to condition the dividend entry mechanism for terminating the shift to the right as soon as the carriage reaches its desired ordinal position, and thereupon to enter a dividend factor standing in the keyboard into the accumulator register dials 62. The bail 457 is formed with an integral arm 470 (seen in both Figs. 5 and 6). A link 471 is pivotally secured to this arm 470, extending forwardly to an arm 472 loosely mounted on, and depending from, the tabulating slide 490. Thus, the rocking of the bail 457 (counter-clockwise in Fig. 6 upon the operation of the override pawl 360 to depress the bellcrank 371, pulls the link 471 and the lower end of arm 472 rearwardly. In this position, the lower end of the arm 472 overlies an ear on a latch-releasing arm 473, which is also pivotally mounted on shaft 446. Thereafter, when the slide 490 is depressed by the carriage shifting into the predetermined ordinal position, as hereinafter described, it is operative to rock the latch-releasing arm 473 downwardly. The arm is provided with a cam, not shown, which, when the arm is rocked, is operative to rock the trigger latch 474 (shown in Fig. 5) about its pivot stud 479 to its disengaging position (counter-clockwise in this figure). This rocking of the latch 474 to its releasing position, permits the trigger 475, rotatably mounted on pivot stud 477, to rock under the pressure of its relatively strong spring 476. Rocking of the trigger 475 (counter-clockwise in Fig. 5) rocks a lever 480, a stud 481 on the lower end of the lever being engaged by the upper end of the trigger 475. Normally, the lever 480 is clutched to the digitation control shaft 140, whereby rocking of the arm 480 rocks the shaft 140 (clockwise in Fig. 5) to its additive position wherein the add gears 136 engage the accumulator gears 145. Thereupon, any value standing in the keyboard of the machine is added into the accumulator register dials 62, the machine being held in operation for a single cycle after depression of the tabulating slide 490 by conventional linkage shown in Fig. 15. The restoration mechanism includes link 485 connecting a cam follower arm 486 to stud 478 on the lower end of trigger 475, the arm being operated by a cam 487 mounted on gear 159.

It can be mentioned at this point, that the rocking of the lever 480 is also operative to release the latch slide 391, the upper end of the lever 480 engaging a pin 482 on the latch 392, pulling the latch 391 rearwardly. Thereupon the dividend entry key 55 and its key stem 390 are released and permitted to rise under the force of their spring, not shown. The unlatching of the dividend entry key stem 390 permits the mechanisms controlled thereby to return to their normal position.

A tabulating slide 490 is operated when the carriage shifts to a preselected ordinal position. This slide is mounted for longitudinal displacement (substantially vertically) on the right-hand frame plate 71 by any suitable means such as pin-and-slot connections 491, and is resiliently biased to a raised position by any suitable means, such as spring 492. It is conventional in a machine of the kind shown in this embodiment, to provide a series of tabulator keys, or buttons, 67 mounted in the front rail 181 of the carriage. These keys are depressible and are latched in a depressed position by a conventional latch 493. The lower end of a depressed key, as the carriage is shifted to the preselected ordinal position, engages and rocks a lever 494 mounted in the frame of the machine.

A forwardly projecting ear 495 on the lever 494 overlies an ear 496 on the upper end of the tabulating slide 490. The rocking of the lever 494, 495 by means of a depressed tabulating key 67, is thus effective to depress the tabulating slide 490 against the bias of its spring 492. The depressing of the slide 490 will obviously occur as the carriage is shifted either to the right or to the left past the selected ordinal position. However, depression of the slide 490 is operative to effect the entry of the dividend and to terminate the carriage shifting operation only when the dividend entry mechanism, including the bail 457, has been latched in its operative position, and this occurs only after the rocking of the override pawl 360 at a time when the dividend entry mechanism is latched in its operative position. In all other conditions, the arm 472, depending from the slide 490, is in its forward, or inoperative, position, and is therefore ineffective to control the operations described.

It will be understood that the mechanism of the present invention is not concerned with the entry of dividends into the accumulator register dials 62, but in a transfer of values accumulated therein into a storage mechanism. Thus, the dividend entry mechanism, in its entirety, is not used in the operations contemplated by the present invention. However, it can be mentioned that in the preferred form of the present invention, it is desired to shift the carriage to a predetermined ordinal position determined by a tabulator button 67 as part of the transfer program, and that for this purpose, it is most convenient and economical to use the conventional dividend entry mechanism with a few modifications and additions, as will hereinafter be explained under appropriate headings.

The mechanisms heretofore described are for the most part conventional, and are found in machines manufactured in accordance with the teachings of the patents herein mentioned. These mechanisms have been briefly described as they are utilized to a greater or lesser extent in the operations contemplated by the present invention.

II. TRANSFER FROM ACCUMULATOR TO STORAGE

One of the major aspects of the present invention is to provide a mechanism for transferring values from the accumulator, or product register, into a storage mechanism which, in its preferred embodiment, contains storage dials that give a visual indication of the value transferred and also contains a control mechanism for setting such a value into the selection mechanism. Referring to Fig. 1, it will be seen that across the front of the value keys 51 are four control keys, one of which, the key 600, is marked "Product Transfer." Depression of this key is effective to transfer the values standing in those orders of the product register 62 aligned with the keyboard into ordinally aligned storage dials 601 which are visible through windows 602 in the cover of the machine frame. In view of the fact that only the values of the product register 62 which are aligned with the selection mechanism will be transferred into the storage dials 601, it is preferred that the mechanism of the present invention embodies an automatic shift of the carriage 60 to an ordinal position determined by depression of one of the tabulator buttons 67 prior to the actual transfer operation, thereby permitting the operator to work around fixed decimal points or to transfer such significant figures as he desires. The mechanism of my invention readily lends itself to one in which the transferred value may be set into the selection mechanism, and therefore it is preferred to so construct it. In its preferred form the mechanism for this purpose will comprise the following elements, which will be described in detail, in sequence:

1. *Key mechanism.*—In this connection it is desirable to provide a latch and interlock which will hold the "product transfer" key 600 in a depressed position and at the same time prevent operation of other conflicting control keys, such as the "counter transfer" key 925 or the "storage clear" key 1000. Also, it is essential that the key mechanism be provided either with means for preventing depression of the "product transfer" key 600 if a value stands in any order of the keyboard, or to automatically clear the keyboard upon the first depression of the key. The present invention utilizes the first-mentioned mechanism of blocking depression of the key if a value stands in the keyboard, as will be described under the appropriate heading. Either method is equally satisfactory, but it is obvious that means should be provided to prevent operation of the transfer keys when setting a factor into the selection mechanism if a value stands in any order of that mechanism.

2. *Operate the main clutch and motor switch.*—The "transfer" key 600 should also initiate machine operation, and this is done by simultaneously causing engagement of the main clutch and closing of the motor switch.

3. *Operate left shift clutch.*—Depression of the "transfer" key 600 also engages the left shift clutch as a preliminary step to shifting the carriage to a predetermined ordinal position.

4. *Condition the tabulating mechanism for operation.*— It is preferred that some elements of the conventional tabulating mechanism be operated, but not all portions; so I provide an auxiliary means for conditioning this mechanism which does not include operation of the left shift clutch or clear clutch.

5. *Disable the dividend entry trigger 475.*—Operation of the conventional gate-setting trigger 475 is unnecessary and therefore undesirable even though no value is standing in the selection mechanism, as it would cause the additive gears 136 to mesh with the accumulative gears 145. However, I do condition an auxiliary trigger for operation by the conventional latch-releasing means so as to initiate the transfer operation and set the digitation control gate to cause meshing of the subtractive gears 137 with the accumulative gears 145.

6. *Transfer drive mechanism.*—Depression of the "transfer" key 600 conditions a transfer drive mechanism for operation, which operation is initiated by the release of the auxiliary trigger.

7. *Setting digitation control gate and zero block.*—Depression of key 600 conditions mechanism for setting the zero stop mechanism of the accumulator, or product register, so as to block rotation of the various dials 62 beyond their "0" position, and simultaneously sets the digitation control gate for subtractive operation, both of which operations are performed by the release of the auxiliary trigger.

8. *Conditions automatic clearing mechanism.*—The release of the auxiliary trigger conditions the return-clear mechanism for operation during the normalizing of the machine at the termination of the transfer operation, so as to clear any untransferred balance from the register. This operation involves the shifting of the carriage to the extreme left-hand position and the subsequent operation of the clearing mechanism, as heretofore described.

9. *Clutch storage mechanism to square shaft.*—Depression of the key 600 also conditions a mechanism for operation which, upon initiation of the transfer drive mechanism by release of the auxiliary trigger, causes engagement of a clutch associated with each square drive shaft 119 to connect that drive shaft to the ordinally related storage mechanism.

10. *Auxiliary drive.*—The release of the auxiliary trigger first conditions an auxiliary drive mechanism for operation, and thereafter drives the square shaft 119. This mechanism is operative, following the setting of the transfer clutches, to drive the square shafts 119 by means of auxiliary actuators operating through the medium of slip clutches which will cause disengagement of the auxiliary drive mechanism upon engagement of the zero stop cams of the various orders of the register with their associated stop fingers.

11. *Normalizing transfer mechanism.*—At the termination of the operation, the mechanism automatically releases the "transfer" key 600 and returns the mechanism to its normal, or inoperative, condition.

1. *Key mechanism (Figs. 11, 13 and 15)*

The "product transfer" key 600, as shown in Fig. 1, is preferably mounted adjacent the forward section of the machine, preferably lying in front of the value keys 51. In the preferred form of the present invention, this key is mounted adjacent the forward edge of the keyboard frame comprising the plates 91 and 92, previously mentioned, although this mounting is not shown in the drawings; and is resiliently biased by a conventional spring (not shown) to its raised position. As the mounting of such keys is obvious to those skilled in the art, the details of such construction need not be shown or described herein. However, as shown in Fig. 11, the lower end of the key stem 605 is provided with a rearwardly offset leg 606, a forwardly projecting ear 607 at the lower end thereof, and a laterally projecting nose 608 immediately above the lower end.

The forwardly projecting ear 607 on the lower end of the key stem 605 engages a lever 610 which is pivotally mounted on a transverse shaft 611. The forward end of a rearwardly extending link 645 is pivotally supported on the lower leg of the lever 610, the link being utilized in setting various mechanisms associated with the transfer operation. The arm 610 is normally held in its elevated position by a spring 615, which also causes the link to be resiliently biased to its retracted, or inoperative, position. Immediately adjacent the arm 610 is a second arm 612 which is pinned on, or otherwise rigidly secured to, the shaft 611. Preferably, the second arm is so set on the shaft 611 that its upper edge is slightly below the upper edge of the arm 610, providing for some lost motion between the arms 610 and 612 when they are operated by depression of the key stem 605. A third arm 613 is also rigidly secured to the shaft 611, being angularly disposed from the arm 612 (in a counter-clockwise direction in Fig. 11). This arm 613 is so located that its tip, or nose, 614 forms a shoulder which engages the upper edge of the laterally extending ear 608 on the key stem, thereby retaining the key in a depressed position so long as the shaft 611 is latched in its rocked position. This latch arm 613 is so shaped that if the shaft 611 is rocked, as by depression of one of the other transfer control keys, the upper edge of the nose 614 passes under the ear 608 on the key stem, thereby blocking depression of the key. Incidentally, it can be mentioned, that all of the transfer control keys (which preferably are arranged across the front of the keyboard) engage arms similar to 612 which are pinned to the shaft 611 and each has a locking arm similar to 613 associated therewith. Thus, the rocking of the shaft 611 from the depression of the key 600 causes the other locking arms corresponding to arms 613 to rock underneath the laterally extending ears on those key stems, thus blocking depression of the other keys and forming a positive interlock between them.

It was indicated above that it would be necessary, in mechanisms of this kind, to either block depression of one of the transfer control keys if a value stood in the selection mechanism, or to automatically clear the selection mechanism as the first step of a transfer operation. I prefer to use the former alternative, as it prevents an accidental operation of the transfer mechanism if a value is standing in the selection mechanism, thus preventing the accidental loss of a factor which had been set into the keyboard. Many convenient forms of interlocks which prevent operation of a transfer key if a value stands in the selection mechanism, can be suggested, but I prefer to use the simple form shown in Fig. 11. The preferred interlock comprises a bail 620 which extends across the front of the keyboard, being mounted on arms 621 which are rotatably mounted on shaft 611. The bail engages the upper edge of sensing fingers 1085 and 1086 which are associated with the mechanism for setting a value standing in the storage mechanism into the selection mechanism. For the moment it will suffice to mention that the sensing fingers 1085 and 1086 are mounted on the forward end of the selection slides 106 and 107, one finger on each slide. The sensing fingers are individually biased to a raised position (clockwise in Fig. 11) by individual springs 1093. Each pair of sensing fingers 1085 and 1086, i.e., the sensing fingers mounted on the ordinally related sensing slides 106 and 107, are adapted to engage differential slots 1081 in a cupped cam member 1080, when a value stored in the storage mechanism is set into the selection mechanism. Each sensing finger is provided with a laterally extending ear 1088 which prevents depression of the sensing finger if the slide with which it is associated is displaced from its "0" position, even by a single increment of motion, i.e., for a value "1" or "6." Thus, if a value stands in any order of the machine, the respective selection slide 106 or 107 is moved forwardly at least one step, and its sensing finger 1085 or 1086 cannot be rocked (counter-clockwise in Fig. 11) because the ear thereon will engage the outer face of the cam 1080. Thus, the bail 620 cannot be depressed and neither can any of the control keys located across the front of the machine. It can be noted that the combined force of the springs 1093, which individually hold the sensing fingers 1085 and 1086 in their elevated positions, are sufficient to hold the bail 620 in its upper position.

The rocking of the bail 620 is utilized to disable the automatic clearing of the keyboard when the "add" key 54 is in its operative position. It will be appreciated that in many instances an operator will desire to have the "add" key in its operative position for a series of problems and will then want to transfer a value from one or the other registers, or to set a value in storage into the selection mechanism without having to disable the "add" key mechanism and later put it back into its operative position. It is convenient, therefore, to provide means whereby the rocking of the bail 620 is utilized to disable the keyboard clearing feature of the "add" key mechanism. This is readily accomplished by the means shown in Fig. 11, which comprises an arm 622 rigidly mounted on shaft 210 and abutting the bail 620. It is obvious that downward rocking of bail 620 will rock arm 622 rearwardly (clockwise in Fig. 11) and consequently rock the shaft 210 in the same direction. It will be recalled that the rocking of shaft 210 is effective, through the mechanism previously described (see Fig. 5A), to disable the automatic keyboard clearing through the medium of the lever 276 which rocks arm 280 so that its ear 282 depresses the forward end of the floating clear link 245, whereby it is rendered inoperative.

The shaft 611 is latched in its rocked position by a latch associated with the mechanism for operating the main clutch and the motor switch, which will next be described, and such latching of the shaft locks the key stem 605 in its depressed position by the operation of arm 613 on ear 608.

2. *Operate the main clutch and motor switch (Fig. 15)*

The shaft 611, as shown in Fig. 15, extends through the right auxiliary, or control, plate 77, and carries on its outer end an arm 625 rigidly mounted thereon. A link 626 connects the lower end of the arm 625 to the lower end of a two-armed lever 627 which is pivotally mounted on the control plate 77 by any suitable means, such as screw stud 628. The upper end of the lever 627 supports the forward end of a link 629, the rear end of which is supported by a pin 630 riveted, or otherwise mounted on the auxiliary plate 77. The rear end of the link 629 is provided with a shoulder 631 which abuts the ear 179 on the clutch and switch control link 170. Thus the rocking of the shaft 611 (clockwise in Figs. 11 and 15), from depression of a control key, such as 600, forces the link 629 rearwardly. Such translation of the link 629, through the engagement with the ear 179, forces the clutch and switch control link 170 rearwardly, thereby rocking the clutch pawl 162 to its disengaging position and pulling the switch control link 174 forwardly to close the switch to the motor. The rocking of the shaft 611, therefore, immediately causes engagement of the main clutch and the energizing of the motor to initiate machine operation. The link 626 is resiliently biased to its retracted position by a spring 632 tensioned between the link and lever 627, as shown—which resiliently holds shaft 611 and arms 612 and 613 in their inoperative positions.

The clutch and switch control mechanism, and consequently the shaft 611, is latched in the operative position by a simple latch means which comprises a square stud 635 on the link 626. A latching bellcrank 636 is associated with the stud 635, being pivotally mounted on the control plate 77, by any suitable means, such as stud 637, and resiliently biased to a latching position (clockwise in Fig. 15), by a suitable spring 638 tensioned between the forward end of the latch and a stud on the lever 627. Thus, when the link 626 is translated forwardly from the rocking of the shaft 611, the latching shoulder 639 on the latch 636 will engage the rear side of the latching stud 635, holding the link in its forward position, which, in turn, holds the shaft 611 in its rocked position and maintains the links 629 and 170 in their rearward, or effective, positions. The other arm of the latch 636 is provided with an ear 640 which is engaged by a long unlatching link 641, which link is operated at the termination of the transfer operation, as will hereinafter be described. Thus, the operation of the link 641 will disengage the latch 636, permitting the key 600 to rise and the shaft 611 and link 629 to return to their inoperative positions under the force of their joint spring 632.

3. *Operate left shift clutch (Figs. 11 and 13)*

It was mentioned previously that the lever 610, operated by the depression of the key stem 605, is pivotally connected to a link 645. The rear end of the link 645 is supported by an arm 646 mounted on one end of a short sleeve 647. The sleeve is pivotally mounted on a shaft 648 and carries a second arm 649. The two arms 646 and 649 lie in substantially the same angular displacement with respect to the shaft 648, the two arms and sleeve being used to offset the control links for the "product transfer" key 600 and the "counter transfer" key 925 from the intermediate transverse position shown in Fig. 1 to a position immediately adjacent the right frame plate 71, as is shown particularly in Figs. 13 and 14. The second arm 649 supports the forward end of a long link 650 which extends to the rear of the machine, where it is slidably supported upon a pin 651 (see Fig. 16).

The long link 650 is provided with an intermediate projection, or high shoulder, 652 (as shown in Fig. 13), which shoulder is used to operate the left shift clutch. A bail 655 (also shown in Fig. 7) is pivotally mounted on the transverse shaft 297, and has its right arm 656 extending downwardly in a plane adjacent the link 650. The lower end of the arm 656 is provided with a long pin 657 which is engaged by the forward edge of the upstanding shoulder, or projection, 652 on the link 650. Thus, the forward translation of the links 645 and 650 resulting from depression of the "product transfer" key 600, by means of the shoulder 652 engaging pin 657, rocks the bail 655 (clockwise in Fig. 13). The arm 658 at the left end of the bail 655 is provided with a pin, or stud, 659 which is embraced in a slot 660 formed in the free end of a lever 661. The lever 661 is pinned to, or otherwise rigidly mounted on, the left shift shaft 345. It will be recalled that the rocking of this shaft (counter-clockwise in Fig. 13) causes the pusher link 347 to move rearwardly and thus force the left shift control rod 332 into its clutch-engaging position. By the means just described, the depression of the "product transfer" key 600 is effective to set the left shift clutch to its operating position simultaneously with the engagement of the main clutch and the initiation of machine operation. It will be recalled that the key 600 is latched in its depressed position so that the left shift clutch will be held in its operative position until the operation of the override pawl 360 rocks the bail 381, as previously described. Lifting of the pusher link 347 by the bail 381 permits the shift control rod 332 to return to its forward position under the influence of its spring 333, after which the bottom edge of the pusher arm 347 will ride upon the bar 332 and thus be ineffective to cause further shifting to the left.

4. Condition the tabulating mechanism for operation (Figs. 13 and 16)

The link 650 also carries a cam shoulder, or face, 665, which cam shoulder 665 is engaged by a pin 666 carried by the lower arm of a bellcrank lever 667. The bellcrank 667 is pivotally mounted on the tabulator shaft 446, preferably immediately adjacent the left ends of bails 445 and 457 previously described, as shown in Fig. 16. The upper arm of the bellcrank 667 carries a pin 668 which engages the forward edge of the lever 449, described in connection with the tabulating mechanism. It will be recalled that this lever supports the forward end of the link 450 which has the nose 451. When the link 450 is translated rearwardly, as it is upon operation of the dividend entry key 54, or the rocking of the bellcrank 667 due to the forward translation of link 650, the nose 451 thereof underlies the lever 371 operated by the right-hand override pawl. Thus, the tabulating mechanism is latched operative position as soon as the carriage has been shifted to its extreme left-hand position as a result of the depression of the "product transfer" key 600. The rocking of the link 450 from the effect of the override pawl latches the bail 457 in its operative position, which thereafter controls the rightward shifting of the carriage until the tabulated position is reached.

It should be noted that by setting the tabulating mechanism as here suggested, I rock the bail 457 to control the shifting operations, but have not conditioned the clear clutch 290 for operation. It will be recalled that this clutch, along with the left shift clutch 330, is operated by rocking of the shaft 297 (Figs. 6, 7 and 9). I prefer to completely disable the clear clutch until after the transfer operation is completed, and for that reason use the suggested means for setting the left shift clutch and tabulating mechanism rather than the simpler step of directly rocking shaft 397 or 297, for the latter method would require an auxiliary means to disable the clear clutch during the aligning phase of a transfer operation.

5. Disable the dividend entry trigger 475 (Figs. 16, 10, 15 and 17)

The rear end of the control link 650 (see Fig. 16) is provided with an upstanding shoulder 670 which lies immediately behind the left end of a two-armed lever 671 (see also Fig. 10). This lever 671 is pivotally mounted on a bracket 672 which is affixed to a rear cross brace 674, the lever being mounted on the bracket by any suitable means, such as stud 673. The right end of the lever 671, as shown in Figs. 15 and 17 (left end in Fig. 10, which is a rear perspective), lies immediately in front of forwardly projecting nose 675 on the lower end of a lever 676.

The lever 676 is pivotally mounted on the right end of a transverse shaft 677, and is normally biased to an inoperative position (the clockwise position shown in Figs. 15 and 17) by means of a suitable spring 685 tensioned between a stud on the lower end of the lever and a stud on the frame plate, not shown. The upper end of the lever 676 carries a pin 678 which is adapted to engage the cam edge 679 of a hook member 680. The hook member 680 is pivotally mounted on a power arm 681 by any suitable means, such as pivot stud 686, the power arm being rigidly mounted on the cam-operated program shaft 769, the operation of which will be described hereafter. It can be noted at this point, however, that the shaft 769 and consequently power arm 681, is operated in the first phase of the transfer operation, which operation is initiated by operation of the auxiliary trigger which results when the carriage reaches the preselected ordinal position. The hook member 680 is normally biased to its raised position by a suitable spring 682 tensioned between an ear 683 on the hook member and a stud 684 on the power arm. The hook member, as shown particularly in Figs. 15 and 17, is provided with a lower shoulder 687 adapted to engage a pin 690 carried by arm 691.

The arm 691 is pivotally mounted on the cam-operated shaft 769 and extends upwardly to adjacent the bottom portion of the carriage. The arm 691 is normally biased to its rearward inoperative position (the clockwise position shown in Fig. 17) by any suitable means, such as spring 695 tensioned between a stud 696 on the arm and the shaft 677. The upper end of the arm 691 lies immediately behind a stud 692 on the digitation control link 693. This link 693 is pivotally mounted on an arm 694 affixed to the digitation control shaft 140. The rocking of the arm 691 (counter-clockwise in Figs. 15 and 17), which occurs when shaft 769 is rocked, forces the digitation control link 693 forwardly—thereby rocking shaft 140 counter-clockwise and causing the digitation control gate 138 to cause engagement of the subtractive gears 137 with the accumulator gears 145. Thus, the arm 691 will be so operated, at the proper time in the cycle of operation, to cause the gears 137 and 145 to be engaged, thereby conditioning the machine for subtractive operation of the register dial 62 upon operation of the square shaft 119.

Rocking of the lever 671 is also operative to disable the conventional dividend entry trigger 475 and to enable an auxiliary trigger and trigger-operated mechanism which will initiate a back-transfer operation. As shown in Figs. 10 and 15, the right end of the lever 671 lies immediately forwardly of the depending arm of a bellcrank member 700 which is pivoted on the frame plate 71 by any suitable means, such as stud 701. The forward arm of the bellcrank 700 overlies an ear 702 of a latch lever 703, pivoted on a stud 705 mounted on the frame plate. The latch lever is normally biased to a raised (in Fig. 15 a counter-clockwise) position by a suitable spring 704 tensioned between the ear and a stud, not shown, on the frame plate, in which normal position it permits operation of the conventional trigger 475 and disables operation of the auxiliary trigger, previously mentioned but not yet described. The latching arm 703, on its lower and rearward end, is provided with a hook member 706 adapted, when the latch is moved to its lower position, to engage the restore pin 478 on the dividend entry trigger 475, thereby latching the trigger against operation even though its latch 474 is moved to releasing position. The latch 703 is also provided with an ear 707 at its rear end, which, in the raised, or normal, position of the latch, engages the shoulder 710 of an auxiliary trigger 711. The latch arm is so formed that either its ear 707 engages the shoulder of the auxiliary trigger 711 or its hook engages the pin 478 on the conventional dividend entry trigger 475, so that one or the other may be operated, but not both. It is thus obvious that the forward translation of the link 650, by rocking the lever 671, not only rocks arm 676 to condition the machine for subtractive engagement of the accumulator, or product register, dials 62 with their ordinally related square selection shafts 119, but it simultaneously disables the conventional dividend entry trigger 475 and enables the auxiliary trigger 711.

The auxiliary trigger 711 is likewise pivotally mounted on the stud 477, which also supports the dividend entry trigger 475, and is resiliently biased to an operative position (in a counter-clockwise direction in Fig. 15) by a relatively strong spring 713 tensioned between a stud 714 on the lower end of the trigger and the cam-operated shaft 769. The trigger 711 is latched in its inoperative, cocked position by means of a latch arm 715, substantially identical in shape to the latch lever 474 for the dividend entry trigger 475, which lies immediately behind the latch lever 715 in Fig. 15. The auxiliary latch arm is preferably mounted on stud 479, which also supports the trigger latch arm 474. The auxiliary latch arm 715 carries a stud 716 at its upper end which engages the lower edge of a forwardly projecting nose of the auxiliary trigger, and is biased into a latching position (clockwise in Fig. 15) by a suitable spring 717. This latch lever is also cammed to unlatching position by rocking of the lever 473, which is operated by the tabulating slide 490, as previously described. Thus, when the carriage reaches the ordinal position indicated by a depressed tabulating button, both latches 474 and 715 are released, thereby permitting either the dividend entry trigger 475 or the auxiliary trigger 711 to rock (counter-clockwise in Fig. 15) under the bias of their relatively strong springs 476 or 713, respectively, depending on the position of latch arm 703.

A rearwardly extending link 720 is supported at its forward end on the stud 714 of the auxiliary trigger 711. The rear end of the link is provided with a slot 721 which embraces a pin 722 mounted on the lower end of an arm 723. The arm 723 is rigidly mounted on a transverse auxiliary clutch control shaft 724, the rocking of which causes engagement of the auxiliary clutch which drives the transfer mechanism. Thus, the operation of the auxiliary trigger 711, when the carriage reaches the preselected tabulated position, initiates the transfer operation, as will now be described.

6. Transfer drive mechanism (Figs. 19 and 20)

The tripping of the auxiliary trigger 711, and the consequent rocking of arm 723 and shaft 724, initiates the actual transfer operation, which, in the preferred form shown and described, is a programmed operation requiring three machine cycles for completion. Preferably, the transfer mechanism is driven by an auxiliary, and normally inoperative, drive mechanism controlled by the rocking of shaft 724. The shaft 724 is journalled in the right side frame 71 and in an intermediate bracket 730 riveted to, or otherwise securely mounted on, the rear cross brace 674. The inner end of the shaft 724 carries an arm 731 rigidly secured thereto, the arm 731 being slotted at its free end. The slot, or bifurcation, 732 of arm 731 embraces a pin 733 on the upper end of a clutch control pawl 734. The clutch control pawl 734 is pivotally mounted on the bracket 730 by any suitable means, such as pin, or stud, 735 riveted on the bracket 730. Operation of the clutch pawl 734 controls operation of a transfer drive clutch 736 of conventional construction.

The driving side of the clutch 736, which, in the embodiment shown, is a ratchet member 740, is driven synchronously with the main drive shaft 129. I prefer to drive this transfer mechanism from one of the actuator shafts 126, in which event the actuator shaft is extended to the rear through the rear cross plate 76 (as shown in Fig. 7) and at its outer end carries a miter gear 741. This gear meshes with a similar gear 742 mounted on the upper end of a drive shaft 743 which is journalled in a bracket 744 (see Fig. 20) and a horizontal portion of the bracket 730. The lower end of the shaft 743 is provided with a small miter gear 745 which meshes with a larger miter gear 746. I prefer to utilize three machine cycles to effect the transfer operation from one of the registers into the storage mechanism, and for this reason prefer to have a 1 to 3 ratio between the gears 745 and 746. The gear 746 is mounted on a sleeve 747 integral with ratchet 740, which clutch drive unit of gear, sleeve and ratchet is rotatably mounted on the transfer power shaft 751, whereby the clutch drive unit rotates constantly in synchronism with the main drive shaft 127. It can be noted at this point that in my preferred construction the ratchet 740 carries only three teeth 748 (as shown in Fig. 19) so that the clutch 736 can become engaged only at a full-cycle position of the conventional drive mechanism in order that the various mechanisms of the conventional machine and the present invention cannot get out of time one with the other.

The driven member of the clutch 736 comprises a conventional clutch plate 750 which is rigidly mounted on the transfer power shaft 751. The plate carries a clutch dog 752 pivotally mounted thereon, the clutch dog having a single tooth 753 adapted to engage one of the ratchet teeth 748 and being resiliently biased into an engaging position by a conventional spring 754. The clutch dog 752 is provided with a shoulder 755, which shoulder is adapted to be engaged by the nose 756 of the clutch control pawl 734. When the shoulder 755 is engaged by the nose 756, the clutch dog 752 is rocked to its inoperative position against the tension of its spring 754, but when the clutch control pawl 734 is rocked (clockwise in Fig. 19) the clutch dog is released and then the spring 754 causes the clutch dog to rock so that its tooth 753 engages one of the teeth 748 of the constantly rotating ratchet. By this means the clutch 736 and the transfer power shaft 751 are rotated once for the three machine cycles, after the control shaft 724 has been rocked by the auxiliary trigger 711. It can be noted that the clutch just described is preferably provided with the conventional full-cycle mechanism comprising a recess 757 in the periphery of the driven plate 750, with which is associated a roller 758 pivotally mounted on the clutch control pawl 734. The clutch is positively maintained in an engaged position by the roller riding on the periphery of the plate until just before the end of the transfer cycle (the end of the third machine cycle), at which time the recess, or depression, 757 permits the roller to drop thereinto, and this enables the clutch control pawl 734 to rock into blocking position so as to engage the shoulder 755.

A drive cam 765 is pinned on, or otherwise rigidly secured, to the power shaft 751, the profile of the cam being shown in phantom in Fig. 19 and in full line in Fig. 16. The periphery of the cam is engaged by a follower roller 766 mounted on the rearwardly extending arm 767 of a bellcrank 768 which is rigidly mounted on the program shaft 769. The substantially vertical arm 770 of the bellcrank 768 supports the rear end of a link 850 which controls the operation of the transfer gate 854, as will hereinafter be described.

The follower roller 766 normally engages a flat, or low, spot of the cam 765, as shown in Figs. 16 and 19, being resiliently biased in that direction by a relatively strong spring 771. The cam shaft 751 rotates in a counter-clockwise direction in Fig. 16 and in a clockwise direction in Fig. 19, so that the rotation of the shaft and cam will rock the bellcrank 768 and shaft 769 to its fully rocked position in approximately 60 degrees of cam rotation, or approximately halfway through the first cycle of the transfer operation (it will be recalled that the shaft 751 rotates at one-third the speed of the drive shaft 129). The rocking of the shaft 769 serves two purposes: (a) it conditions a mechanism for initiating a return-clear operation at the end of the transfer operation (after three machine cycles), as will be described under the heading "Condition Clearing Mechanism," and (b) it operates the gate-setting mechanism and zero block, as will now be described.

7. Setting digitation control gate and zero block (Figs 15, 17, 18 and 21)

Cam follower, or program, shaft 769 carries on its right end, as shown particularly in Figs. 17 and 18, a power arm 681 which is rigidly mounted thereon. This arm is therefore rocked (counter-clockwise in these figures) at about the halfway point of the first machine cycle in the transfer operation (approximately one-sixth of the way through the transfer operation). It will be recalled that the power arm 681 carries, adjacent its upper end, the hook member 680 which was cammed into engagement with the pin 690 on setting arm 691, upon depression of the transfer control key 600. Therefore, the rocking of the cam follower shaft 769 is effective to rock the gate-setting arm 691. It will be recalled that the upper end of the gate-setting arm 691 lies immediately behind the stud 692 (Fig. 15) on the digitation control link 693, whereby the operation of the gate-setting arm 691 pushes the digitation control link 693 forwardly. Such movement of the gate-setting link rocks the digitation control shaft 140 (counter-clockwise in Fig. 15), thereby causing the minus gears 137 to mesh with the accumulator gears 145.

The upper end of the gate-setting arm 691 also lies immediately behind a pin 780 mounted in the elbow of a right angular crank 781. This arm, as shown in Fig. 21, is mounted on the right frame plate 71, as on pivot stud 782. The rearwardly extending, or free, end of the arm 781 is pivotally connected to a substantially vertical link 783 by any suitable means, such as screw stud 784. The link 783 is also supported on an arm 785, as by stud 787, the supporting arm 785 being pivotally mounted on the frame plate 71, as by screw stud 786. Thus, in effect, the link 783 forms a parallel linkage with the frame plate 71, and when the arm 781 is rocked (counter-clockwise in Fig. 21) by the operation of the gate-setting arm 691, the link is lifted in a substantially vertical direction. The upper edge of the gate-setting link 783 lies immediately below the rear edge of a bail 790 pivotally mounted on the rear of the carriage frame. This gate, or bail, is supported by arms 791 which, in turn, are pivoted to the carriage frame by any suitable means, such as pivot studs 792. It is obvious, therefore, that the gate will be engaged by the link 783 in any ordinal position of the carriage. The right end of the bail 790 is provided with an ear 795 (see Fig. 21) which abuts against the rear edge of an arm 793 which is pivotally mounted on the carriage by any suitable means, such as pivot stud 794. The forward edge of the arm 793 engages the right end of the bellcrank 197, the operation of which moves the zero stop slide 195 to the right so that its fingers 196 will lie in the path of travel of the zero stop abutments 151 of the various zero stop cams 150 (see Fig. 3). Thus the rocking of the shaft 769, from the operation of the cam 765, has initially caused the digitation control gate 138 to be moved forwardly so as to cause engagement of the subtractive gears 137 with the accumulator gears 145, and, through the operation of link 783 and bail 790, has set the zero stop slides to prevent subtractive rotation of the respective dials beyond their "0" positions.

8. Conditions automatic clearing mechanism (Figs. 15, 17, 19 and 22)

A second effect of the operation of the gate-setting arm 691 is to condition the automatic clearing mechanism for operation at the end of the third cycle of the transfer operation. The clearing operation is actually initiated by the return of the cam 765 to its full-cycle position, shown in the various figures, and the consequent return of the follower bellcrank 768 and shaft 769 to their original positions. While the clearing operation is not initiated until after the transfer operation is completed, it is desirable to condition the normally inoperative controls for operation by return of the follower arm 767 and shaft 769 to their full-cycle positions. A suitable means for this purpose is shown in Figs. 15, 17 and 22.

The arm 691 is provided with a rearward leg 800, as shown in Figs. 15 and 17. The forward, or interior, side of this leg engages a pin 801 carried by a Y-shaped arm 802 rigidly mounted on the clear conditioning shaft 677. Thus the rocking of the arm 691, from the rocking of power arm 681 and the operative engagement of the hook 680 with the pin 690, is effective to also rock arm 802, and with it, shaft 677. The shaft 677 extends entirely across the rear of the machine. At an intermediate location, the shaft 677 carries a latch arm 805 (see Fig. 19) which is rigidly mounted on the shaft. The upper end of the arm 805 is provided with a square stud 806 which is adapted to engage a shoulder, or hook, 807 formed on the rear end of the conventional bellcrank 375. It will be recalled that this bellcrank is connected to link 376 and thence to the bail 381 which disables both the left shift and the clear clutches. In the present invention, the bellcrank 375 is biased to latching position by means of a spring 808 tensioned between one arm of the bellcrank and the rear cross brace 674. Thus, the rocking of the shaft 677 (counter-clockwise in Figs. 15, 17 and 19) causes the stud 806 to latch over the shoulder 807, thereby holding the shaft 677 in its adjusted position. The shaft 677 retains the adjusted position until the carriage has been cleared following the transfer operation—which involves a shifting of the carriage to the extreme left-hand position, and operation of the clearing mechanism heretofore described. A relatively strong spring 809 is tensioned between the lower arm of the lever 805 and the rear cross brace 674, thereby resiliently biasing the arm and shaft 677 (clockwise in Fig. 19) to its inoperative position.

The mechanism for actually causing engagement of the clearing mechanism is mounted on the left-hand side of the machine, and is shown in Fig. 22. It will be recalled that the left shift clutch and the clear clutch are engaged by rocking of the shaft 397 (see also Fig. 9), and the motor and main clutch are maintained operative by the same means. The shaft 397 also extends through the left side plate, as is shown in Fig. 22. The left end of the shaft 397 carries an arm 815 which is provided with a stud, or pin, 816. The cam follower shaft 769 operates a hook member 820 mounted on the left side of the machine, which is provided with a shoulder, or hook, 821 at its forward end adapted to engage the pin 816. The transfer clutch 736, and consequently the cam 765, may be operated in connection with other machine operations, such as the clearing of the storage mechanism, at which times register clearing will not be desired. For this reason the shaft 769 should not control operation of the hook link 820 alone, so that I provide a mechanism under the control of the Y-arm 802 (Fig. 17), which is operated only from the "product transfer" key 600 or the "counter transfer" key 925. Thus the clearing mechanism should be operated only after a transfer from either of these two registers takes place, so as to erase any balance remaining in the registers, but need not be operated in other situations. Means for so controlling operation of the clearing mechanism from the cam follower shaft 769 is shown in Fig. 17, and requires the joint operation of that shaft and shaft 677 on which Y-arm 802 is mounted. As shown in Fig. 22, the rear end of the hook 820 is mounted on the upper end of a lever 822, as by pin 823. The lever 822 is pivotally mounted on the frame plate, not shown, by any suitable means, such as screw stud 824. The lower end of the lever 822 is connected to a short link 825, as by means of pin 826. The other end of the link 825 is connected to an arm 827, as by means of screw stud 828. The lever, in turn, is rigidly mounted on the left end of the shaft 769, which shaft, in Figs. 16 and 22, is rocked clockwise at the beginning of a transfer operation and rocked counter-clockwise at the end thereof (at the end of the third machine cycle). The rocking of the shaft 769 at the start of the operation (clockwise) causes the hook link 820 to move forwardly so that the shoulder, or hook, on the forward end thereof lies ahead of the pin 816; and the return of the shaft to its original position at the end of the program withdraws the hook toward the rear.

Normally, the link 820 is maintained above the plane of the pin 816 by a lever 835, a nose 842 on the upper end of which engages the underside of an ear 829 on the link 820, maintaining the link elevated against the resilient bias of spring 830 tensioned between a seat in the ear 829 and a stud 837 on the lever 835. The lever 835 is pivotally mounted on the left frame plate by any suitable means, such as screw stud 836. The lower end of the lever 835 supports a link 838 to which it is pivotally connected, as by pin 839. The rear end of the link 838, in turn, is supported by an arm 840, to which it is pivotally connected, as by screw stud 841. The arm 840 is rigidly mounted on the clear conditioning shaft 677 which is rocked (counter-clockwise in Fig. 17 and clockwise in Fig. 22) by the operation of the gate-setting arm 691. Clockwise rocking of the shaft 677 and arm 840 rocks the lever 835 in a similar direction, thereby rocking the nose 842 of the lever out from under the ear 829. Thereupon the link 820, under the force of its spring 830, drops down to engage the pin 816.

The parts remain in this position until the end of the third cycle of the transfer operation, when the cam 765 returns to its normal, or full-cycle, position, thereby rocking bellcrank 768 and shaft 769 (counter-clockwise in Figs. 16 and 22). Such rocking of shaft 769 pulls the link 820 rearwardly, which rocks arm 815 and its shaft 397 (counter-clockwise in Fig. 22 and clockwise in Fig. 9), and thereby initiates the left shift and clearing operations previously described.

The latch arm 805 (Fig. 19) remains latched after the completion of the transfer operation until the override pawl 360 and lever 371 are operated by the attempted shifting of the carriage to the left beyond its extreme left-hand position. At this point the lever 371 rocks the bellcrank 375, thereby releasing the arm 805. The spring 809 thereupon rocks the arm 805 and its shaft 677 (clockwise in Fig. 19 and counter-clockwise in Fig. 22) whereupon the nose 842 of the lever 835, by camming engagement against ear 829, lifts the link 820 out of engagement with pin 816 and thereby terminates operation of the machine. In the meantime, the shifting and clearing mechanisms will have operated to shift the carriage to the extreme terminal position and to clear any balance remaining in the register after the transfer operation.

9. *Clutch storage mechanism to square shaft (Figs. 2, 16 and 23)*

It is necessary, in transferring values from the accumulator register into the storage mechanism, to connect the various dials 62 with their ordinally related storage mechanisms. In the Friden machine used for exemplification of this invention, this can best be secured by engaging the subtractive gears 137 with the accumulator gears 145 and then clutching the storage mechanism to the square shaft 119. In the preferred form of the present invention, this operation of connecting the storage mechanism to the ordinally related selection, or square, shafts 119 takes place substantially simultaneously with the setting of the digitation control gate and the conditioning of the clearing mechanism which has just been described. For this purpose, I preferably form the follower arm 767 as a bellcrank 768, as shown in Fig. 16. The arm 770 of the bellcrank 768 supports the rear end of a forwardly extending link 850, the two being interconnected by any suitable pivotal connection, such as pin 851. The forward end of the link 850 is pivotally connected to a two-armed lever 853 by a suitable pivotal connection, such as pin 852. The lever 853 is rigidly mounted on a short transverse shaft 856, journalled in brackets 857 affixed to the crossbar 74. The upper end of the lever 853 supports the right end of a bail 854, as shown in Fig. 16, which bail extends transversely across the selection mechanism, and below the keyboard. The left end of this bail 854 is supported by a similar arm, not shown, likewise rigidly secured to the shaft 856, so that the bail operates without danger of flexing.

In the present invention, the square selection shafts 119 are extended forwardly through the crossframe member 74 (Fig. 2) rather than terminating in a plane substantially that of the front face of the crossframe. In the present construction, the square shafts are journalled in bearing inserts 860 mounted in the crossframe 74 and the square shafts project, as square shafts, forwardly of that crossframe. Forwardly of the crossframe member, a clutch member 861 is slidably and nonrotatably mounted on each square shaft. In its preferred form, the driving member of the clutch comprises a collar with an annular groove 886 which embraces the flange 855 of the transfer gate 854. Thus the rocking of the arm 853 moves the driving clutch members 861, mounted on the square shafts 119, forwardly to engage the cooperating clutch members 862. The driving clutch members 861 are preferably formed with a pair of diametrically opposed drive teeth 863, while the driven members are provided with ten notches 864 adapted to engage the teeth 863, whereby the two members 861 and 862 of each order can be engaged in any value position of the respective square shaft 119 and of the storage mechanism, which will now be described.

Each driven clutch member 862 is pinned on, or otherwise rigidly secured to, a forwardly extending transfer shaft 870, as shown in Figs. 11 and 12. It is seen in Fig. 2, that, preferably, the square selection shaft 119 is provided with a short rounded tip 865 which is journalled in the collar of the driven member 862. By this means the two clutch members 861 and 862, and the shafts 119 and 870 on which they are mounted, are maintained in axial alignment.

*Storage mechanism (Figs. 11, 12 and 24).*—The storage mechanism is shown particularly in Figs. 11 and 12, and an enlarged perspective of a portion of it is shown in Fig. 24. This storage mechanism preferably comprises the shaft 870 previously mentioned, the rear end of which is supported by journalling the rounded bearing tip 865 of square selection shaft 119 within the hub of the driven clutch member 862, as previously mentioned. The forward end of the shaft 870 is journalled in the front frame plate, or crossbar, 73. The forward end of the shaft 870 carries a miter gear 871 which meshes with a similar miter gear 872 mounted on the lower end of a short, substantially vertical, shaft 873 on which the storage dials 601 are mounted. The two gears 871 and 872 are rigidly secured to their respective shafts, so that the rotation of the storage shaft 870, through angular increments corresponding to the digital values on the accumulator register dials 62, causes a like incremental rotation of the storage dials 601. The digital values marked on the top of the dials 601 are viewable through the window 602 (shown in Fig. 1) formed in the front part of the frame machine cover. Thus, values can be transferred from the accumulator, or product register, dials 62 to the storage dials 601 whenever the mechanism is operated to subtract the values standing in the storage register therefrom, as will now be described.

10. *Auxiliary drive (Figs. 11, 12, 16, 20 and 26)*

Approximately the first half-cycle of machine operation (approximately the first 60 degrees of rotation of the transfer drive shaft 751 and cam 765) has resulted in:

(a) The digitation control gate 138 has been set in its subtractive position to cause subtractive operation of the product dials 62 upon operation of the square selection shaft 119;

(b) The zero blocking slide has been positioned in blocking position to stop subtractive rotation of the dials when they reach their "0" positions.

(c) The clearing mechanism has been conditioned for operation at the end of the transfer operation; and (d) The transfer gate has been moved into its operative position to cause engagement of the various ordinal clutch members 861, 862, so as to connect the square selection shafts 119 with the transfer shafts 870.

During this part of the machine cycle, the conventional actuators 125 have been turning idly through their operative angular positions, as it will be recalled that the keyboard was clear before depression of the transfer key. The various mechanisms required for the transfer operation, other than the auxiliary drive of the square selection shafts, can therefore be conditioned for operation during this period. It can be noted that less than half the machine cycle is required for digitation, as the major part of each cycle is required for the tens-transfer wave. Thus the auxiliary drive is not conditioned until the normal digitation phase has been passed and the normal tens-transfer phase has been reached—but the auxiliary drive should be conditioned during the latter half of the first cycle so as to be ready for operation on the second machine cycle. Actually, I prefer to set the final mechanism at approximately the end of the first machine cycle of operation (at approximately one-third of the cycle of operation of the cam 765).

This delayed operation can readily be secured by means of a roller 772 (see Figs. 16 and 20) mounted on the right side of the cam plate 765. This roller is adapted to engage a nose, or projection, 880 formed on the lower edge of the rearwardly extending arm of bellcrank 881. The engagement of the roller with the cam edge 880 rocks the bellcrank 881 (clockwise in Fig. 16) at approximately the 120 degree position of the cam 765. The other arm of the bellcrank 881 is substantially identical in shape to the arm 770 of bellcrank 768, and lies immediately to the right thereof. A forwardly extending link 882 is pinned to the lower end of the vertical arm of bellcrank 881, which link lies immediately to the right of the transfer gate control link 850, previously described. This link 882 extends forwardly beyond the forward end of link 850, the forward end being pivotally connected to a slip clutch control bail arm 883 by any suitable means, such as pin 884. The upper end of the arm 883 carries the right end of a slip clutch control bail 885. The left end of the bail 885 is supported on an arm similar to 883 but not shown, both arms being mounted on a transverse shaft 886. The two arms can be loosely mounted on the shaft if desired, but I prefer to rigidly secure the arms to the shaft and journal the shaft in the frame plates so that the shaft, arms and bail rock as an integral unit, thereby avoiding twisting, or other deflection, of the bail.

As shown in Figs. 11 and 12, the bail, or gate, 885 is provided with a flange 887 on its rear edge, which flange abuts against a downwardly projecting shoulder 890 formed on each of a plurality of ordinally arranged slides 891 (see Fig. 26). As shown in this figure, each slide 891 is preferably mounted on the adjacent guide plate 99, as by slots 892 in the slide 891 embracing pins 893 riveted on, or otherwise rigidly secured to, the coordinal guide plate 99. The slides 891 are provided with suitable detent means to resiliently hold them in either their forward or rearward position. A preferred form of detent can comprise a pair of notches 894 formed in the upper edge of the slide 891, which notches are engaged by a pin 895 carried on the rearward end of a bellcrank latch 896, the pin being resiliently biased into engagement with the notches by means of a spring 897 tensioned between the other arm of the bellcrank and a stud carried by the guide plate 99. Thus, the rocking of the bail 885 (counterclockwise in Fig. 16 and clockwise in Figs. 11 and 12) will push the slides 891 rearward, in which position they will be resiliently held by the detent just described. Later in the cycle the slides will be positively forced to their forward position, against the force of the detents and will again be held in the forward position.

The rear ends of the slides 891 extend through slots formed in the upper edge of the crossbar 74 (as shown in Figs. 2 and 26) and are formed at their rearward ends with a perpendicularly extending yoke 898. The yoke 898 engages an annular slot 901 formed in the driving member 900 of a slip clutch. In its preferred construction, the slip clutch member 900 is mounted on a bearing sleeve, not shown, which embraces the square shaft 119, whereby the clutch member 900 can rotate freely on the shaft 119. The clutch member 900 preferably is provided with eight ratchet teeth 902 which are adapted to engage complementary teeth on a driven slip clutch member 903. The driven member 903 is pinned to, or otherwise rigidly mounted on, the square selection shaft 119, whereby rotation of the driven member 903 will be effective to rotate the square shaft 119 and consequently the accumulator shaft 146 (the latter in a subtractive direction when the controls have been set as heretofore described).

The driving slip clutch member 900 carries an integral ten-tooth gear 904 which is adapted to be engaged by the teeth of a five-toothed auxiliary actuator gear 905, mounted on the actuator drive shaft 126, whenever the slide 891 is forced to its rearward position. It can be noted, as shown in Fig. 2, that the auxiliary actuator gear 905 is mounted at the forward end of the actuator shaft when the actuator 125 for the same order is mounted at the rear of the shaft. Thus, the slip clutches 900, 903 are alternately set on the square shafts 119, at the ends opposite the selection gears 117, 118 for that order, as this provides more room for the slip clutch mechanism. In the second cycle of a transfer operation, the driving member of the clutches 900 and their integral gears 904 will have been pushed rearwardly so that the gears 904 lie in the planes of their associated actuators 905. Thereupon, in such second cycle of operation, the auxiliary actuator 905 will drive the gear 904 and its integral driven slip clutch member 900 through increments of five teeth if so great a number stands in the ordinally related register dial 62. If a lesser number stands in the dials, the auxiliary actuator will drive the driven clutch member 900 and consequently the driven member 903, shaft 119, dial shaft 146 and dials 62, back to the latter's "0" position, at which time the abutment 151 on the stop cam 150 of that dial will engage the stop slide 195, thereby stopping rotation of the dial. Thereupon, a continued driving of the driven clutch member 900 by the auxiliary actuator 905, causes the angular faces of the ratchet teeth of the cam members to force the driving member 900 forwardly, so as to disengage the gear 904 from the auxiliary actuator 905. Such disengagement will take place before the driving member 900 will have rotated through one-tenth of a cycle, or 36 degrees, whereby the complementary teeth of the two slip clutch members 900 and 903 will never become disengaged.

It can be noted that slip clutches have been used heretofore, but those with which I am familiar are noisy, due to engaging and disengaging of the respective teeth. In the present construction, the clutch members do not become disengaged, but the stopping of the driven member causes the driving member to cam itself out of driving position with respect to the auxiliary actuator 905. It is for this reason that I prefer to use eight teeth on the slip clutch members 900, 903, and to provide a depth of tooth greater than the thickness of the gear 904. While theoretically the driving member 900 can be rotated through substantially the angular distance between adjacent teeth, as a practical matter, the butts of the ratchet teeth always remain in engagement with each other so that the teeth are in a full meshing position, as shown in Fig. 2, as I prefer to have a conventional centralizer, not shown, associated with each storage dial. Even if this were not so, rotation of the driving member 900 would have no effect on the transfer of values from the register 62 into the storage mechanism, as that comes only through the rotation of the driven member 903 which drives the square shaft 119.

If the value in the register dial 62 equals or exceeds "5", the driving slip clutch member 900 will remain in its operative position at the start of the third cycle of operation, but will be cammed out as soon as the value standing in the dials 62 has been reduced to "0". As the greatest value that can be transferred is "9", the final, or tenth, step of angular movement of the driving member 900 will be effective to cam that member out of disengagement with the auxiliary actuator gear 904. Thus, at the end of the third machine cycle in a transfer operation, the slip clutch member will have been returned to its original disengaged position, by the camming effect of the complementary teeth formed on the clutch members 900 and 903.

The use of a five-tooth actuator 905, with the requirement of two cycles of operation, is preferred over the use of a ten-tooth actuator operating in a single cycle of rotation, for the reason that the Geneva system of a calculator must be accurately made and very accurately positioned with respect to the two elements, the Geneva wheel and the Geneva block. It has been found that timing becomes very critical when a ten-tooth auxiliary actuator is used because it is desirable to use the conventional Genevas of the calculator. It is highly desirable to use a ten-tooth auxiliary actuator, or two cycles of a five-tooth actuator, in order to positively cam the driving member 900 of the slip clutch to the inoperative position in which its gear 904 is out of the plane of the actuator drive 905 regardless of the value transferred—perhaps "9". It will be obvious that using a ten-tooth actuator in this operation, when a nine-tooth actuator 125 is the maximum otherwise required, requires even more accurate construction than has heretofore been required. Therefore, the adjustments for such a construction would be extremely critical and impractical from a construction standpoint. However, by using a five-tooth auxiliary actuator, the teeth can be properly set so that the conventional Geneva will be operative in this operation also, and these Genevas can be made with conventional manufacturing tolerances, and assembled in a conventional manner. The use of two cycles of operation in place of one, is not particularly important as these machines operate at a speed of 500 to 600 r.p.m., so that the extra cycle requires only approximately one-tenth of a second. This amount of time is inconsequential in comparison with the balance of the operation, which may involve shifting of the carriage from one extreme position to another, the brief transfer operation, and a reshifting of the carriage to perhaps the other extreme position before the final clearing of the registers.

11. Normalizing transfer mechanism

The final step in the transfer operation is to restore the parts to their normal condition. This restoration of mechanisms to their original, or inoperative, position, is under the control of the transfer power shaft 751 and is effective:

(a) To release the "transfer" key 600 so that it may rise to its normal inoperative position, thereby releasing the left shift clutch and the tabulating mechanism, as well as releasing the main clutch and motor switch;
(b) To restore the transfer gate 854 to its normal position, thereby disengaging the square shafts from the storage mechanism and simultaneously disabling the zero block and returning the digitation control gate 138 to its inoperative position;

(c) To initiate operation of the clearing mechanism; and finally
(d) To restore the auxiliary tabulating trigger 711 to its latched position to disengage the transfer drive clutch 736, and terminate operation of the transfer mechanism.

It can be noted at this point that the rocking of the bellcrank 881 (Fig. 16) as the result of the engagement of roller 772 with the cam nose 880, is a momentary rocking, as the arm 881 is immediately restored by a spring, not shown, as it lies immediately to the right of spring 771, tensioned between bellcrank 768 and the shaft 446. As bail 885 is linked to the bellcrank 881, this gate, or bail, is rocked rearwardly (counter-clockwise in Fig. 16 or clockwise in Fig. 11) and is immediately restored to its inoperative position. This, however, is immaterial as the various control slides 891 are detented in their adjusted position and remain in the adjusted position until they are cammed to their inoperative position by means of the slip clutch just described. The other restoring operations will now be described in sequence.

(a) *Releasing the "Transfer" key 600 (Fig. 15).*—The right end of the transfer drive shaft 751 carries a cam plate 910 upon which is mounted a roller 911. Immediately after the beginning of the third machine cycle in a transfer operation, this roller engages the upper arm of a bellcrank lever 912 which is pivotally mounted on the shaft 769. The other arm of the bellcrank 912 is pivotally connected, as by means of pin 913, to the rear end of the delatching link 641 previously mentioned. Thus, at this phase of operation, the bellcrank is rocked (counter-clockwise in Fig. 15), pulling link 641 rearwardly. This translation of the link 641 rocks the latch 636 (counter-clockwise in Fig. 15) and its shoulder 639 releases square stud 635, thereby permitting the spring 632 to restore shaft 611 to its original position. Thus the key 600 is released and allowed to rise to its inoperative position through the force of its spring, not shown. This operation causes the retraction of clutch control link 629, thereby releasing the clutch and motor from control by the transfer mechanism (although both are held operative by the return-clear mechanism controlled by shaft 397—Figs. 9 and 22). The release of the transfer key also releases the left shift clutch control mechanism, including bail 655 (Fig. 13), and the tabulating mechanism, including bellcrank 667.

(b) *Restoration of transfer gate 854 (Fig. 16).*—As the cam 765 approaches its full-cycle position, which is shown in Fig. 16, the bellcrank 768 is permitted to rock (counter-clockwise in this figure) onto the flat of the cam, under the force of its strong spring 771. The rocking of the bellcrank 768 forces the link 850 forwardly, thereby rocking the transfer gate control arm 853 (counter-clockwise in Fig. 16) to move the transfer gate 854 rearwardly and thereby move the transfer clutch member 861 out of engagement with its complementary member 862. This disables the connection between the square shaft 119 and the storage shaft 870.

The release of links 645 and 650 by the release of the key latch has also been effective to release levers 671 and 676 (Figs. 10 and 17) so that hook 680 has been released from control by lever 676. Normally, the friction between the hook 680 and pin 690 will hold arm 691 in its adjusted position until power arm 681 (Figs. 15 and 17) is released, which occurs when bellcrank 768 and power shaft 769 return to their normal position from the force of spring 771 (Fig. 16) as the cam 765 approaches its original position. The return of power arm 681 to its original position releases arm 691, which is then rocked rearwardly by the force of its spring 695, thereby releasing the digitation control bar 693 (Fig. 21) and the zero blocking slide 195.

Thus, the rocking of shaft 769 as the cam approaches its full-cycle position, disengages the transfer clutches 861 and 862, to disconnect the square shafts 119 from the storage shafts 870; disengages the gears 137 and 145 to disconnect square shafts 119 from dial shafts 146; and disables the zero blocking mechanism.

(c) *Initiate clearing operation (Fig. 22).*—The rocking of the bellcrank 768 has simultaneously rocked the shaft 769 to which it is attached; and this rocking, through the mechanism shown in Fig. 22, pulls the hook link 820 rearwardly, thereby rocking the arm 815 and shaft 397 (counter-clockwise in Fig. 22) to initiate a shift and clearing operation previously mentioned. Thus the machine, at the termination of a transfer operation, immediately goes into a return clearing operation in which the carriage is shifted to the extreme left-hand position and the accumulator and counter registers are cleared through the conventional mechanisms previously described.

(d) *Restore auxiliary trigger (Fig. 15).*—The final step of the transfer operation is the restoration of the auxiliary tabulating trigger 711 to its latched position. The relatching of the trigger is effective to disable the transfer clutch, to release the zero block, and to release the digitation control gate to disconnect the accumulator dials from their square shafts. This is accomplished by means of the cam plate 910 previously mentioned. This cam is provided with a cam nose 914 which is adapted to engage a roller 915 on the link 720, immediately before the end of the third cycle of a transfer operation, the cam 910 rotating in a clockwise direction in Fig. 15. The engagement of the nose 914 with the roller 915 cams the link 720 to the left, rocking the auxiliary trigger 711 clockwise, whereupon it is immediately latched by its latching arm 715 and thereafter restrained in that position until the latch 715 is again operated in a transfer operation. Also, the translation of link 720 to the left has released arm 723 and shaft 724 which control operation of the clutch pawl 734. Thus, at the end of the operation, the clutch is disengaged and the transfer mechanism returns to a normal disengaged position.

At this point in the transfer operation (as the transfer mechanism finishes its third and final machine cycle), the return-clear mechanism begins its operation, resulting in the shift of the carriage to the extreme left-hand position and the clearing of any values which might remain in the accumulator and counter registers in that position. In the overstroke cycle in the extreme carriage position, the override pawl 360 operates the L-shaped lever 371 which, in turn, operates the bellcrank 375. The operation of the bellcrank 375, through the link 376, disables all of the clutches, including the main clutch, and the motor switch, as is conventional. It also releases the latch arm 805 (Fig. 19), thereby permitting the arm and the shaft 677 to which it is pinned, to return to their normal inoperative positions. Thereupon, the operation terminates with the parts in their original inoperative positions.

12. Operation of product transfer mechanism

The operation of the machine in transferring a value registered in the product register, or accumulator, dials 62 into the storage mechanism, which includes the dials 601, will be briefly summarized. The operation is initiated by depression of the "product transfer" key 600 (Figs. 1, 11 and 13). The depression of this key rocks shaft 611 through the medium of arm 612 (Fig. 11). The rocking of the shaft 611 (as shown in Fig. 15), through the medium of arm 625, link 626, lever 627 and link 629, engages the ear 179 on clutch control link 170, thereby closing the motor switch to energize the motor and to cause engagement of the main drive clutch. This initiates a machine operation which must continue until the key 600 is released. Shaft 611 and consequently the key 600 are latched in their operative positions by means of the latch 636, which is not disengaged until the third, or final, machine cycle of the transfer operation, after the transfer operation is completed. At this point the latch 636 is released, by operation of link 641, thereby permitting the transfer mechanism to return to its normal, inoperative position. However, at the same time, the automatic clearing mechanism is placed in operation, whereby the carriage is shifted to its extreme left-hand position and the registers cleared so as to remove any balances standing in the outboard orders of the register before a new problem is put into the machine. Operation of the machine during the final shifting and clearing cycles, however, is under the control of the clearing mechanism which is conventional in the machine.

The depression of the "product transfer" key 600, through the medium of arm 610 and links 645 and 650, conditions the machine for the transfer operation. It can be noted that the sleeve arrangement shown in Fig. 13 is merely to permit the control link 650 to be stepped to the right of the operating key 600 to a location in the machine where the control link 650 can pass uninterruptedly to the rear of the machine. The translation of the control link 650, resulting from depression of the key 600, is effective to initiate a left shift of the carriage through the medium of shoulder 652 rocking arm 656 of bail 655, and consequently arm 661 pinned to the left shift control shaft 345. At the same time the shoulder 665 on the control link engages the bellcrank 667 which, as shown in Fig. 16, conditions the conventional tabulating mechanism for operation. Consequently, the machine will operate in a programmed operation including shifting of the carriage to the extreme left-hand position (without the conventional clearing of the registers at the extreme left-hand position which is part of the program when the conventional dividend entry key 55 is depressed to initiate operation of the tabulating mechanism), and thereafter a shifting to the right until the ordinal position indicated by the depression of a tabulator button 67 has been reached. At this point the tabulating operation is terminated in the conventional manner.

The translation of the control link 650 forwardly from the depression of the "product transfer" key 600 through the medium of nose 670, lever 671 (Figs. 10, 15 and 17), and bellcrank 700, also has disabled the conventional tabulating trigger 475 by operating the latch member 703. The operation of latch lever 703 has simultaneously released the auxiliary control trigger 711 for operation when the tabulated position is reached.

The operation of the lever 671 (Figs. 10, 15 and 17) has rocked lever 676, which is effective to cam the hook member 680 connected to the power-operated arm 681 into operative position, so that the hook member engages pin 690 of gate-setting arm 691. The gate-setting arm will be operated, when the transfer operation is initiated, to set the digitation control gate 138 to the subtractive position wherein the subtractive gears 137 are meshed with the accumulator gears 145. The subsequent operation of gate-setting arm 691, when the transfer operation begins, will also be effective, through the medium of bellcrank 781 (Figs. 15 and 21), to lift link 783, rock bail 790, and thereby set the zero stop mechanism for the accumulator dials in its operative position. Thus the operation of arm 691 conditions the machine for subtractive operation, when the actuator shaft 126 becomes connected to the square shaft 119 through the slip clutches 900, 903, and simultaneously sets the zero stop slide 195 to its operative position to stop rotation of the various register dials 62 when they individually return to their "0" positions.

These conditioning operations have all taken place with the translation of the control link 650, which was also effective to initiate the left shift of the carriage and the conditioning of the conventional tabulating mechanism for operation, so that the tabulating operation proceeds until the carriage has reached the tabulated position. At this point the shift clutch is disengaged and the auxiliary trigger 711 released to initiate operation of the transfer clutch, and therefore program the transfer operation. The operation of the trigger 711, through the link 720, arm 723 and shaft 724, is operative to cause engagement of the transfer clutch 736 (Figs. 19 and 20). Engagement of this clutch initiates rotation of the transfer drive shaft 751, which rotates at one-third of the speed of the main drive shaft 129, thereby taking three machine cycles to complete the transfer operation. Immediately after the start of rotation of shaft 751, the transfer cam 765 (Fig. 16) rocks bellcrank 768, which bellcrank is held in its rocked position until very shortly before the end of the three-cycle operation. The bellcrank 768, by means of link 850, is connected to the transfer gate control arm 853, whereby the rocking of the bellcrank sets the transfer gate 854 to its operative position. Such rocking of the transfer gate causes the clutch element 861 (see Figs. 2 or 23) to engage the complementary clutch member 862, thereby clutching the square selection shafts 119 to the storage shafts 870. These clutches are held engaged throughout the transfer operation, until just before the end of the third machine cycle, as the bellcrank 768 is held rocked throughout this period.

The bellcrank 768, which is rocked by the cam 765, is affixed to transverse shaft 769, whereby the shaft is also rocked. The power-operated arm 681 (see Figs. 15 or 17) is affixed to the right end of this shaft, so that the arm is rocked also. As the hook 680 carried by the arm 681 has been moved to its operative position, the gate-setting arm 691 is also rocked, thereby setting the digitation control gate 138 to its subtractive position and setting the zero block mechanism previously mentioned to its operative position. The power arm 681 is also maintained in its rocked position throughout the three-cycle operation of the transfer mechanism so that the digitation control gate 138 and the zero block slide 195 are held in their operative positions throughout the transfer operation.

The rocking of shaft 769 has also, through the medium of the mechanism shown in Fig. 22, rocked the hook link 820 forwardly to a position where it can engage pin 816 carried by arm 815, which is mounted on the clearing control shaft 397. The rocking of arm 691 on the right side of the machine has simultaneously caused rocking of Y-arm 802 on the right end of shaft 677, and the rocking of this shaft has removed the support 835 which normally holds the link 820 in an elevated and inoperative position. Thus the initial operation of the cam 765 has conditioned the mechanism shown in Fig. 22 for operation when the shaft 769 is returned to its full-cycle position as a result of the cam 765 returning to its full-cycle position. It will be recalled that the rocking of arm 815 and shaft 397, resulting from such operation of shaft 769 and hook link 820, is effective to initiate a shifting and clearing cycle which programs the shifting mechanism to shift the carriage to the extreme left-hand position, whereupon the clearing clutch becomes operative to clear the register.

At the end of the first machine cycle of the transfer operation, the pin 772 on cam 765 (see Fig. 16) has engaged the nose 880 of bellcrank 881, thereby rocking the latter. The rocking of bellcrank 881, by means of link 882, rocks the slip clutch control arm 783. The rocking of this arm, which is momentary as the bellcrank 881 immediately returns to its normal position, rocks the slip clutch control bail 885 rearwardly. The momentary rocking of the slip clutch control bail 885, by engagement with the noses 890 on the clutch control slides 891 (see Fig. 26), has moved the driving members 900 of the slip clutches (see Figs. 2 or 23) rearwardly. Such movement places the gears 904, integral with the driving members 900, in the plane of the auxiliary five-toothed actuator gears 905, so that beginning in the second machine cycle the auxiliary actuators 905 drive the gears 904 and clutch members 900. While the bail 885 is operated only momentarily, the slides 891 and consequently the slip clutch members 900 are held in the operative position by means of the detents 896. Consequently, the slip clutches 900, 903 remain engaged during that portion of the next two cycles of operation required to return the dials 62 to their "0" positions. Two machine cycles are allocated to the return of the dials to their "0" positions, as the machine must be programmed for an operation of transferring "9's" and a five-tooth actuator is preferred. When the "0" position in any order is reached, the accumulator dial 62 is locked against further rotation by means of the zero stop bar 195, blocking rotation of shaft 119. Thereupon, the angular edges of the clutch teeth 902 operate as cams to force the driving member 900 and its integral gear 904 forwardly out of the plane of the auxiliary actuator 905. Thus the dial 62 has been stopped in its "0" position and the value formerly in the dial has been differentially set into the storage mechanism which is driven by the shaft 870.

At the end of the third machine cycle, the cam 765 approaches its full-cycle position, thereupon permitting the bellcrank 768 to rock into the flat, or depression. The return rocking of the shaft 769, which occurs as a consequence of this operation, initiates the operation of the clearing mechanism previously mentioned, as well as disengages the transfer clutches 861, 862 which connects the square shafts 119 to storage shafts 870. The rocking of the shaft 769 also releases the controls which caused engagement of subtractive gears 137 with accumulator gears 145 and the operation of zero blocking slide 195. Simultaneously, the cam 910 on the right end of the shaft is effective, through pin 911, bellcrank 912, and link 641, to release latch 636 holding the key and the control mechanisms in their effective positions. The rise 914 on cam 910 is also effective, by engagement of the roller 915, to restore the link 720 and auxiliary trigger 711 to their latched positions. This latter action disengages the clutch and the parts return to their full-cycle position with the value transferred from the accumulator register into the storage dials 601.

The return of the cam 765 and bellcrank 768 to their full-cycle, or inoperative positions, has been effective to initiate the return-clear mechanism, by the rocking of shaft 769 pulling hook link 820, the shaft 677 being latched in its operative position by the latch 807 on the override pawl 375 (Fig. 19). Thereupon, the machine continues operation with the left shift clutch engaged, shifting the carriage to the extreme left-hand position. When this position is reached, the override pawl 360 is operated, thereby rocking lever 371 which operates the bellcrank 375. Operation of this bellcrank disables the shift and clear clutches in the conventional manner, and releases the arm 805. This permits the shaft 677 to return to its normal position, thereby lifting the hook link 820 to disengage it from the pin 816. The rocking of the shaft 397 in addition to initiating a left shift, also conditions the clear clutch for operation, so that at the terminal position of the carriage the clear clutch operates the conventional clearing mechanism to clear any balance in the outboard orders from the register. Thus the machine is cleared and ready for a second operation. The release of arm 805 has also effected the release of the clear and shift control shaft 397 so that at the end of the cycle, the shaft returns to its normal position and the machine stops operating.

III. COUNTER TRANSFER

It is seen in Fig. 1, that I provide a second control key 925 marked "Counter Transfer." The depression of this key initiates an operation which is effective to tabulate the carriage 60 to a desired ordinal position, as determined by depression of a tabulator button 67, and thereupon to transfer the value standing in the counter, or quotient, dials 64 into the storage mechanism dials 601. This mechanism, in many respects, uses the same mechanisms as those used in the product transfer operation, such as the initiation of a left shift operation, conditioning the tabulating mechanism for operation, operating the transfer clutch and drive shaft from operation of the auxiliary tabulating trigger 711, and the like. The similarity between the mechanism for counter, or quotient, transfer to the product transfer, will probably best be understood, and the distinction between the two mechanisms will be emphasized, if a description of the mechanism operated by this key follows the same headings as those used in connection with the product transfer.

1 and 2. *Control keys and operating main clutch, etc.* (*Figs. 11, 13 and 15*)

The operating key and key stem preferably are identical in size and shape to that of the "product transfer" key 600 and cooperate with arms 610, 612 and 614 identical with those described in connection with the product transfer operation. Briefly summarizing, the arm 612 is rigidly mounted on shaft 611, so that the depression of the "counter transfer" key 925 rocks the shaft 611 in an identical manner with that previously described. The rocking of the shaft 611 by depression of the "counter transfer" key 925, through the mechanism shown in the left-hand part of Fig. 15, latches the shaft in the rocked position and initiates operation of the main clutch and the energizing of the motor. The rocking of shaft 611 also causes the arm 613 associated with the "counter transfer" key 925 to rock over an ear 608 on the side of the key stem, thereby latching the key in a depressed position and the rocking of similar arms 613 prevents depression of the other control keys across the front of the machine.

3 and 4. *Operates left shift clutch and tabulating mechanism* (*Fig. 13*)

The depression of the "counter transfer" key 925 rocks an arm 924 (identical in shape with arm 610 previously mentioned) clockwise when viewed from the right, as in Figs. 11 and 13. This arm 924 is rockably mounted on shaft 611, and pivotally supports the forward end of a short link 926. The rear end of the link 926 is pivotally connected to an arm 927 of a bail 932 which is rotatably mounted on the shaft 648. A second arm 928 of the bail lies to the right of the sleeve 647 (see Fig. 13). A long, rearwardly extending control link 929 extends from the lower end of this second arm 928 to the rear of the machine, this link conforming in all particulars except the rear nose 670 to the control link 650, and lying immediately to the right of the link 650. Thus this control link 929 is provided with a high shoulder 930, identical in configuration with the shoulder 652, which also engages the pin 657 and rocks bail 655 that operates the left shift mechanism previously described. The link also has a camming shoulder 931 engaging pin 666 and rocks the bellcrank 667 which sets the tabulating mechanism in operating position.

5. *Conditions auxiliary trigger 711* (*Figs. 10, 15, 16 and 18*)

The rear end of the link 929 lies to the right of the link 650 (behind it in Fig. 16) and is identical in configuration to link 650 except that the nose 935 on the rear end thereof terminates at a lower elevation than that of the nose 670 which engages lever 671 (see particularly Fig. 10). The nose 935 engages the left end of the lever 936, which likewise is pivotally mounted on the bracket 672, preferably being mounted on the same pin 673 as lever 671. The lever 936, as shown in Fig. 10, is slightly shorter than lever 671, but its right end is sufficiently long to engage the latching bellcrank 700, the operation of which (see Fig. 15) operates latch member 703 to latch the conventional tabulating trigger 475 against operation and to enable operation of the auxiliary trigger 711 when the carriage 60 reaches the preselected ordinal position in the same manner, as before described.

The right end of the lever 936 lies immediately in front of a nose 937 at the lower end of a second conditioning lever 938, which also is pivotally mounted on the shaft 677 (see Fig. 18), and is resiliently biased to the inoperative position shown by a suitable spring 957. The upper end of the lever 938 is provided with a pin 939 which engages the cam edge 940 of a hook member 941. The hook member 941 is likewise pivotally mounted on the power-operated arm 681 by any suitable means, such as pin, or rivet, 942. The hook member 941 is normally held in an elevated position, shown in Fig. 18, by a suitable spring 945 tensioned between an ear 944 on the hook member and a stud 946 on the power-operated arm 681. This hook member 941 is provided with a shoulder 943 which is adapted to engage, when the hook member is lowered by the camming action of lever 938, a long pin 950 riveted on, or otherwise affixed to, arm 951.

The arm 951 is rotatably mounted on the shaft 769, immediately to the left of the arm 676 shown in Fig. 17. At its upper end, the arm 951 is pivotally connected to a forwardly extending link 952 by any suitable means, such as pivot stud 953. The conformation of the link 952 is shown in Fig. 15. The forward portion is supported by means of a slot 954 formed in the link, which slot embraces a flat-headed pin 955 mounted in the frame plate 71. The upper end of the link 952 is extended rearwardly to form a shoulder 956 which underlies one of the ordinally spaced ears 961 of a bail 960 mounted in the carriage of the machine below the counter dials 64 (see Figs. 2, 3 and 23). It can be noted here that the operation of bail, or gate, 960 is effective to connect the counter dials 64 to the square selection shafts 119 and to set the counter zero stop mechanism, which operations properly can be described under heading "7" below.

6. *Conditioning transfer drive mechanism*

The mechanisms heretofore described in connection with the "counter transfer" key 925 have been operated substantially simultaneously by the depression of the key. The machine has been latched, by the latching of the key in its depressed position, in a left shift condition and with the tabulating mechanism conditioned for operation when the carriage reaches its predetermined ordinal position. Locking of the key in its depressed position has simultaneously latched the levers 936 and 938 in their operative positions, thereby connecting the power arm 681 to the arm 951 so that when the former is operated, it will be effective to connect the counter dials to the square selection shaft 119 and to set the counter zero blocking mechanism. The machine proceeds in its left shifting and tabulating operations, which follow one another in sequence. When the carriage reaches the predetermined ordinal position, the tabulating slide 490 (Fig. 6) is operated, which thereupon releases auxiliary trigger 711 as heretofore described, for the conventional tabulating trigger 475 has been disabled and the auxiliary trigger 711 has been enabled by rocking of latch arm 703. The release of trigger 711 translates link 720 rearwardly, thereby rocking clutch control arm 723, clutch control shaft 724 (counter-clockwise in Fig. 15) to cause engagement of the transfer clutch 736.

7. *Connecting counter dials 64 to selection shafts 119 and setting counter zero blocks* (*Figs. 2, 15, 18, 19 and 23*)

The setting of the transfer clutch 736, as described in the preceding section, initiates rotation of the transfer drive shaft 751 and consequently the cam 765. Rotation of the cam rocks the follower bellcrank 768 (counter-clockwise in Fig. 19), thereby rocking the shaft 769 in the same direction. The rocking of the shaft 769 operates the power arm 681 which is pinned to the right end thereof. In the present instance, the power arm 681 is connected to the arm 951 (Fig. 15 and 18) by means of the interponent hook 941, whereby the arm 951 is rocked forwardly (counterclockwise in Fig. 18). Such rocking of the arm translates the link 952 forwardly, or to the left in Figs. 15 and 18. Such movement of the link 952 is effective to operatively connect the counter dials 64 to the ordinarily related selection mechanism, as will now be described.

It has heretofore been mentioned that when the link 952 is translated forwardly, the shoulder 956 on the upper end thereof engages one of the ordinally placed ears 961 (see Fig. 2) on a bail 960. This bail, as shown in Figs. 3 and 4, is pivotally mounted in the carriage, as by means of arms 962 integral with the bail, which are pivotally mounted on studs 970 affixed to longitudinal brackets 963 extending between the carriage frame bar 147 and the front rail 181 of the carriage. The forward edge of the bail is flanged, as shown at 964, which flange engages annular slots 965 (see Fig. 2) formed in the collar of ordinally arranged gears 966. The gears 966 are severally mounted on stud shafts 967 mounted in the forward wall of the carriage frame bar 147, the gears being mounted for rotational and axial movement on the shafts 967. The gears 966 are constantly in mesh with corresponding wide gears 968 cut in the rear ends of the counter dial cylinders 64, as shown in Figs. 2 and 23. The gears 966 consequently do not have to be detented as they always will be in mesh with their related counter dials 64 and are held in proper angular positions by the conventional counter detents.

The forward end of the collar of gear 966 is provided with a diametral clutch tooth 969 which is adapted to engage a pair of radial slots 975 of a jaw clutch member 976, as best shown in Fig. 2. Ordinarily there will be ten notches 975 in the clutch member 976, although only one complementary jaw 969 is needed, for it is essential that the two clutch members be engageable in any digital value position of the counter dials 64, and it is conventional in machines of this kind to use ten-tooth gears for such purposes. The driven clutch members 976 are mounted on the rear end of short shafts 977 which extend through the transverse frame plate, or cross-member, 75. Each shaft, on its forward end, carries a gear 978 rigidly mounted thereon, the clutch member 976 and gear 978 rotating as an integral unit. Each gear 978 constantly meshes with a coordinal pinion 979, rotatably mounted on the front of the crossframe 75 by any suitable means, such as flat-headed screw 980. Each gear 979, in turn, meshes with a gear 981 rigidly mounted on the coordinal square selection shaft 119 immediately adjacent the forward wall of the crossbar 75.

By the means just described, the driving clutch members, comprising the gear 966 and its integral tooth 969, are constantly in mesh with the related counter dials 64. Likewise, the driven clutch members 976 are constantly meshed, through the gearing described, with the coordinal square selection shafts 119. As both the square selection shafts 119 and the counter dials 64 are detented in proper digital positions, the two members of the clutches are readily engageable in any position of the parts. It follows that the forward translation of the bail 960 is effective to cause each clutch tooth 969 to engage one pair of the notches 975 of the associated clutch member 976, thereby connecting the counter dials 64 to the square selection shafts 119. It will be recalled that the cam 765 rocks shaft 769 at approximately halfway through the first machine cycle of a transfer operation so that the counter dials are operably connected to the ordinally related selection shafts 119 at this point.

The rocking of the gate 960, as just described, is also operative, in the preferred embodiment of the present invention, to set the counter zero blocking slide 198 in zero blocking position. A simple form of such an operating mechanism is shown in Fig. 4 and comprises an arm 985 pivotally mounted on the bracket member 963 by any suitable means, such as stud 986 (see Fig. 3). The arm 985 is formed as shown in Fig. 4, being provided with a downwardly extending, laterally displaced, leg 987. A pin 988 is riveted to, or otherwise mounted on, the lower end of the leg 987, which pin is embraced by a slot 989 formed in the arm 962 of bail 960. The slot 989 is set at an angle to the arm 962, so that the rocking of the bail 960 and arm 962 cams the pin 988 and arm 985 downwardly (counter-clockwise in Fig. 4). The rear end of the arm 985 is provided with a shoulder 990 which engages a cam edge 991 formed on the upper left-hand corner of the zero blocking slide 198. Thus the rocking of bail 960, through the corresponding rocking of arm 985, cams the zero blocking slide 198 to the right so that the fingers 199 thereon move into the path of travel of the shoulders 191 of the zero blocking cams 190 rigidly secured to the dial shafts 180. Thus the rocking of the bail 960 sets the zero blocking mechanism for the counter to prevent rotation of the counter dials 64 beyond their respective "0" positions.

8. *Conditions automatic clearing mechanism (Fig. 18)*

The rocking of the shaft 769 and the consequent rocking of the arm 951, when the lever 938 has been rocked to cam hook 941 to its operative position, will also be effective to rock Y-lever 802 and shaft 677. This is accomplished through the agency of long pin 950, mounted on arm 951. This pin engages the forward arm of the Y-lever, as shown in Figs. 17 and 18. Thus rocking of arm 951 by power arm 681, in this instance, rocks Y-lever 802 and the conditioning shaft 677. The automatic clearing mechanism shown in Fig. 22 and previously described, operates in exactly the same manner as described under this heading of "Product Transfer" and conditions the automatic left shifting and clearing mechanisms for operation at the end of the transfer cycle. It is therefore believed unnecessary to describe these operations again.

9 *and* 10. *Set transfer gate and slip clutch (Fig. 16)*

The rocking of the bellcrank 768 (Fig. 16) by the cam 765, early in the first cycle of the three-cycle transfer operation, sets the transfer gate 854, as previously described, thus causing the engagement of the clutch elements 861 and 862 (Fig. 2). Similarly, the momentary rocking of bellcrank 881 by roller 772 on the cam 765, causes operation of the slip clutch control bail 885, as previously described. In this manner, the clutches 861, 862 (Fig. 2) are engaged to connect the square selection shafts 119 to the associated storage shafts 870, and the auxiliary drive mechanism is conditioned for operation by engagement of clutch members 909 and 903 and the consequent movement of gears 904 into the planes of their auxiliary actuators 905.

11. *Restoration of elements (Fig. 15)*

The restoration of the various elements, as described in the corresponding section under the heading "Product Transfer," follows at the termination of the transfer operation, as the counter transfer operation is likewise under the control of the transfer clutch 736 and its driven shaft 751 and cams 765 and 910. It is therefore deemed unnecessary to repeat a description of this mechanism or the restoration of the various parts to normal.

12. *Operation*

In view of the fact that the parts utilized in the transfer of a value from the counter into the storage register 601 are either those used in the transfer of values from the product register, or are very similar thereto, and the program of operations follows the same sequence of steps as the transfer from the product register, it is deemed unnecessary to repeat a description of that operation. It can be noted, however, that the depression of the "counter transfer" key 925 is effective to set substantially the same elements as the "product transfer" key 600. There is the one difference—the "counter transfer" key 925 does set the control arm 938 (Fig. 18) to operative position instead of the arm 676, which controls the product transfer. The setting of the counter conditioning arm 938 to effective position substitutes the engagement of the counter dials 64 (instead of product dials 62) with the square selection shaft 119, and the consequent setting of the counter zero blocking mechanism, in place of connecting the accumulator dials 62 to the selection shaft. Otherwise, the operations are identical.

It can be noted, however, that through the mechanism of my invention, it would be possible to set keyboard values directly into the counter, through the operation of the conventional actuators 125 and conventional selection gears 117 or 118, if the control link 952 were moved forwardly to its operative position, for then the counter dials 62 would be directly connected to the corresponding orders of the selection and actuating mechanism. While such an operation is contemplated, it forms no part of the present invention and will not be described here.

IV. STORAGE CLEARING

It is, of course, always necessary to be able to selectively clear a register, and such a means is included within the present invention. Many various clearing mechanisms could be suggested, such as, for example, the conventional rack and mutilated gear clearing mechanisms, such as 148, 149 of the accumulator register, or 188, 189 of the counter register. However, in the present machine, it is much simpler and therefore much better to utilize the transfer mechanism which has heretofore been described. Briefly, it is proposed to operate zero blocking members associated with the storage mechanism, which members may be operated by depression of a storage clear key 1000, and then directly initiate operation of the transfer clutch 736 which will be effective to set the transfer gate 854 and the slip clutch control bail 885, thereby conditioning the storage mechanism for operation from the auxiliary actuators, and then driving the storage mechanism until the zero stop mechanism causes the slip clutches to disengage the driving member from the auxiliary actuator. It can be noted at this point that as I utilize, in the preferred form of my invention, storage dials 601 equal in number to the orders of the keyboard, it is unnecessary to effect carriage shifting, or tabulation, prior to the clearing operation. It is therefore possible, and in fact is much preferable, to omit the steps of setting the left shift clutch and the tabulating mechanism, or to utilize the tabulating mechanism to initiate operation of the transfer clutch. It is, therefore, preferable to provide for direct connection between the storage clear key and the transfer clutch. It can also be noted that it is undesirable to connect either the accumulator register dials 62 or the counter dials 64 to the square selection shafts, for if it is desired to transfer a value from storage into either register, that can better be done through the setting of the selection mechanism, from the storage mechanism as will be described in the final section. Finally, it can be noted that it is undesirable to clear the accumulator or counter registers at the termination of the storage register clearing operation, so that in connection with the storage clearing key it will be unnecessary to initiate operation of the automatic clearing mechanism, the operation of which is initiated by the rocking of shaft 397.

1. Key operation (Figs. 11, 13, and 15)

The storage clear key 1000 is similar in shape to the keys 600 and 925, previously mentioned. Depression of this key, through leg 606 (Fig. 11), operates the bail 620 to rock the storage value sensing fingers 1085 and 1086, and if such fingers are blocked against operation because a value stands in any selection slide 106 or 107, then the key is blocked against depression. There are the two arms 612 and 613 associated with the main leg 605 of the key stem (not shown in connection with key 1000, but similar in shape and in angular position to those shown in Fig. 11), which arms are rigidly secured to the shaft for the same purposes as heretofore noted. Thus, depression of key 1000 rocks shaft 611, and the rocking of the shaft, through the medium of latch 636 (Fig. 15), latches the shaft 611 in its rocked, or opera-tive, position and holds the key 1000 depressed, simultaneously blocking the other control keys along the front of the keyboard against operation. Also, the rocking of shaft 611, by means of the mechanism shown in Fig. 15, causes engagement of the main clutch and closes the motor switch to initiate a machine operation.

2. Storage register zero block (Figs. 13 and 24)

In the case of the storage clearing operation, it is preferred that the depression of the key 1000 directly set the zero block for the storage mechanism. This can readily be accomplished by means of the mechanism shown particularly in Figs. 13 and 24. A short link 1005 connects a clear key arm 1001, rotatably mounted on shaft 611, to a supporting arm 1006, as by a pin, or pivot stud, 1007, the arm 1006 being pivotally mounted on the shaft 648. The supporting arm 1006 is provided with a forwardly extending cam projection, or arm, 1008. It is obvious that the depression of the key 1000 will rock the key-operated arm 1001 downwardly (clockwise in Fig. 13), thereby pulling the link 1005 forwardly to rock the cam arm 1008 upwardly (clockwise in Fig. 24). Such upward movement of the cam arm 1008 causes it to engage the angular cam surface 1009 on a shoulder 1010 of a zero stop slide 1011. The zero stop slide is slidably mounted on the forward face of the front crossframe member 73 by any suitable means, such as pin-and-slot connections, not shown. This stop slide is provided with ordinally arranged fingers 1012 which, when the slide is cammed to the left by the engagement of arm 1008 with cam angle 1009, lie in the path of travel of the abutments 1013 formed on the stop cams 1014, which are rigidly mounted on the shafts 870. It can be noted that the clearing of the storage dials 601 occurs by rotating them additively, or in the same direction in which values are entered when values are transferred from either the product register or the counter register into the storage register, and not by returning such dials backwardly to the "0" position, as is true in the product and counter registers. Thus, the stop cams 1014 are angularly set on their respective dial shafts 870 so that the abutment 1013 thereon engages the end of the respective finger 1012 when the dial 601 advances to the "0" position.

It is thus apparent that the depression of the storage clear key 1000, by rocking arm 1006 (clockwise in Figs. 13 and 24) and the consequent engagement of the cam arm 1008 with the cam shoulder 1009, forces the zero stop slide 1011 to its effective, or zero stopping position.

3. Operate transfer clutch (Figs. 13, 19 and 20)

It was previously mentioned that in the storage clearing operation it was unnecessary to set the left shift clutch, or the tabulating mechanism, or to initiate operation by the rocking of either the conventional tabulating trigger 475 or the auxiliary trigger 711. For this reason it is possible, in this operation, to directly operate the transfer clutch 736. Therefore, a long link 1020 (see Fig. 13) which is pivotally connected at its forward end to the rearward end of link 1005, as by means of stud 1021, extends rearwardly adjacent the control levers 650 and 929, previously mentioned. The rear end of this link can also be supported on the pin 651 (Fig. 16) which supports the previously mentioned links. The rear end of this arm is provided with a turned-up nose 1027, as shown in Figs. 19 and 20. The forward edge of this nose abuts against a pin 1022 mounted in the lower end of a bellcrank lever 1023. The bellcrank 1023 is pivotally mounted on any suitable means, such as the cam-operated shaft 769, as shown in Fig. 19, and its upper arm is provided with a pin 1024 which engages a slot 1025 formed in the free end of an arm 1026 rigidly secured to the clutch control shaft 724. Thus the forward translation of the link 1020, resulting from depression of the clear key 1000, rocks the bellcrank 1023 (clockwise in Fig. 19), thereby rocking the arm 1026 and shaft 724 (counter-clockwise in this figure) to move the clutch pawl 734 to its unblocking, or clutch-operating, position. Thereafter, the clutch, and consequently the drive shaft 751 driven thereby, operates through the full three cycles which have previously been described.

4. *Operation of transfer gate 854 and slip clutch control bail 885 (Fig. 16)*

The operation of the clutch 736 and the consequent rotation of drive shaft 751, by means of the cam 765, bellcrank 768, link 850 and lever 853, sets the transfer gate 854 to its operative position, and retains it in that position until approximately the end of the third cycle of operation. The operation of the transfer gate 854 causes the engagement of the clutch members 861 and 862 (see Fig. 2), as previously described. Shortly thereafter, at approximately the end of the first cycle of the transfer operation, the roller 772 on the cam 765 rocks bellcrank 881 which, through link 882 and arm 883, rocks the slip clutch control bail 885. The rocking of the control bail 885, through the medium of the slides 891 (which it will be recalled are detented in their adjusted position) forces the driving member 900 of the slip clutch rearwardly so that its integral gear 904 lies in the plane of the auxiliary actuator 905. Then, in the last two cycles of operation, the auxiliary actuator will drive the gear 904, slip clutch 900, 903, and consequently square selection shaft 119 and storage shaft 870 forwardly, until the various abutments 1013 of the zero stop cams 1014 engage their respective fingers 1012 of the zero stop slide 1011. Such blocking of rotation of the shafts 870 severally cause their slip clutches to be moved to their inoperative position in which the integral gear 904 lies out of the plane of the auxiliary actuator 905, as previously described. The various storage dials 601 are thus returned to their "0" position and the slip clutches disengaged, and the machine is ready for another operation.

It can be noted that as neither setting levers 676 or 938 (Figs. 17 and 18) have been operated, the rocking of shaft 769, which follows operation of clutch 736 and its shaft 751, does not condition the clearing mechanism for operation (for shaft 677 is not operated to unblock rocking of link 820, so that link 820 cannot engage arm 815 to rock shaft 397). Also, since neither levers 676 nor 938 have been operated, neither arm 691 (Fig. 17), which controls connection of the accumulator dials to square selection shafts, nor arm 951 (Fig. 18), which controls connection of the counter dials to the square selection shafts, will be rocked by the operation of shaft 769.

5. *Termination of operation (Fig. 15)*

The mechanism heretofore described for the release of the control keys 600 and 925, is also operative to release the storage clear key 1000. As previously shown and described, the roller 911 on the cam plate 910 which is mounted on the transfer drive shaft 751, engages the rearward end of bellcrank 912. The rocking of the bellcrank 912 (counter-clockwise in Fig. 15) pulls link 641 rearwardly, thereby rocking latch 636 to its disengaging position. Thereupon, the spring 632 pulls arm 625 and shaft 611 on which it is rigidly mounted (counter-clockwise in Fig. 15) to release the key 1000. The mechanisms controlled by this key are therefore returned to their normal, or inoperative, position and the machine is at rest.

It can be noted that in the clearing of the storage register, it is unnecessary to shift the carriage or to clear either of the registers mounted in the carriage. It is therefore unnecessary to initiate a clearing operation at the termination of operation of the transfer slip clutch, and this step is therefore omitted.

6. *Operation of storage clearing mechanism*

It is believed necessary to only briefly mention the outlines of the operation of the mechanism controlled by the storage clear key 1000. The depression of this key rocks the shaft 611, which is effective to close the motor switch thereby energizing the motor, and to cause engagement of the main clutch. The depression of the key also directly sets the zero blocking slide 1020 in its operative position, whereby the fingers thereon will block rotation of the zero stop cams 1014 mounted on the various shafts 870 of the storage mechanism. The depression of the key also translates link 1020 forwardly to cause operation of the transfer clutch 736, thereby initiating an operation of the transfer mechanism. In this instance, however, neither the counter dials 64 nor the product, or accumulator, dials 62 are connected to the square shafts—it only being necessary that the square selection shafts be connected to the storage shafts 870 and the slip clutches operated by the auxiliary actuators 905. The slip clutches operate as heretofore described, and rotate the storage dials 601 forwardly until stopped by the zero stopping mechanism 1011, 1014, whereupon the slip clutches become disengaged from the auxiliary actuators and the shafts stop in the "0" position of the register dials. The storage dials are therefore cleared, and the machine will come to rest at the end of the third cycle of the transfer operation with the storage register cleared.

V. TRANSFER FROM STORAGE TO SELECTION

The mechanism heretofore described standing alone would be of considerable importance, for it would provide a simple grand total, or storage, register into which values from either the accumulator or counter registers could be transferred. However, it is a very simple matter to add a mechanism which will be operable, at the option of the operator, to transfer a value set in the storage dials into the selection mechanism, so that it can be used as the keyboard factor in a subsequent operation. Therefore, it is greatly preferred that the mechanisms heretofore described, be combined with the mechanism will now be described and which can be operated, selectively at the will of the operator, to set the value in the storage mechanism into the selection mechanism.

Preferably, this mechanism will be under the control of an operating key 1050, marked with the indicia "Storage Selection" in Fig. 1, likewise located along the front of the keyboard. The depression of this key will operate a mechanism which resiliently biases the selection slides to registering position until they engage the steps of a storage cam 1080 preferably mounted on the storage drive shafts 870 immediately in front of the front crossframe member 73, as shown in Figs. 11 and 24. Preferably, the steps on the cam are so arranged that if the value to be sensed is between "1" and "5," inclusive, the "1" to "5" selection bar can be operated, but the "6" to "9" selection bar will be blocked against operation; while if the value is from "6" to "9," inclusive, the "6" to "9" bar will be operative and the "1" to "5" bar will be blocked against operation; and if the value is "0," both bars will be blocked against operation. In the preferred form of the present invention, the resilient rocking member is latched in its fully adjusted position, thereby holding all of the selection bars in their adjusted positions so long as it is desired to maintain that value in the keyboard, thus avoiding an individual latching member for each selection bar.

It can be noted in passing, that this setting operation does not involve the operation of the transfer mechanism, controlled by the transfer clutch, and can be readily accomplished in a single cycle of the machine. Therefore, the mechanism associated with this operation will be effective to close the motor switch and cause engagement of the main clutch, and will set such conditioning mechanisms that the operation of the machine, through a single cycle, will be effective to set the selection bars to the proper differentially adjusted position.

1. Control key (Figs. 1, 11, 13 and 27)

It is preferred that the storage control key 1050 be placed between the "counter transfer" key 925 and "product transfer" key 600, so that it can be depressed simultaneously with either one of these transfer keys. The depression of either transfer key simultaneously with the storage selection key 1050 will be operative to, first, transfer a value from the proper register into the storage mechanism, and at the end of that operation, and as part of the same program of operations, to set that value into the selection mechanism. Actually, this setting of the stored value into the selection mechanism can take place simultaneously with the final shifting and clearing operation, which occurs after the values have been transferred from the selected orders of the registers into the storage mechanism, so that as a practical matter, the transfer from storage to selection will have been made prior to the termination of operation of the machine.

The depression of the transfer key 1050, preferably will not initiate operation of the transfer clutch 736, so that it is unnecessary to rock the shaft 611. For this reason, there is no arm corresponding to arms 612, associated with the storage selection key 1050. There is an arm 1051 associated with the stem of the key 1050, which arm is pivotally mounted on the shaft 611. This arm is formed with an integral arm 1052 which is adapted to latch over an ear (not shown, but corresponding to ear 608 on key stem 605 of Fig. 11) on the key stem, thereby holding the key depressed so long as the arm 1051 is rocked (the arm being held in a rocked position, as will hereinafter be described, until just before the end of the single cycle of operation). It can also be noted that in the preferred form of the present invention, an arm, not shown but corresponding to the arm 613 of Fig. 11, is pinned to the shaft immediately adjacent the arm 1052 so that the operation of any of the other control keys across the front of the keyboard will be effective to latch the key 1050 against depression.

A short link 1060 connects the lower leg of the crank arm 1051 to the depending arm of a bellcrank 1061 which is rigidly mounted on the shaft 648, the link being pivotally connected to the crank 1051 by suitable means, such as a pin, not shown, and to the bellcrank 1061, as by pivot stud 1063 (see Fig. 27). The bellcrank is rocked to its normal position by a suitable spring 1064 tensioned between the lower arm of the bellcrank and a transverse angle 112, shown in Fig. 11. The rearwardly extending, and substantially horizontal, arm of the bellcrank 1061, is provided on its free end with a shoulder 1065 which normally engages a pin 1101 on a cam follower bellcrank 1100—the cam follower bellcrank normally being latched out of operating position by means of the pin 1101 and shoulder 1065. The bellcrank 1061, at its extremity beyond the shoulder 1065, is provided with a shaped nose 1066 so constructed as to prevent the return of the bellcrank to its normal position so long as the pin and shoulder are disengaged, thereby preventing return of the storage selection key 1050 to its normal position until the shoulder 1065 relatches the pin 1101 and cam follower bellcrank 1100 in their latched positions.

It can be noted that the key 1050 has a rearwardly extending leg, not shown, similar to the legs 606 (Fig. 11), previously mentioned, which leg engages the bail 620, thereby maintaining this bail rocked throughout the setting cycle initiated by depression of the key 1050.

2. Operating main clutch and motor (Figs. 6 and 13)

The depression of the storage selection key 1050 is also operative to directly cause engagement of the main clutch and the closing of the motor switch in order to drive the main drive shaft 129 for a full cycle of operation. This can readily be accomplished by the rocking of the shaft 648, on which the bellcrank hook 1061 is mounted. It will be seen in Fig. 13, that the right end of this shaft 648 carries a depending arm 1070 rigidly mounted thereon. This shaft is journalled at its right end in the right frame plate 71, and the arm 1070 is mounted just to the left of this plate, in the same plane in which the switch control link 174 is located. A rearwardly extending link 1071 is, at its forward end, pivotally connected to the arm 1070 by any suitable means, such as stud 1072. The rear end of the link is provided with a slot 1073, as shown in Fig. 6, which embraces a pin 1074 riveted on, or otherwise rigidly secured to, the switch link 174. Thus the depression of the storage selection key 1050, through the rocking of the shaft 648, pulls the switch link 174 forwardly, thereby closing the motor switch. Such movement of the motor switch is operative, through the mechanism shown in Fig. 5, to rock lever 171 and consequently clutch control pawl 162, thereby causing the engagement of the main drive clutch.

It can be noted that there is no occasion for shifting the carriage to any tabulated position, nor to initiate a register clearing operation after the operation controlled by the storage selection key 1050, and no occasion to engage either the counter dials 64 or the accumulator dials 62 with the selection mechanism during such an operation. Therefore, there is no occasion to initiate operation of the transfer clutch 736 or any of the mechanisms associated therewith.

3. Value cam (Figs. 11 and 24)

Each of the drive shafts 870 of the storage mechanism carries a cupped cam 1080 mounted thereon, preferably immediately ahead of the crossframe member 73. Obviously this cam will assume an angular position corresponding to the digital value position of the storage dials 601, so that a sensing of the cam member, and the operation of the selection bars 106 and 107 in accordance therewith, will set the selection bars in a position corresponding to the digital value position of the storage register dials 601. This cam, as shown in these figures, and as shown in the development in Fig. 25, is of cup-shape, having a relatively thin outer wall in which are cut a first series notches 1081 corresponding to the values of "1" to "5," which can be sensed by the "1" to "5" selection slide 106; and a second series of notches, which are adapted to be sensed by the "6" to "9" selection slide 107; and a peripheral edge 1082, which is representative of "0," and prevents operation of either of the selection bars 106, 107. As shown in the development in Fig. 25, the first series of slots 1081 progress in uniform increments of "1" to "5" and are so located on the periphery of the cam as to be sensed by sensing fingers 1085 mounted on the forward end of the "1" to "5" selection slides 106, these slots being set progressively around the shaft by equal angular increments. The second series of slots, increased by the same incremental depth in four equal steps, are representative of the values "6" to "9." These slots are angularly displaced with reference to the first set of slots so that they can be sensed by sensing fingers 1086, which are pivotally mounted on the forward end of the "6" to "9" selection slides 107. There is no slot in the cam 1080 in the angular position representative of the value of "0," so that, in that position, both sensing fingers 1085 and 1086 cannot be operated.

The sensing fingers 1085 and 1086 are pivotally mounted on the related selection bars 106 or 107 by any suitable means, such as pins 1090. Each of these fingers is provided with a perpendicular ear 1091 on the rear end thereof, which extends through an aperture 1092 in the corresponding selection slide 106 or 107. A spring 1093, tensioned between the ear 1091 and an ear 1094 in the corresponding selection slide, rocks the sensing fingers out of engagement with the periphery of the cam 1080 (clockwise in Fig. 11).

The two sensing fingers 1085 and 1086 are provided with shoulders 1087 which are adapted to enter the slots 1081, thereby limiting the forward movement of the fingers 1085 and 1086, and consequently the forward movement of the selection bars to which they are attached. These shoulders 1087 terminate in outwardly turned ears 1088. These ears prevent the shoulders 1087 from entering the slots 1081 if the fingers are rocked downwardly into engagement with the cams 1080, but permit the shoulders to penetrate the slots and cams whenever moved in a direction substantially parallel of shaft 870. The ears 1088, therefore, prevent rocking of the arms 1085 and 1086 and consequently rocking of the bail 620, if any selection slides 106 or 107 is advanced by even as much as a single incremental step.

When no value stands in any selection slide, the depression of any one of the control keys across the front of the machine will rock the bail 620 (clockwise in Fig. 11), thereby rocking the sensing fingers 1085 and 1086 downwardly until the lower edge of the fingers, forwardly of the shoulders 1087, lie against the periphery of the cam. During the two transfer and the clearing operations previously described, the selection slide, and consequently the fingers, remain inactive and there is, therefore, no occasion for the sensing fingers to move into sensing engagement with the cams 1080. However, when a value is being transferred from the storage mechanism into the selection mechanism, these selection slides, and the corresponding fingers, are moved forwardly an amount determined by whichever slot 1081 or edge 1082 registers with the shoulders on the two sensing slides 1085 or 1086. The mechanism for so moving the selection bars 106 and 107, and consequently sensing the value standing in the ordinally related cams 1080, will now be described.

4. *Operation of sensing means (Figs. 11, 12 and 28)*

It will be recalled that the depression of the storage selection key 1050 rocked the latching arm 1061 out of latching engagement with the pin 1101 on the bellcrank follower 1100. The bellcrank follower 1100 is pivotally mounted on a transverse shaft 1102 and is normally biased into an operative position (clockwise from the position shown in Figs. 11 and 12) by means of a spring 1103 tensioned between a stud 1104 on the bellcrank and a stud 1105 on a bracket member 1106 extending from the crossbar 74. As shown in Fig. 12, overrocking of the bellcrank 1100 is prevented by means of a stop leg 1107 which, when the bellcrank is rocked to its extreme position, abuts against the stud 1105. This bellcrank is provided with a cam nose 1108 on its extreme rearward end, which nose is adapted to be engaged by a roller 1110 mounted on a plate 1111 which is rigidly mounted on a transverse shaft 415. This latter shaft 415 is conventionally in a machine of the type mentioned and rotates in exact synchronism with the main drive shaft 129. This shaft is therefore always operating and the plate therefore makes a full revolution for each cycle of the machine. The roller 1110 is so located on the plate as to engage the bellcrank, and rock it to its latched position, immediately before the end of a machine cycle of operation.

The bellcrank 1100 carries a bellcrank interponent 1115 pivotally mounted thereon by any suitable means, such as stud 1116. This interponent is resiliently biased to an operative position (counter-clockwise in Figs. 11 and 12) by a suitable spring 1117 tensioned between a spring seat formed in one arm of the bellcrank and another in the stop leg 1107 of the bellcrank follower 1100, but is normally prevented from so rocking by means of an ear 1067 formed in the extremity of hook arm 1061 which underlies the forward edge of the forward arm of the bellcrank interponent 1115. This interponent is provided with a shoulder 1118 which is adapted to engage a bail 1119 which interconnects the arms 1126 of the operating bail 1125, when the bellcrank 1100 is in its unlatched position (clockwise from the position shown in Figs. 11 and 12). Thus the operation of the control key 1050 and the consequent rocking of latch arm 1061 to release the bellcrank follower 1100, also releases arm 1115 so that its shoulder can drop behind the bail 1119 and later in the cycle, when the roller 1110 engages the end 1108 of the bellcrank follower 1100, the consequent rocking of the bellcrank will also rock the bail 1119 and arms 1126.

An operating bail 1125 is affixedly mounted on a plurality of arms 1126 (Figs. 11 and 12) which preferably are rigidly secured to the shaft 1102. I find that this operating bail 1125, as it must work against the force of some twenty springs as will hereinafter be described, is subjected to considerable twisting and it is therefore preferable to mount the bail 1125 on approximately four arms 1126. Also to keep the bail assembly true, and to prevent twisting, it is preferred that all of the arms 1126 be rigidly mounted on the shaft 1102. Thus the rocking of the bellcrank follower 1100, at approximately the 270 degree position in a machine cycle, rocks the bail 1125 which is effective to resiliently translate the selection bars 106 and 107, and consequently their sensing fingers 1085 or 1086, forwardly.

It should be noted in passing, that the bail 1125 is latched in its extreme operative position by a latching means which will now be described, with particular reference to Fig. 28. It is seen in this figure that the shaft 1102 carries a latch arm 1127 pinned to, or otherwise rigidly secured thereon. The free end of this latch arm carries a pin 1128 which is adapted to engage a latching shoulder 1129 formed on the upper end of a latching lever 1130. The latching lever 1130 is pivotally mounted on a bracket 1131 by any suitable means, such as stud 1132, the bracket being mounted on the base plate of the machine. The latch arm 1130 is resiliently biased in a latching position (clockwise in Fig. 28) by a spring 1133 tensioned between the arm and a stud, not shown, on the frame plate. A stop leg 1134, formed on the latch 1127, prevents overtravel in a reverse direction (clockwise in Figs. 11, 12 and 28) from the force of the several springs acting in that direction.

Thus, when the bail 1125 is rocked to its operative position (counter-clockwise in Figs. 11, 12 and 28), the arm 1127 is rocked so that the pin 1128 becomes latched by the shoulder 1129 on the latching arm 1130, thereby holding the bail in its extreme operated position. By latching the bail in its extreme operated position, it is possible to substitute one latch for the twenty latches that oherwise would be required in the calculating machine shown in Fig. 1 (one for each selection bar), and it also avoids the danger of rebound which is inherent in individual latches for the selection bars. It can also be noted that the incremental steps in which the selection bars 106 and 107 are moved is very small, conventionally being about .125 of an inch for each step. By using a latch on a long arm attached to the bail 1125, a much larger latch can be used with consequent lessening of danger from rebound. It is obvious that, in the small sizes of latches which would be required to latch the selection slides directly, rebound could become a very serious factor, while in the present method the operating bail 1125 can be overthrown by any amount, for the resilient connection between the bail 1125 and the selection slides permit such construction.

The latch 1130 can be released by any desirable means, and for convenience I prefer to release the latch from depression of the keyboard clear key 56. This can readily be secured by means of a link 1140, the forward end of which is connected to an arm 1141 rigidly secured to the clearing bail 209, as shown in Fig. 16, as by means of a pin 1142. The rear end of the link 1140 is slotted as at 1143 (Fig. 28), to embrace a stud 1144 riveted on, or otherwise rigidly secured to, the bracket 1131. The rear end of the slide 1140 is provided with a cam edge 1145 which engages a pin 1135 riveted to the lower end of the latch lever 1130. Thus the forward translation of link 1140, which occurs whenever the clearing bail 209 is rocked, cams the lever 1130 (counterclockwise in Fig. 28) through the engagement of the pin 1135 with the cam edge 1145, thereby releasing the latch and permitting the operating bail 1125 to return to its inactive position.

The operating bail 1125, when rocked as hereinbefore described, effects a resilient translation of the selection slides 106 and 107 forwardly to sense the value standing in the cams 1080. This can be secured by a number of means but a simple and very satisfactory means is shown in Figs. 11 and 12. In the preferred form, an operating arm 1150 is rotatably mounted on each of the selection slides 106 or 107 by any suitable means, such as pivot studs 1151. These arms are resiliently biased against stop pins 1154 by relatively strong springs 1152 which are tensioned between spring seats formed in the arms 1150 and an ear 1153 formed on the lower edge of each of the selection slides. Thus the rocking of the bail 1125 will positively move the lower ends of the arms 1150 forwardly. So long as the selection bars 106 or 107, and their respective selection fingers 1085 and 1086, are free to move forwardly, the slides will follow movement of the arms from the force of the individual springs 1152. However, when forward movement of the selection bars 106 and 107 is stopped, by engagement of the shoulders 1087 of the sensing fingers with the bottom of the aligned slot 1081, or by engagement of the shoulder with the periphery of the cam, the spring 1152 yields. Thus the bail 1125 may take a full operative stroke, and be latched in the extreme operative position, thereby resiliently holding the slides in the proper value position from the force of their relatively strong springs 1152. By this means, the value standing in the value cams 1080, which corresponds to the value registered in the ordinarily related storage dial 601, is effectively set in the selection slides, and is held there as long as desired by the operator. While the value is so standing in the selection mechanism, it can be used in any machine problem desired. The value can be released by depression of the keyboard clear key 56 or the operation of the "add" key mechanism previously described, both of which are effective to rock the clearing bail 209 and thus release latch 1130.

As soon as the bail 1125 has been rocked to its fully operative position, the cycle can be terminated, as nothing further remains to be done. For this reason, the roller 1110 is placed so as to engage the bellcrank follower arm 1100 at approximately the three-quarter position.

5. Simultaneous operation with transfer control keys (Figs. 11 and 27)

It was previously indicated that it is possible, in the preferred form of the present invention, to operate the storage selection key 1050 simultaneously with either the "counter transfer" key 925 or the "product transfer" key 600, and thus initiate a continuous cycle of operation which transferred the value standing in the counter dial 64 or the accumulator register dial 62 into the storage mechanism and thence into the selection mechanism for re-use. The depression of either of the transfer keys 925 or 600, of course, initiates the programmed operation controlled by these two keys, and previously described. It is necessary in this event, to rock latch arm 1061 to release the pin 1101, but to prevent rocking of the follower bellcrank 1100 until after the transfer operation is completed. This can readily be accomplished by means of a second latch arm 1160 (Figs. 11 and 27).

This latch arm is in the form of a bellcrank pivotally mounted on the shaft 648, immediately adjacent the bellcrank latch 1061. This latch arm has a downwardly projecting shoulder 1161 which is radially removed from the shaft 648 a distance slightly greater than the shoulder 1065 on the latch arm 1061. The latch arm is resiliently biased into a latching position (clockwise in Figs. 11 and 27) by means of a spring 1162 tensioned between a stud 1163 on the other arm of the bellcrank latch 1160, and a spring seat formed in a transverse bail 1164. The bail 1164 is pivotally mounted on the shaft 648, as by arms 1165. The bail 1164 is rocked (clockwise in Figs. 11 and 27) whenever arms 646 or 927 are operated, from depression of the "product transfer" or "counter transfer" key 600 or 925, as heretofore described, by means of shoulders 1166 on such arms abutting the interior face of the bail 1164. When the bail is so rocked, the spring 1162 resiliently biases the latch arm 1160 into operative position (clockwise in these figures).

Whenever the storage selection key 1150 is depressed simultaneously with either the "counter transfer" key 925 or the "product transfer" key 600, the operation of either of the latter two keys rocks the latch 1160 into engaging position at the same time that the storage selection key 1050 rocks the latch arm 1061 out of its latching position, thereby holding the bellcrank follower 1100 in its inoperative position. It was mentioned previously that the distance between the shaft 648 and the shoulder 1161 is slightly greater than that between the shaft and the shoulder 1065, so that the pin 1101 is permitted to escape slightly, thereby preventing re-engagement of the pin with the shoulder 1065 until the bellcrank follower 1100 has been released and restored to its latched position.

In this connection, I provide means operated by the operation of the return-clear actuating shaft 397 to set the secondary latch 1160 to its unlatching position. Means for this purpose is shown in Fig. 11 and comprises an arm 1170 mounted on the shaft 397 (which is rocked at the end of the transfer operation to initiate the shifting and clearing cycles previously described). This arm supports the rear end of a link 1171, such as by stud 1172. The forward end of the link is provided with a slot 1173 which embraces a flat-headed pin 1174 riveted on, or otherwise secured to, the lower end of the bellcrank 1160. Thus the initiation of the shifting and clearing operation which follows the transfer, is effective to release the secondary latch 1160. If the primary latch 1061 has been released by the depression of the storage transfer key 1050, then both latches are in their unlatched positions and the bellcrank follower 1100 is permitted to rock. The rocking of the bellcrank follower 1100 sets the interponent 1115 in operative position and thereafter the bail 1125 is rocked to transfer the value then in the storage mechanism into the selection mechanism. The return of the bellcrank follower 1100, of course, causes its pin 1101 to again latch over the shoulder 1065, and this mechanism is thereby rendered inoperative until another storage to selection operation is again initiated.

6. Operation

The operation of the mechanisms controlled by the storage selection key 1050 can be very briefly summarized: The depression of the key rocks the sensing bail 620 so that if a value stands in the keyboard, operation is prevented. If the keyboard is clear then the bail can rock. The rocking of the bail 620 disables the "add" key mechanism as previously described, throughout the operation controlled by this key, that is, until after the key has returned to its raised, or inoperative, position. The depression of the key also rocks the arm 1051 which, through link 1060 and bellcrank latch 1061, releases the cam follower bellcrank 1100. The rocking of the latch 1061, of course, rocks the shaft 648, as the latch is rigidly secured thereto. The rocking of the shaft is effective to close the switch to the motor and cause engagement of the main drive clutch, thereby initiating a machine cycle of operation. Whenever a transfer from storage to selection only is initiated, the bellcrank follower 1100 immediately rocks to its extreme position, which sets the interponent 1115 in its operative position. Toward the end of that cycle, approximately at the 270 degree position, the roller 1110 on plate 1111 engages the rear end of the bellcrank 1100, rocking the same to its latched position. This return of the follower to its latched position operates the bail 1125, which, operating through the arms 1150 and springs 1152, resiliently forces the various selection slides 106 and 107 forwardly. These selection bars move forwardly until their movement is blocked by engagement of the shoulders 1087 on the sensing fingers 1085, 1086, respectively, with the notches or periphery of the value cams 1080. Thus the selection members have been set to differential positions determined by the ordinal position of the cams 1080.

If the storage selection key is operated simultaneously with one of the transfer keys 925 or 600, then the latch 1061 is released as heretofore noted, but the secondary latch 1160 is rendered operative, thereby preventing rocking of the bellcrank follower 1100 until after the transfer cycle has been completed. Such rocking of the latch 1160, however, has permitted the pin 1101 to rock a slight distance, sufficient to prevent relatching on latch 1061. Thereafter, when the transfer operation is completed and the carriage shifting and register clearing operation is initiated through the rocking of shaft 397, such rocking of shaft 397 rocks secondary latch arm 1160 (counter-clockwise in Fig. 11), thereby releasing the bellcrank follower 1100. This member then falls to its extreme position, and, later in the cycle, is restored with the setting of the selection slides, as above noted. This setting operation will occur in the first cycle of operation following the completion of the transfer operation, i.e., in the first cycle of operation of the shifting and clearing mechanism, so that when the machine finishes the latter operation it can remain at rest.

It will be understood that the machine shown and described herein is a preferred embodiment of my invention and that the mechanisms shown are capable of considerable modification by persons skilled in the art without departing from the spirit and scope of this invention. It will be understood also that although the present invention has been shown and described as embodied in a machine of the type disclosed in the Friden patents above-mentioned, this invention is not limited to incorporation in such a machine but may be applied to other commercial calculating machines on the market.

I claim:

1. In a calculating machine having ordinally arranged accumulator register gear assemblies, means for stopping the various register gear assemblies in their "0" positions, an ordinally arranged selection mechanism, and a digitation means including ordinally arranged actuator gears and intermediate gears selectively positionable with respect to their actuator gears to enter a value determined by said selection mechanism into said register gear assemblies additively or subtractively, the combination which comprises a plurality of ordinally arranged storage members connectable to the respective intermediate gears, clutches for connecting said intermediate gears to the ordinally related storage members, an auxiliary driving mechanism comprising in each order an auxiliary actuator and a normally disengaged slip clutch adapted to be driven by said auxiliary actuator for connecting the same to the ordinally related intermediate gears, a transfer key, and means operated by said key for engaging said slip clutches with said auxiliary actuators, for engaging said first-mentioned clutches, for connecting said intermediate gears in subtractive relationship to said register gear assemblies, and for operating said stopping means.

2. The apparatus of claim 1 wherein the slip clutch comprises a driving and a driven member, ratchet teeth on the adjacent faces of said members, a gear integral with said driving member adaptable to be driven by said auxiliary actuator, the number of ratchet teeth on the adjacent faces of the members being less in number than the number of teeth on the gear integral with the driving member, and cam faces on the ratchet teeth so constructed and arranged as to cam the driving member axially away from the driven member when rotation of the latter is blocked by said stopping means, thereby disengaging the gear integral with the driving member from the auxiliary actuator.

3. The apparatus of claim 1 wherein the slip clutch comprises a driving and a driven member, ratchet teeth on the adjacent faces of said members, a gear integral with said driving member adaptable to be driven by said auxiliary actuator, the depth of the ratchet teeth on the adjacent faces of the members being greater than the width of the gear integral with the driving member, and cam faces on the ratchet teeth so constructed and arranged as to cam the driving member axially away from the driven member when rotation of the latter is blocked by said stopping means, thereby disengaging the gear integral with the driving member from the auxiliary actuator.

4. The apparatus of claim 1 wherein said selection mechanism includes ordinally arranged pairs of selection bars and comprising also a sensing interponent pivotally mounted on each of said selection bars, resilient means biasing said interponents into an inoperative position, means for rocking said interponents into an operative position, a cylindrical value cam member engageable by said interponents operatively connected to each of the storage members, both of said interponents engaging the wall of said cam when said cam is in its "0" position, a series of four notches progressively arranged around the wall of said cam in one direction from the "0" position, said notches having differentially dimensioned depths in increments of "1" to "4", and being engageable by one of said interponents, a series of five notches progressively arranged in the opposite direction from said "0" position and being engageable by the other of said interponents, said notches having differentially dimensioned depths of "1" to "5", whereby both of said interponents will engage the wall of said cam in the "0" position thereof, and in the other digital value positions one of said interponents will register with a notch while the other will engage the wall of the cam.

5. The apparatus of claim 1 comprising also means controlled by the value position of any order of said selection mechanism for blocking operation of said key.

6. In a calculating machine having ordinally arranged accumulator dials, means for stopping the various dials in their "0" positions, an ordinally arranged selection mechanism including a keyboard and a plurality of ordinally arranged selection bars operated thereby, a digitation means including positionable gears controlled by said selection bars and drivers for said gears adapted to enter values determined by said bars into said dials, reversible means for operating said dials from said positionable gears additively or subtractively, the combination which comprises a plurality of ordinally arranged storage members connectable to the respective dials; clutches for connecting said dials to the ordinally related storage members; an auxiliary driving mechanism comprising in each order an auxiliary actuator and a normally disengaged slip clutch adapted to be driven by said auxiliary actuator for connecting the same to the ordinally related dial; a manually controlled means for engaging said slip clutches with said auxiliary actuators, for engaging said first-mentioned clutches, for positioning said reversible means in subtractive relationship to said accumulator dials, and for operating said stopping means; a cylindrical value cam member operatively connected to each of said storage members; differentially dimensioned notches in said cam members; sensing fingers mounted on said selection bars operable to sense the differential notches on said cams; and resilient means for moving said selection bars and their respective sensing fingers to engage said cams.

7. In a calculating machine having a plurality of accumulator dial assemblies, means for stopping the various dial assemblies in their "0" positions, a digitation means including a plurality of actuating members and intermediate gearing selectively positionable with respect to the actuator members to enter values additively or subtractively into the dial assemblies dependent on the position of the intermediate gearing with respect to the actuating members, and an ordinally arranged selection mechanism for positioning said intermediate gearing, the combination which comprises a plurality of storage members connectable to the intermediate gearing, clutches for connecting said intermediate gearing to the storage members, an auxiliary driving mechanism comprising a plurality of auxiliary actuators and normally disengaged slip clutches adapted to be driven by said auxiliary actuators for connecting the auxiliary actuators to the intermediate gearing, and manually controlled means for engaging said slip clutches with said auxiliary actuators, for engaging said first-mentioned clutches, for positioning said intermediate gearing in subtractive relationship to said dial assemblies, and for operating said stopping means.

8. In a cyclically operable calculating machine having ordinally arranged accumulator register dials, zero blocking means for stopping the various dials in their "0" positions, an ordinally arranged selection mechanism, a digitation means operative to enter values determined by said selection mechanism into said dials, a plurality of ordinally arranged storage members, and positionable gearing for connecting said dials to the ordinally related storage members, the combination which comprises an auxiliary digitation mechanism including ordinally arranged auxiliary actuators and normally disengaged driven gears adapted to be driven thereby, slip clutches for connecting said driven gears to the ordinally related dials, a control key, and means operated by said key for positioning said positionable gearing in connecting relationship, for engaging said normally disengaged gears with said auxiliary actuators, for positioning said zero blocking means in operative position, and initiating a cycle of machine operation, whereby the auxiliary actuators drive said dials and said storage members until the respective zero blocking means stop the various dials in their "0" position and thereupon the slip clutches yield to terminate such driving by the auxiliary actuators.

9. The apparatus of claim 8 comprising also ordinally arranged selection bars for connecting the orders of said selection mechanism to the ordinally related digitation means, a cylindrical value cam member operatively connected to said storage members, differentially dimensioned notches in said cam members, sensing fingers mounted on said selection bars operable to sense the differential notches on said cams, resilient means for moving said selection bars and their respective sensing fingers to engage said cams, and means for latching said selection bars in adjusted position.

10. In a calculating machine having ordinally arranged accumulator dials, means for stopping the various dials in their "0" value positions, an ordinally arranged keyboard, a power operated drive means, an ordinally arranged digitation means including actuator gears driven by said drive means and keyboard positioned selection gears operable to enter digital values into the ordinally related dials dependent upon the relative position of the selection gears and their respective actuator gears, a plurality of ordinally arranged storage members, and clutch means for connecting said selection gears to the ordinally related storage members, the combination which comprises an auxiliary actuator gear in each order and a normally disengaged driven gear operatively connected to the ordinally related selection gears and adapted to be driven by the ordinally related auxiliary actuator gear, a transfer control key, means operated by said key for engaging said driven gears with the respective auxiliary actuator gears, for operating said "0" stopping means, for positioning said clutch means in connecting position, and for operating said drive means, and means for severally disengaging said driven gears from their respective auxiliary actuator gears upon engagement of the respective dial with its "0" stopping means.

11. In a calculating machine having a frame, a keyboard mounted in said frame, selection members positioned by the keys of said keyboard, a shiftable carriage mounted on said frame, a plurality of ordinally arranged register elements in said carriage, digitating gear assemblies connectable to said register elements for additive or subtractive operation and operative to enter a value determined by said selection members into said register elements, means for shifting said carriage in either direction, a tabulating mechanism operable to shift said carriage to a predetermined ordinal position with respect to said selection mechanism, and zero stopping means for stopping the various register elements in their "0" positions, the combination which comprises ordinally arranged shafts connectable to the respective orders of said gear assemblies, clutch means for connecting each such shaft to the ordinally related gear assembly, an auxiliary drive means including slip clutches for driving said digitating gear assemblies, a manually operated control key, means operated by said key for operating said tabulating mechanism, and means conditioned by said key and operated by movement of said carriage to said predetermined ordinal position for clutching said shafts to said digitating gear assemblies, for operating said auxiliary drive means, for operating said zero stopping means, and for connecting said accumulator register elements to said digitating gear assemblies for subtractive operation, whereby the auxiliary drive means operates said register elements in a subtractive direction until operation is stopped by the zero stopping means whereupon the slip clutch yields to disable operation of the digitating gear assemblies by the auxiliary actuator.

12. In a calculating machine having a frame, an ordinally arranged keyboard mounted in said frame, a selection mechanism including ordinally arranged pairs of selection bars, one bar of such pair serving some of the keys of the related order and the other bar of such pair serving other keys of the related order, a shiftable carriage mounted on said frame, a plurality of ordinally arranged register elements in said carriage, digitating gear assemblies connectable to said register elements for additive or subtractive operation and operative to enter a value determined by said selection members into said register elements, means for shifting said carriage in either direction, a tabulating mechanism operable to shift said carriage to a predetermined ordinal position with respect to said selection mechanism, and dial stopping means for stopping the various ordinal register elements in their "0" positions, the combination which comprises ordinally arranged shafts connectable to the respective orders of said gear assemblies; clutch means for connecting each such shaft to the ordinally related gear assembly; an auxiliary drive means including slip clutches for driving said gear assemblies; a manually operated control key, means operated by said key for operating said tabulating mechanism; means conditioned by said key and operated by movement of said carriage to said predetermined ordinal position for clutching said shaft to said digitating gear assembly, for operating said auxiliary drive means, for operating said dial stopping means, and for connecting said accumulator register elements to said digitating gear assemblies for subtractive operation; a cupped cam on each shaft, said cam having peripheral slots of differential depth in the wall of said cam, some of said slots being engageable by said one selection bar and another set of slots engageable by the other selection bar of that order, means for resiliently moving the selection bars into engagement with their respective cams, thereby differentially positioning the selection bars in accordance with the setting of said cams; and means for latching said selection bars in their adjusted position.

13. In a calculating machine having ordinally arranged accumulator dials, dial stop means for stopping the various dials in their "0" position, an ordinally arranged selection mechanism, a digitating means including ordinally arranged gear assemblies connectable to the ordinally related dials for entering values determined by said selection mechanism into said register additively or subtractively, and power means for operating said digitating means, the combination comprising a plurality of ordinally arranged auxiliary driving members driven by said power means and operable to rotate said gear assemblies; clutches between said auxiliary members and the ordinally related gear assemblies; a manually operated member; and means operated by said manually operated member for operating said auxiliary members, for operating said dial stop means, for positioning said clutches to connect said auxiliary members to the ordinally related gear assemblies, and connecting said gear assemblies to the ordinally related dials for subtractive operation, whereby the auxiliary member drives said gear assemblies to subtract the value standing in the registers therefrom; and cam means for disengaging said clutches whenever operation of the ordinally related dial is blocked by engagement with its dial stop means.

14. A calculating machine comprising an ordinally arranged value selection mechanism, ordinally arranged rotatable accumulator dials, ordinally arranged rotatable counter dials, dial blocking means for stopping both sets of dials in their "0" positions, ordinally arranged actuating members for differentially rotating said accumulator wheels in accordance with a digital value determined by the ordinally related selection mechanism, drive means for said actuating members, a first gear train for connecting said actuating members to said accumulator dials, a second gear train for connecting said actuating members to said counter dials, a cyclically operated counter actuator for said counter dials, ordinally arranged storage dials, means for connecting said storage dials to the ordinally associated actuating members, a yieldable auxiliary drive means for rotating said actuating members, a first key, a mechanism controlled by said first key for operating said connecting means to connect said storage dials to said actuating members, engage said first gear train, to operate said dial blocking means, and thereafter to operate said auxiliary drive means whereby the accumulator dials are rotated to their "0" positions while connected to said storage dials and the auxiliary drive means then yields to prevent further operation thereof, a second key, a mechanism controlled by said second key for operating said connecting means to connect said storage dials to the actuating members, to engage said second gear train, to operate said dial blocking means, and thereafter operating said auxiliary drive means whereby the counter dials are rotated to their "0" positions while connected to said storage dials and the auxiliary drive means then yields to prevent further operation thereof.

15. A calculating machine comprising a register containing ordinally arranged dials, an ordinally arranged selection mechanism, ordinally arranged storage members, connecting means for connecting the said storage members to the ordinally related register dials, ordinally arranged actuator gears, drive means for said actuator gears, digitation gears positioned by said selection mechanism for differentially connecting said actuator gears to the coordinal dials, ordinally arranged auxiliary digitation means including in each order an auxiliary actuator gear driven by said drive means synchronously with said actuator gears and a normally disengaged auxiliary digitation gear connectable to its coordinal dial, means for engaging said auxiliary gears with the coordinal auxiliary actuator gear and the coordinal dial for operating the dials toward a "0" position, zero stop means for stopping the various register dials in their "0" positions, disengaging means effective to disable the various auxiliary digitation means whenever rotation of the coordinal dial is blocked by said stopping means, and means for simultaneously operating said drive means, said connecting means, said engaging means, and said zero stop means to cause the register dials to be turned to their "0" positions by their auxiliary digitation means and thereby differentially position the storage members to a value corresponding to that in said register dials prior to such operation.

16. In a calculating machine having ordinally arranged accumulator wheels, means for stopping the various wheels in their "0" positions, a digitation means including ordinally arranged driving gears and intermediate gears selectively positionable with respect to their driving gears to enter a value determined by the relative position of said intermediate gears to their driving gears into said accumulator wheels, and a selection mechanism for positioning said intermediate gears, the combination which comprises a plurality of ordinally arranged storage members connectable to the ordinally related accumulator wheels, positionable means for connecting said accumulator wheels to the ordinally related storage members, an auxiliary actuator operatively connected to each driving gear, normally disengaged driven gears movable into engagement with said auxiliary actuators and when so engaged operative to drive said intermediate gears, disengaging means effective to disengage each driven gear whenever rotation of its associated intermediate gears is blocked by said accumulator wheel stopping means, and a manually operated means for moving said driven gears into engagement with said auxiliary actuators, for positioning said positionable means in connecting position, and for operating said stopping means.

17. A calculating machine comprising a register containing ordinally arranged dials, zero stop means for stopping the various register dials in their "0" positions, ordinally arranged storage members, connecting means for connecting the said storage members to the ordinally related accumulator register dials, ordinally arranged digitation means including stepped teeth actuator gears and positionable selection gears driven thereby for differentially operating the respective dials, ordinally arranged auxiliary actuator gears having a predetermined number of teeth, a drive means for simultaneously driving said actuator gears and said auxiliary gears, a yieldable drive means including normally disengaged driven gears movable into mesh with said auxiliary actuator gears and disengaging clutches connected to said driven gears and effective to disengage said driven gears from their respective auxiliary gears whenever rotation of the driven gear is stopped, means for engaging said driven gears with their respective auxiliary actuators, means for connecting said driven gears to said dials for operating the dials toward a "0" position, and means for simultaneously operating said drive means, said engaging means, both of said connecting means, and said zero stop means, thereby causing the auxiliary digitation means to turn the register dials to their "0" positions while connected to their respective storage members and thus differentially position the storage members to a value corresponding to that in said register dials prior to such operation.

18. In a calculating machine having an accumulator register containing ordinally arranged dials, a digitation means including ordinally arranged actuator members and selectively positionable gears driven by said actuator members and operable to transmit a value to the ordinally related dial dependent on the position of the gears with respect to the actuator members, and ordinally arranged selection members for positioning said gears, ordinally arranged storage members, a mechanism for transferring a value standing in the accumulator register dials into said storage members including normally inoperative means for connecting the said storage members to the ordinally related accumulator register dials, an auxiliary actuator connected to each actuator member, normally inoperative yieldable means for connecting said auxiliary actuators to their respective dials for operating the dials toward a "0" position, dial stop means for stopping the various register dials in their "0" positions, and means for simultaneously positioning said connecting means in operative position to connect said storage members to the ordinally related dials, to position said yieldable connecting means in operative position to connect said auxiliary actuators with their respective dials, to operate said auxiliary actuators, and to position said dial stop means inoperative position to cause the register dials to be stopped in their "0" positions, thereby differentially positioning the storage members to a value corresponding to that in said register dials prior to such operation.

References Cited in the file of this patent

UNITED STATES PATENTS

| | | |
|---|---|---|
| 2,265,628 | Chase | Dec. 9, 1941 |
| 2,278,863 | Chase | Apr. 7, 1942 |
| 2,325,388 | Friden | July 27, 1943 |
| 2,389,182 | Chase | Nov. 20, 1945 |
| 2,399,170 | Chase | Apr. 30, 1946 |
| 2,527,467 | Turck | Oct. 24, 1950 |
| 2,570,456 | Karr | Oct. 9, 1951 |
| 2,714,989 | Ellerbeck | Aug. 9, 1955 |
| 2,733,010 | Ellerbeck | Jan. 31, 1956 |
| 2,733,011 | Davis | Jan. 31, 1956 |

FOREIGN PATENTS

| | | |
|---|---|---|
| 203,473 | Switzerland | June 16, 1939 |
| 218,923 | Switzerland | Sept. 16, 1947 |

UNITED STATES PATENT OFFICE
CERTIFICATE OF CORRECTION

Patent No. 2,909,320                                    October 20, 1959

Arthur J. Malavazos

It is hereby certified that error appears in the printed specification of the above numbered patent requiring correction and that the said Letters Patent should read as corrected below.

Column 2, line 46, for "calulating" read -- calculating --; column 6, line 9, for "regiiter" read -- register --; line 16, for "may" read -- my --; column 10, line 14, for "substrative" read -- subtractive --; column 14, line 43, after "downwardly" insert a comma; column 19, line 22, after "Fig. 6" insert a closing parenthesis; column 25, line 39, after "latched" insert -- in --; column 31, line 44, after "Fig. 22)" insert a comma; column 32, line 20, for "groove 886" read -- groove 866 --; column 33, line 3, strike out the period after the word "positions" and insert instead a semicolon; column 35, line 16, for "gear 904" read -- gear 905 --; column 38, line 37, after "key 600" insert a comma; column 40, line 36, after "inoperative" insert a comma; column 42, line 68, for "(Fig. 15 and 18)" read -- (Figs. 15 and 18) --; line 74, for "ordinarily" read -- ordinally --; column 48, line 7, after "switch" insert a comma; line 41, after "mechanism" insert -- which --; column 50, line 75, for "in the" read -- on the --; column 53, line 40, for "ordinarily" read -- ordinally --; column 61, line 18, for "inoperative" read -- in operative --.

Signed and sealed this 7th day of June 1960.

(SEAL)
Attest:

KARL H. AXLINE                                            ROBERT C. WATSON
Attesting Officer                                     Commissioner of Patents